May 29, 1934.  J. GANNON ET AL  1,961,103
AUTOMATIC BOOK MAKING MACHINE
Filed Feb. 7, 1931   29 Sheets-Sheet 1

Inventors
Jesse Gannon
Winfred Elmo Reavis
George Baker
By

May 29, 1934.  J. GANNON ET AL  1,961,103
AUTOMATIC BOOK MAKING MACHINE
Filed Feb. 7, 1931    29 Sheets-Sheet 3

Inventors
Jesse Gannon
Winfred Elmo Reavis
George Baker
By
Attorney

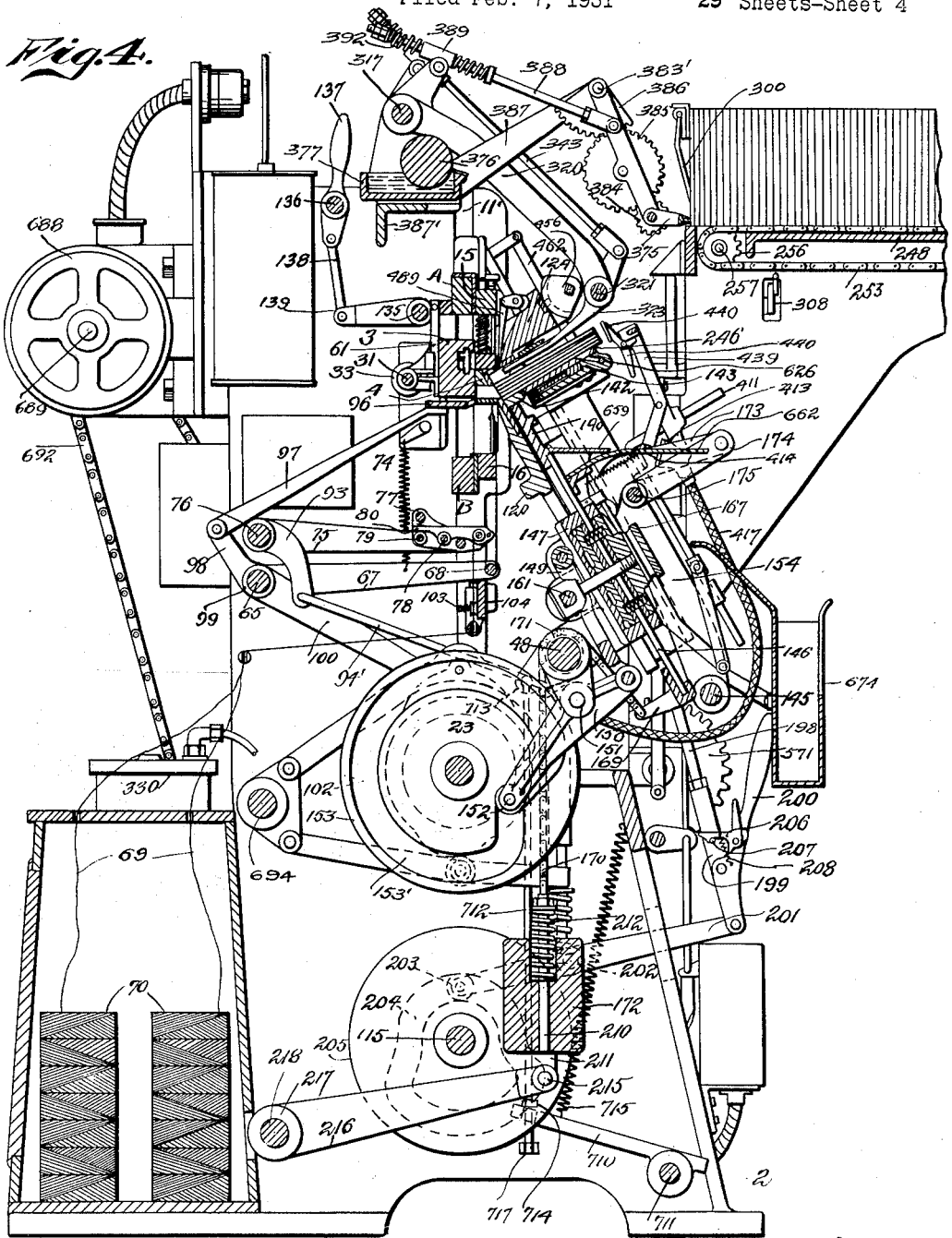

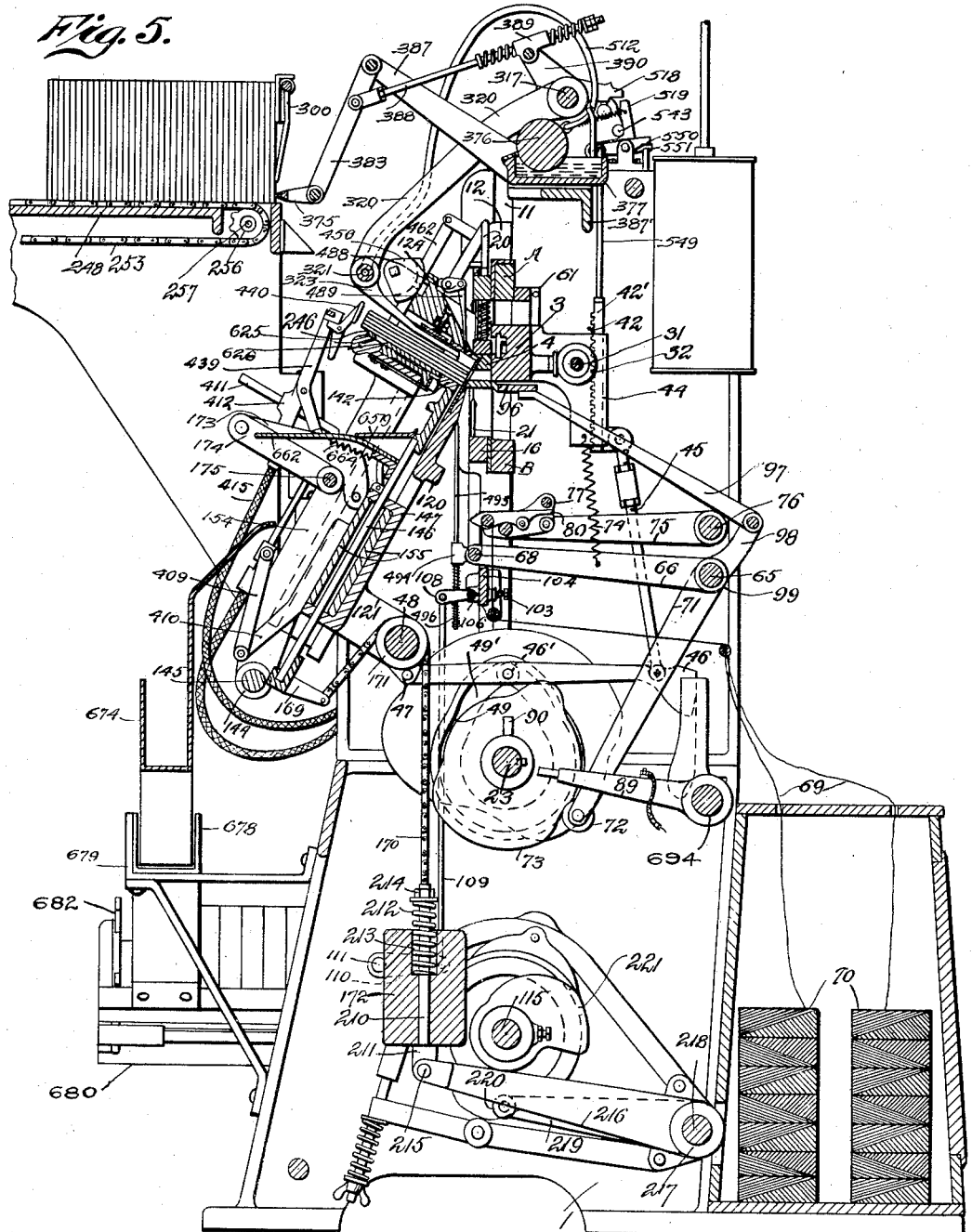

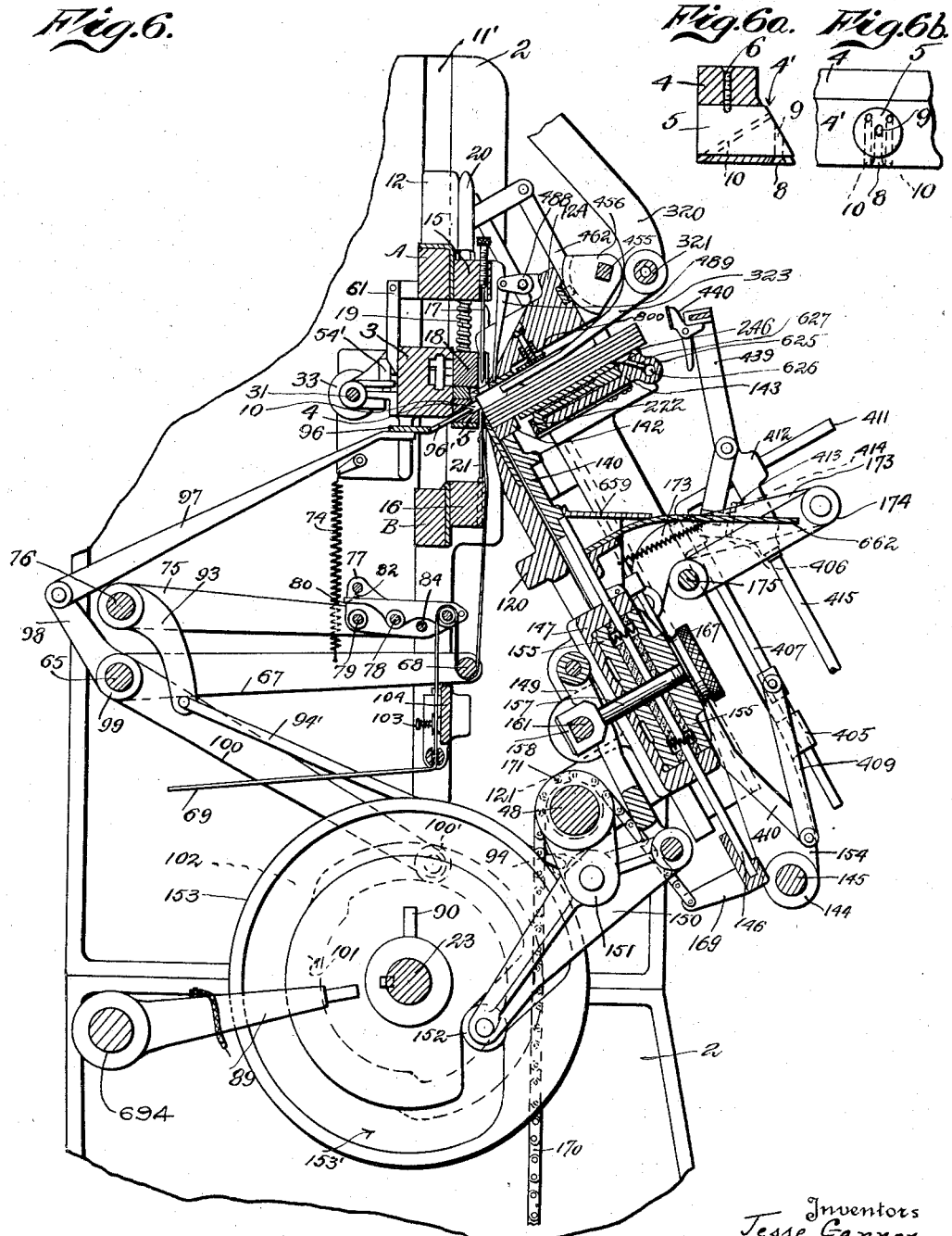

May 29, 1934.   J. GANNON ET AL   1,961,103
AUTOMATIC BOOK MAKING MACHINE
Filed Feb. 7, 1931   29 Sheets-Sheet 7

Inventors
Jesse Gannon
Winfred Elmo Reavis
George Baker
By
Attorney

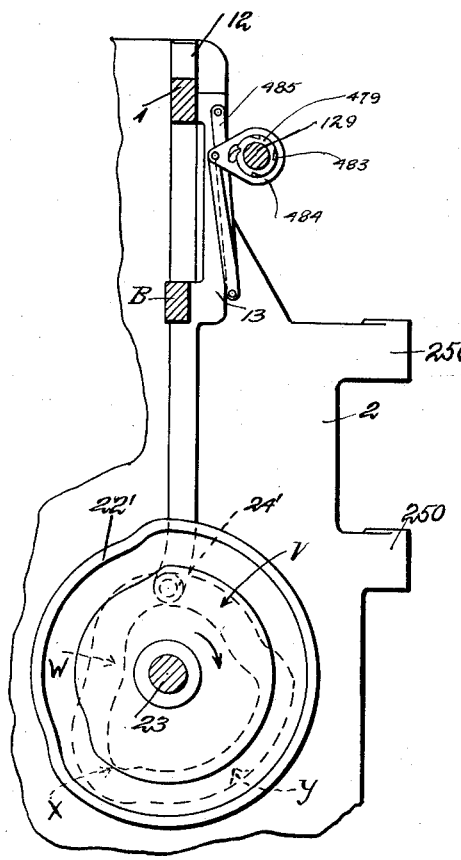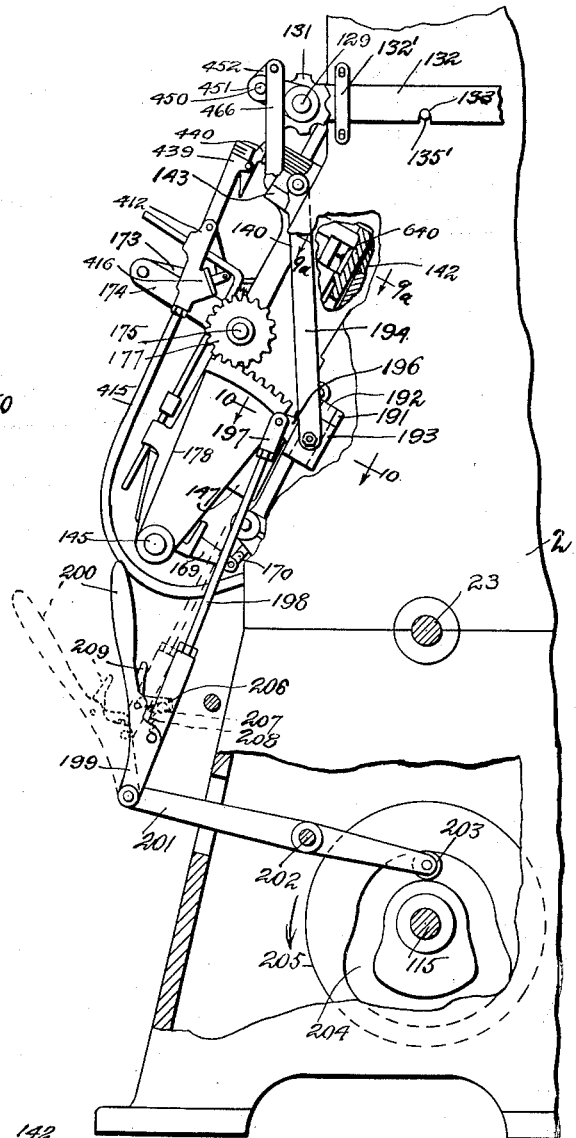

May 29, 1934.  J. GANNON ET AL  1,961,103
AUTOMATIC BOOK MAKING MACHINE
Filed Feb. 7, 1931   29 Sheets-Sheet 9

Inventors
Jesse Gannon
Winfred Elmo Reavis
George Baker
By
Attorney

May 29, 1934.  J. GANNON ET AL  1,961,103
AUTOMATIC BOOK MAKING MACHINE
Filed Feb. 7, 1931  29 Sheets-Sheet 10
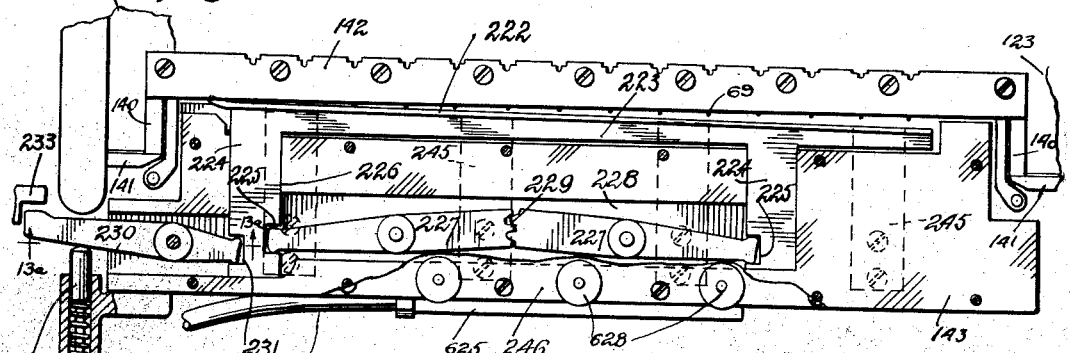
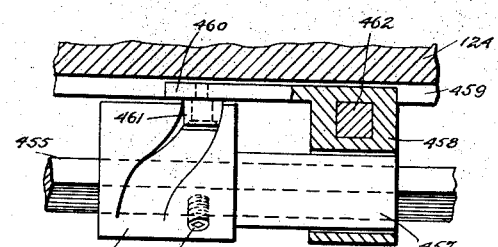
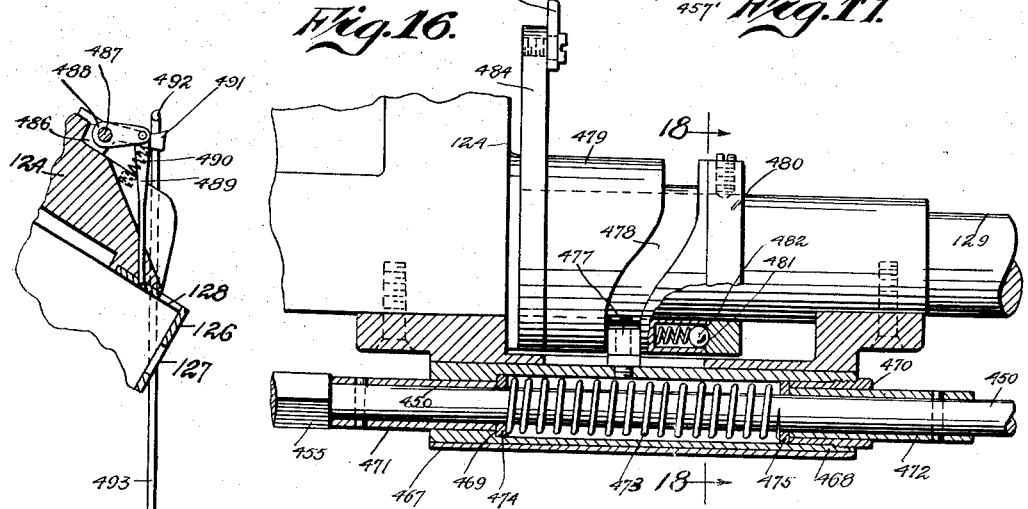
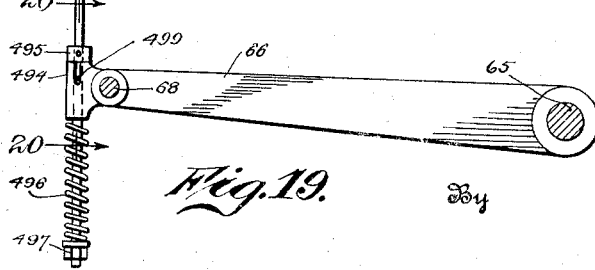
Inventors
Jesse Gannon
Winfred Elmo Peavis
George Baker
Attorney May 29, 1934.　　　J. GANNON ET AL　　　1,961,103
AUTOMATIC BOOK MAKING MACHINE
Filed Feb. 7, 1931　　29 Sheets-Sheet 11
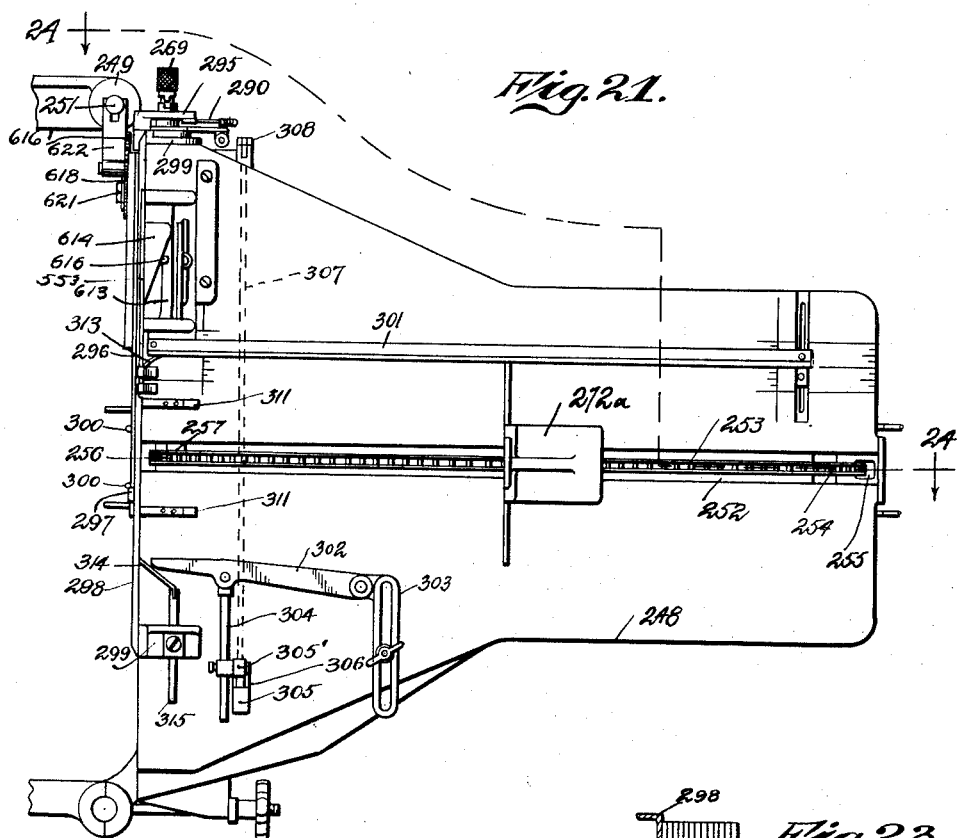
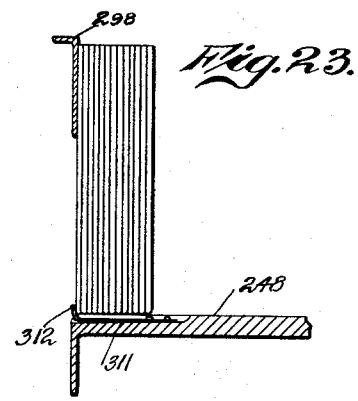
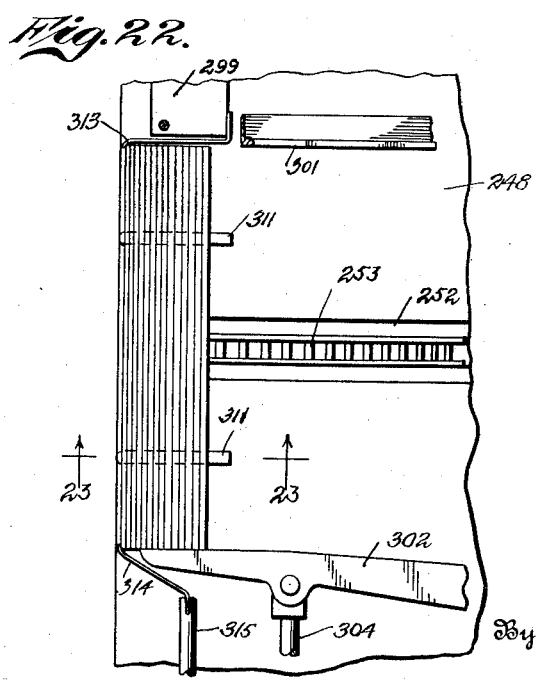
Inventors
Jesse Gannon
Winfred Elmo Reavis
George Baker
By
Attorney

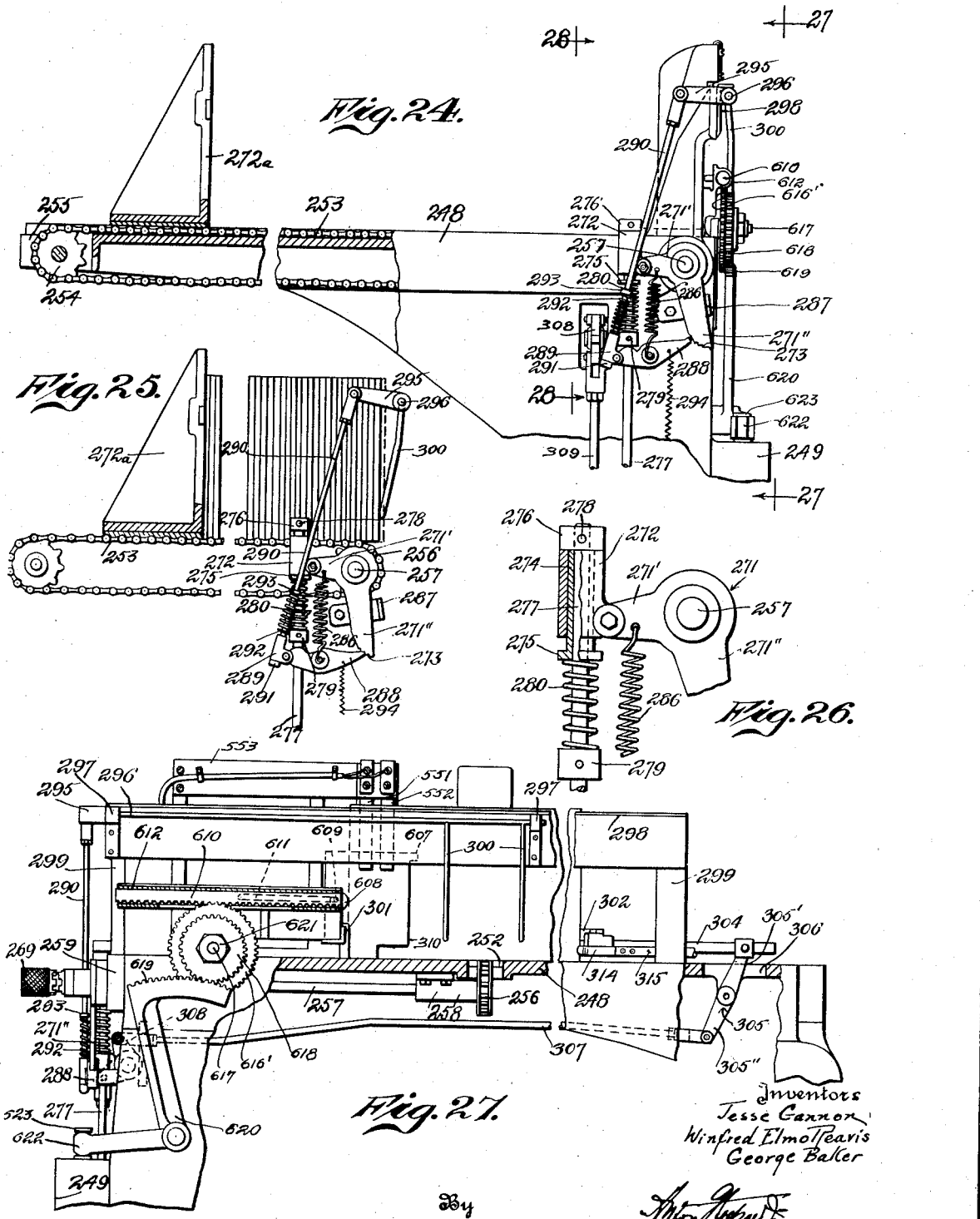

May 29, 1934.  J. GANNON ET AL  1,961,103
AUTOMATIC BOOK MAKING MACHINE
Filed Feb. 7, 1931    29 Sheets-Sheet 13

Inventors
Jesse Gannon
Winfred Elmo Pearis
George Ballet
By
Attorney

May 29, 1934.  J. GANNON ET AL  1,961,103
AUTOMATIC BOOK MAKING MACHINE
Filed Feb. 7, 1931  29 Sheets-Sheet 15

Inventors
Jesse Gannon
Winfred Elmo Pearis
George Baker

By

Attorney

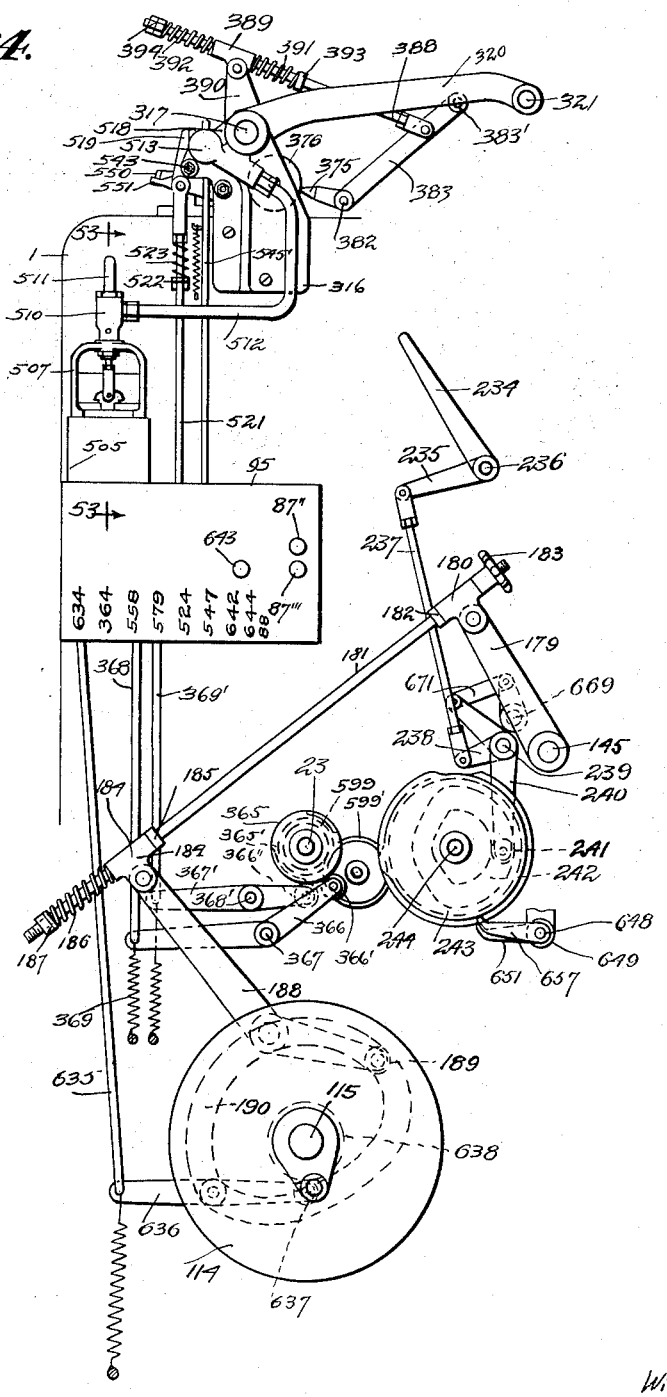

May 29, 1934.  J. GANNON ET AL  1,961,103
AUTOMATIC BOOK MAKING MACHINE
Filed Feb. 7, 1931  29 Sheets-Sheet 17
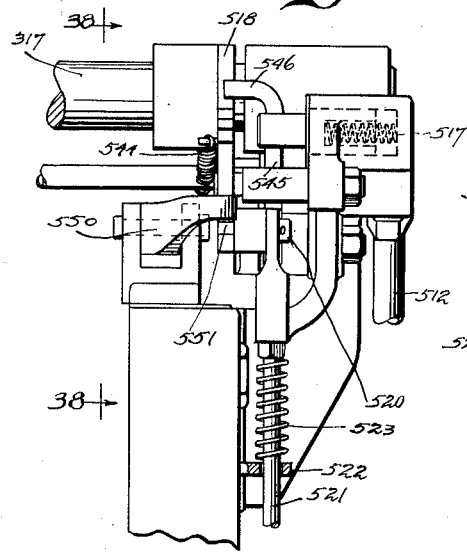
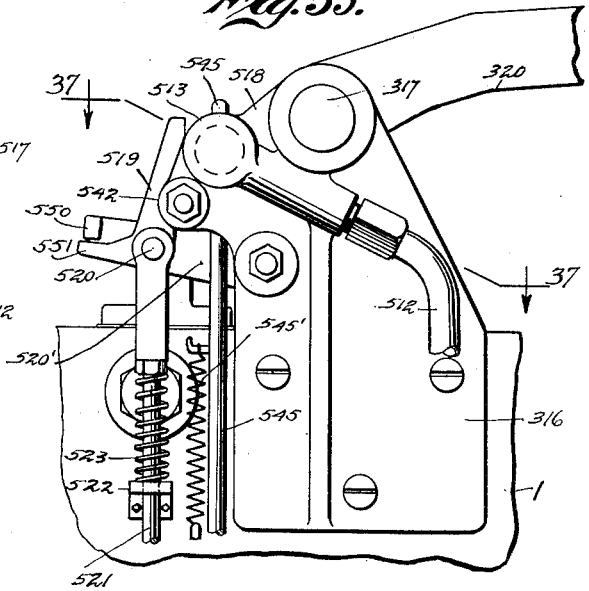
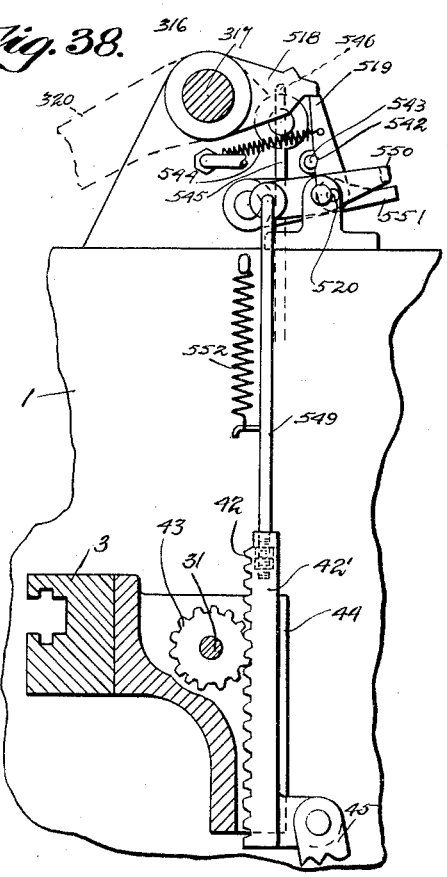
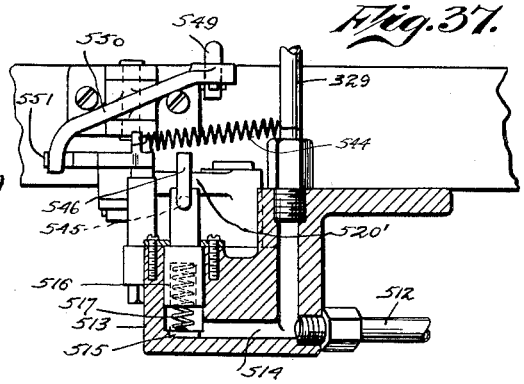
Inventors
Jesse Gannon
Winfred Elmo Reavis
George Baker
By
Attorney

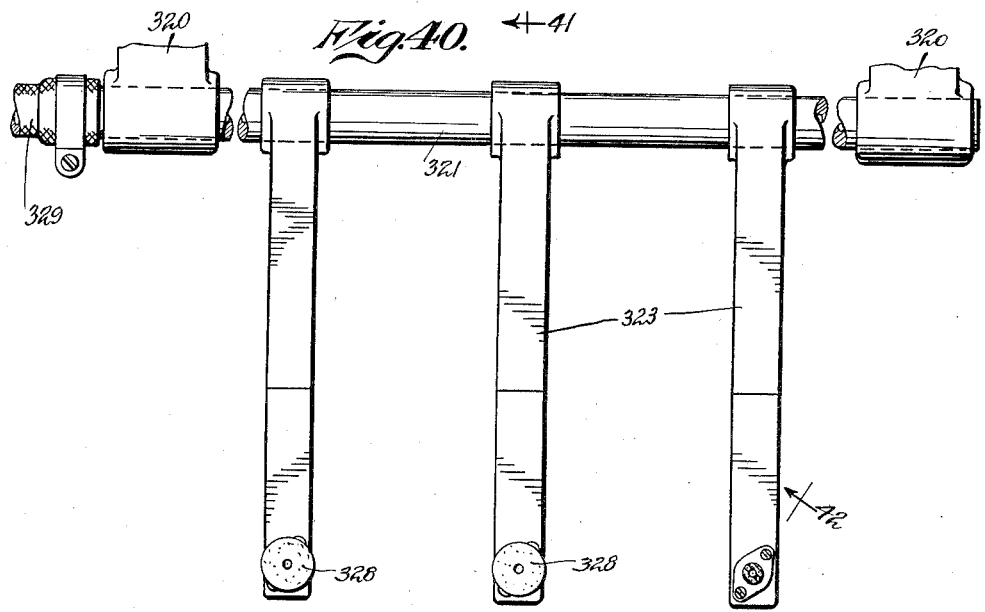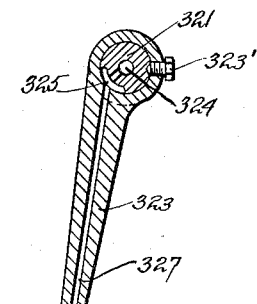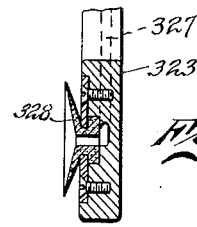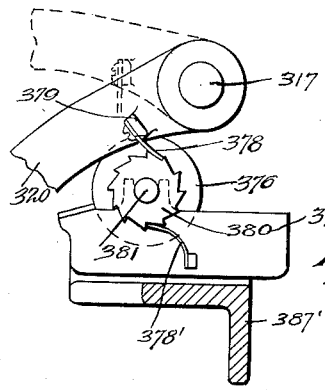

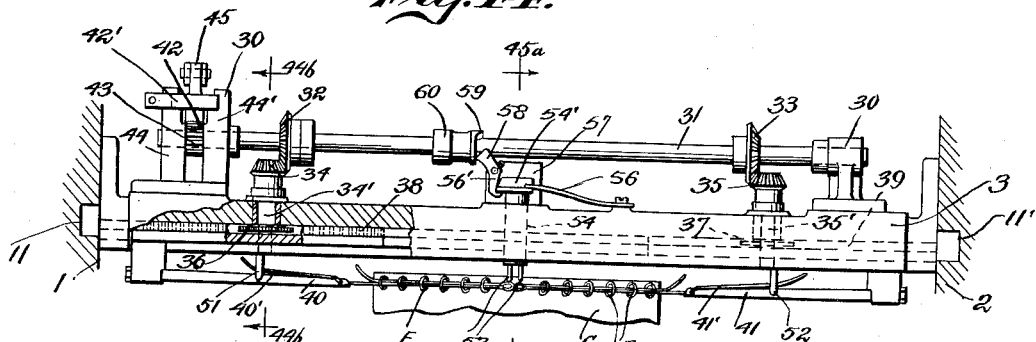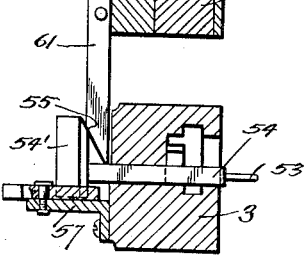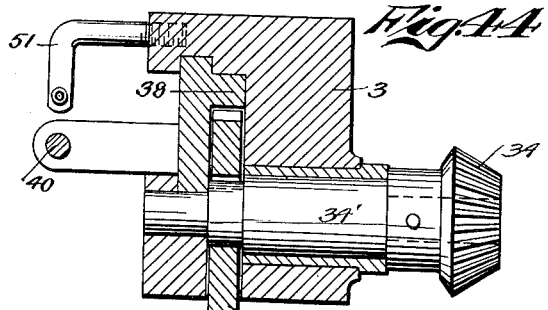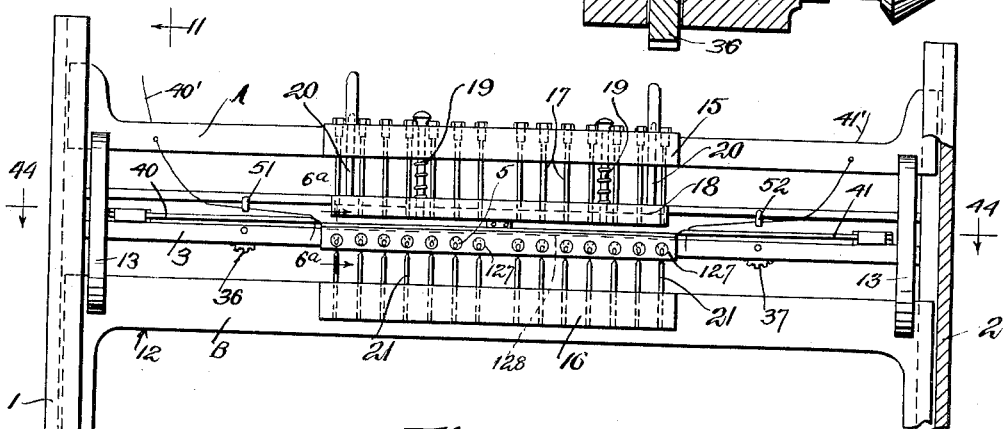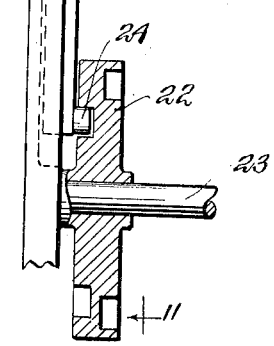

Inventors
Jesse Gannon
Winfred Elmo Pearis
George Baker

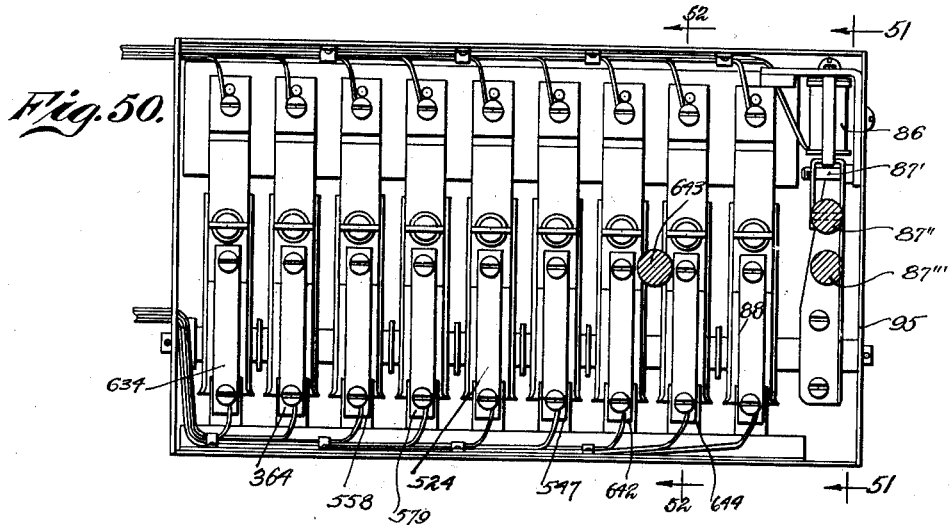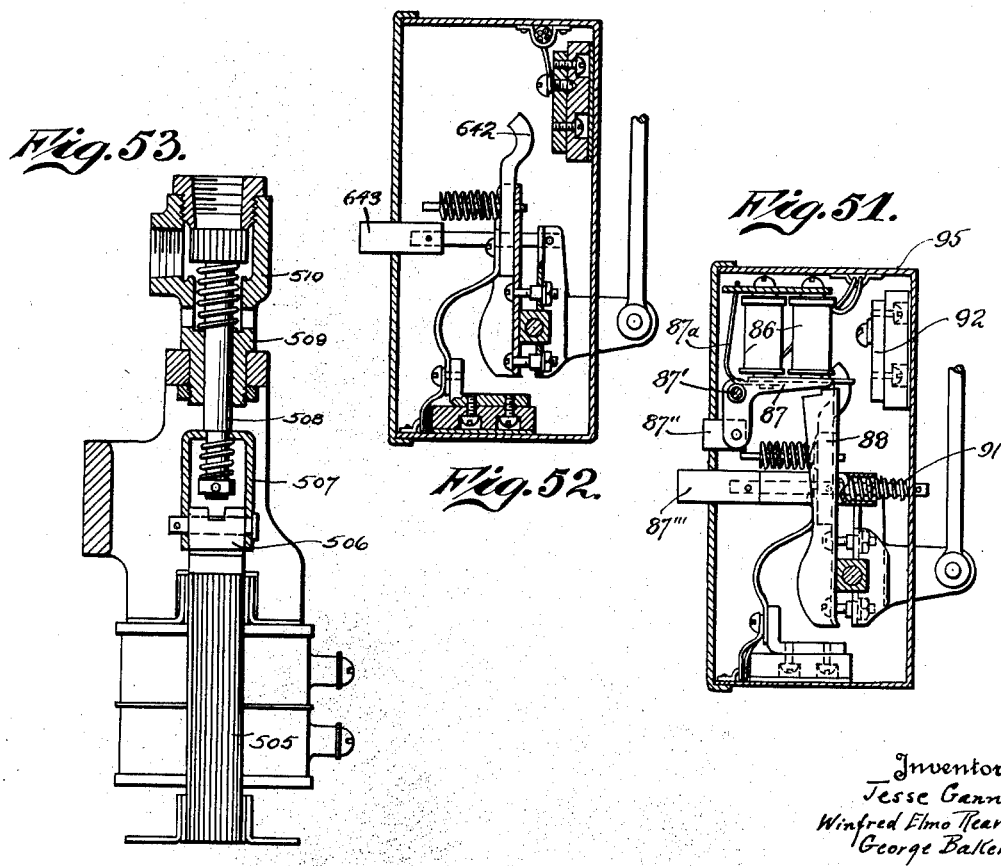

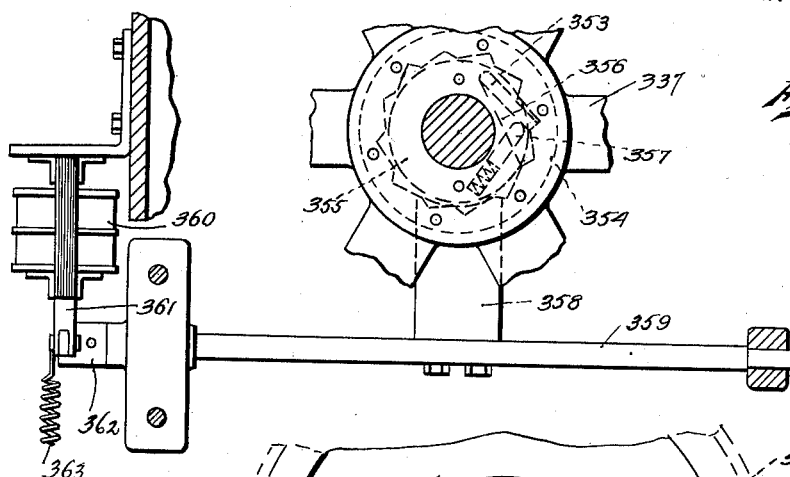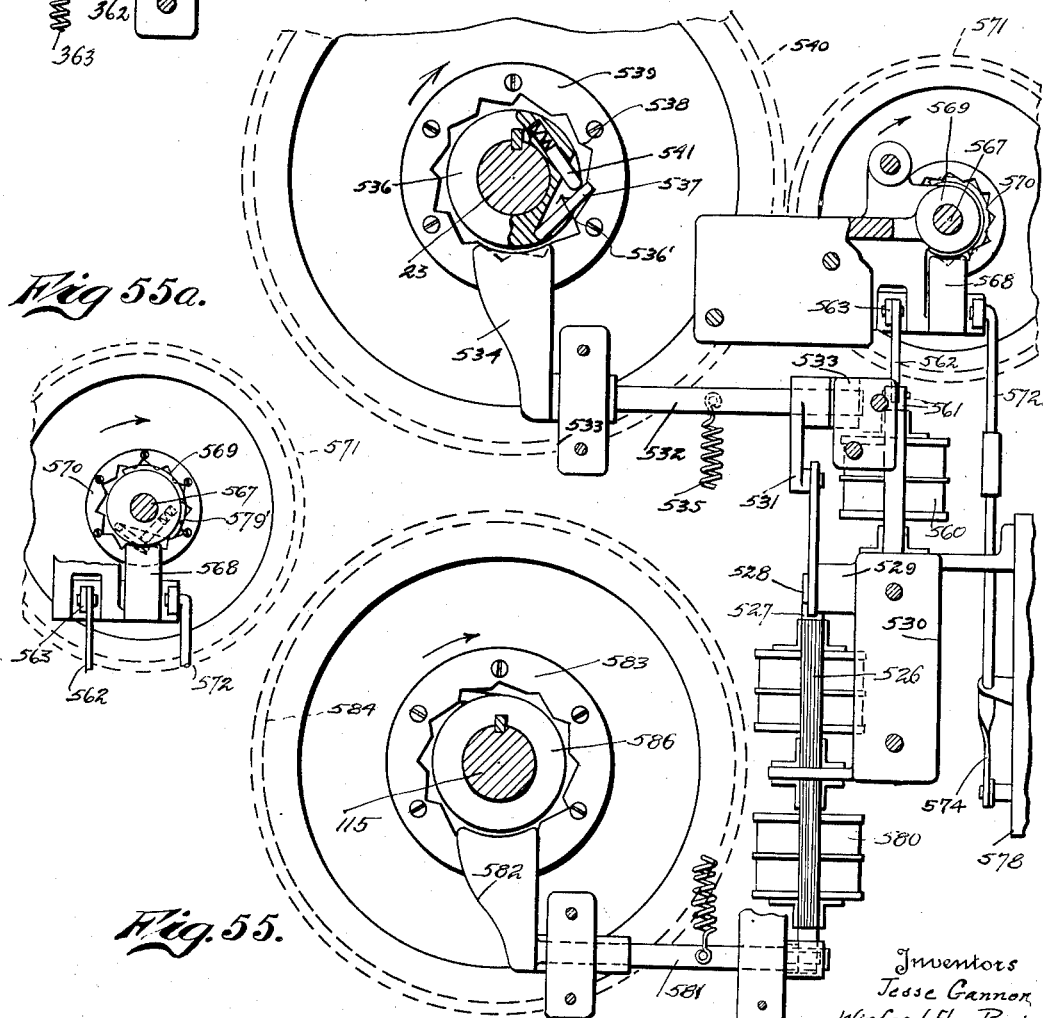

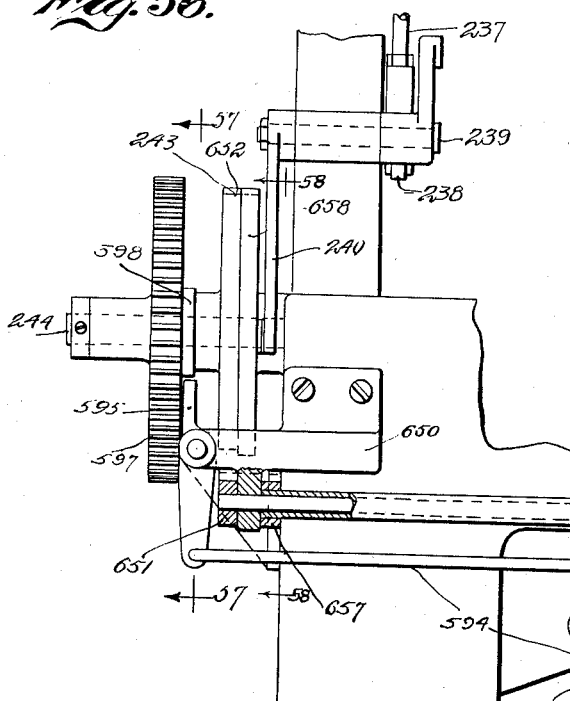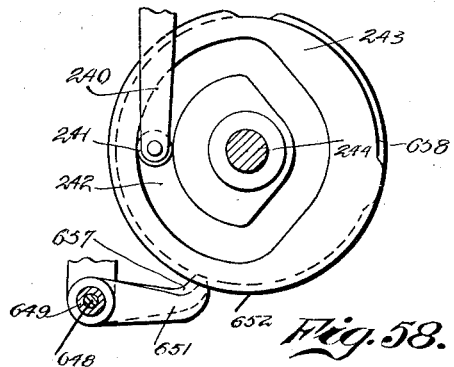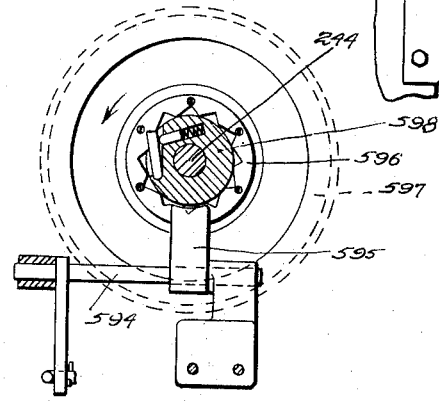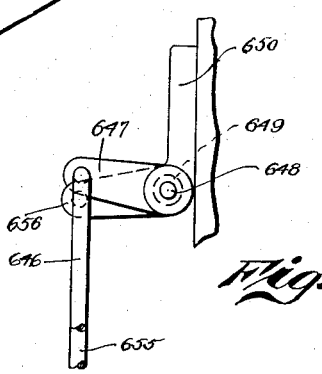

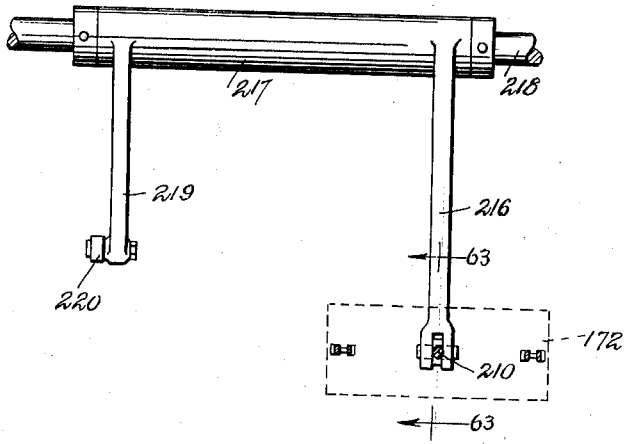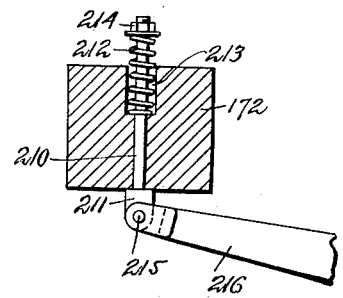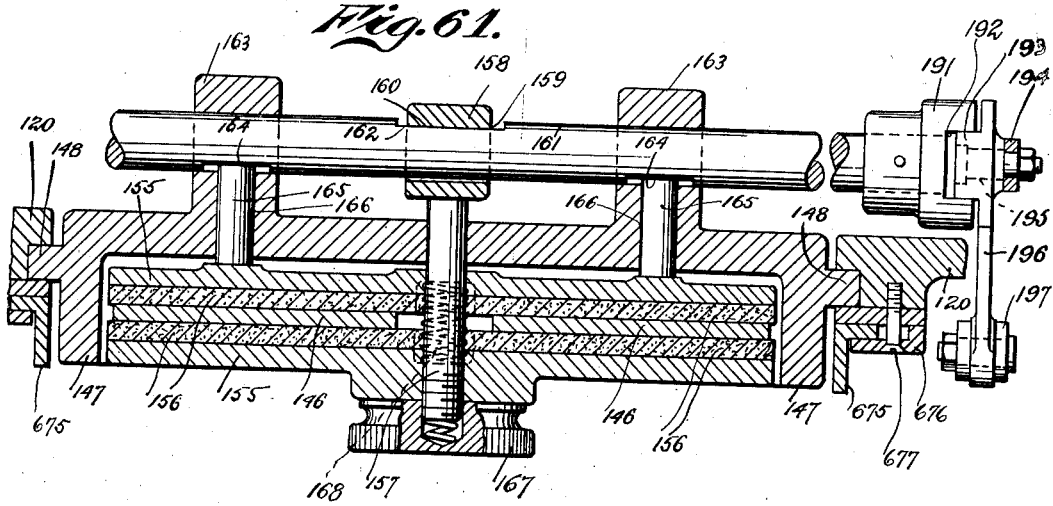

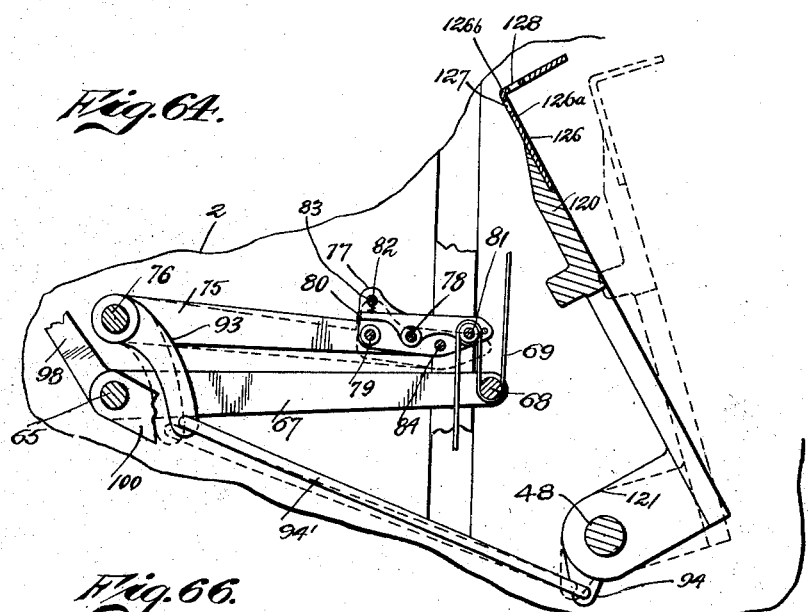
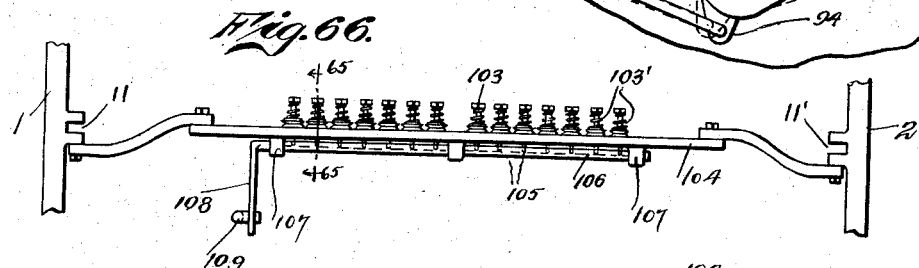
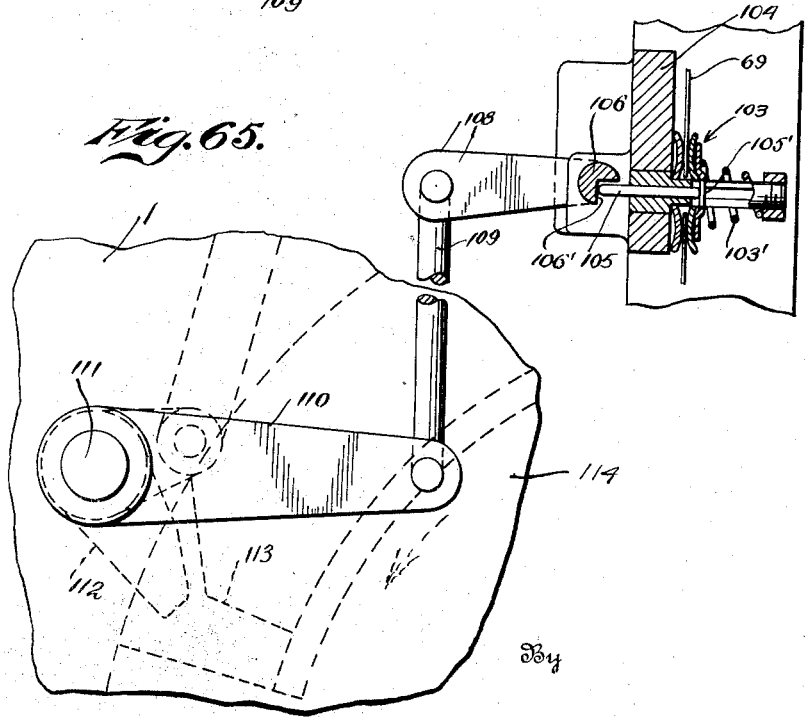
Fig. 64.
Fig. 66.
Fig. 65.
Inventors
Jesse Gannon
Winfred Elmo Pearis
George Baker
By
Attorney May 29, 1934.  J. GANNON ET AL  1,961,103
AUTOMATIC BOOK MAKING MACHINE
Filed Feb. 7, 1931   29 Sheets-Sheet 27
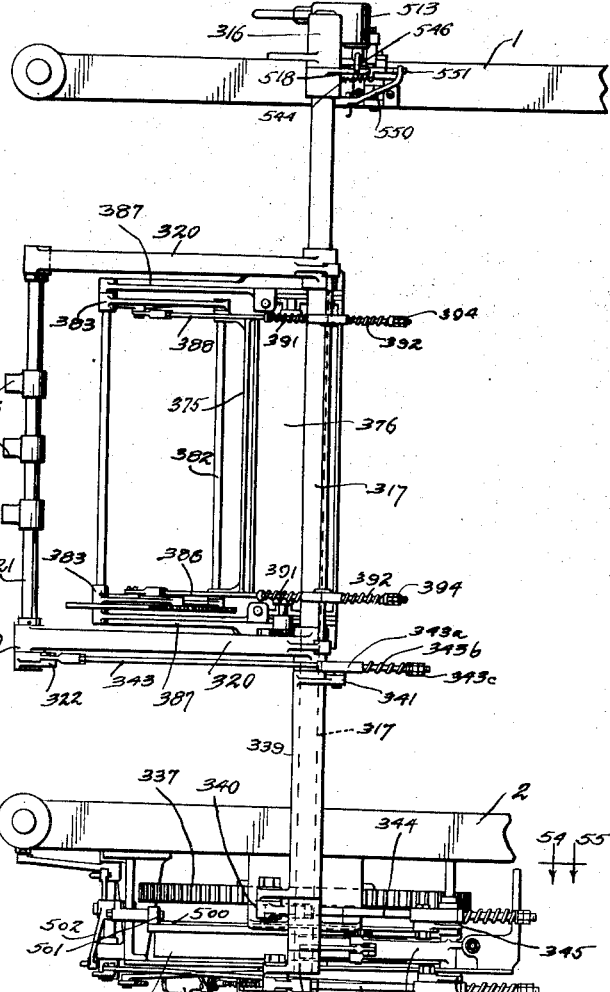
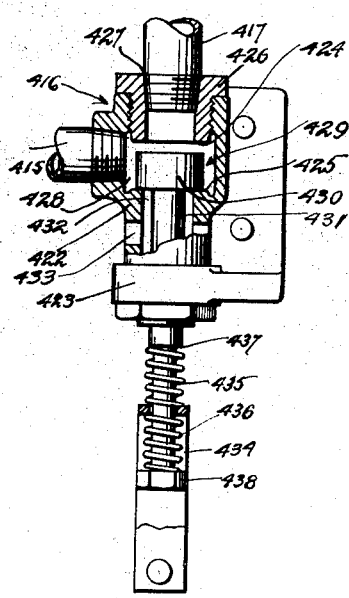
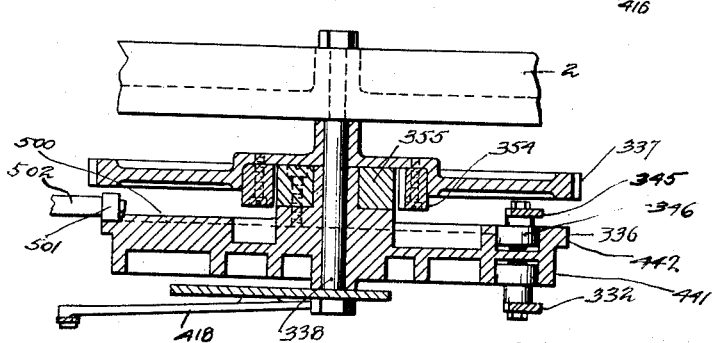
Inventors
Jesse Gannon
Winfred Elmo Pearis
George Baker
By
Attorney May 29, 1934.  J. GANNON ET AL  1,961,103
AUTOMATIC BOOK MAKING MACHINE
Filed Feb. 7, 1931  29 Sheets-Sheet 28

Inventors
Jesse Gannon
Winfred Elmo Rearis
George Balker

By

Attorney

May 29, 1934.  J. GANNON ET AL  1,961,103
AUTOMATIC BOOK MAKING MACHINE
Filed Feb. 7, 1931   29 Sheets-Sheet 29
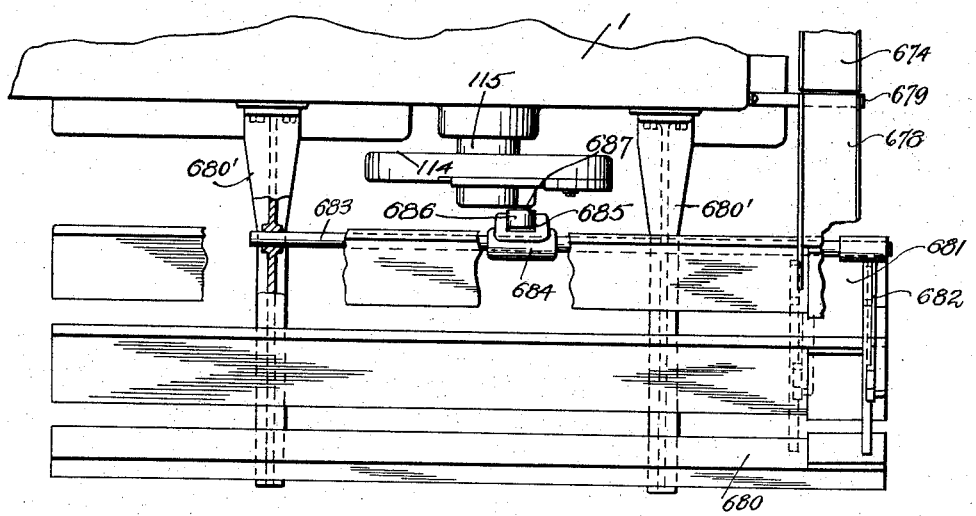
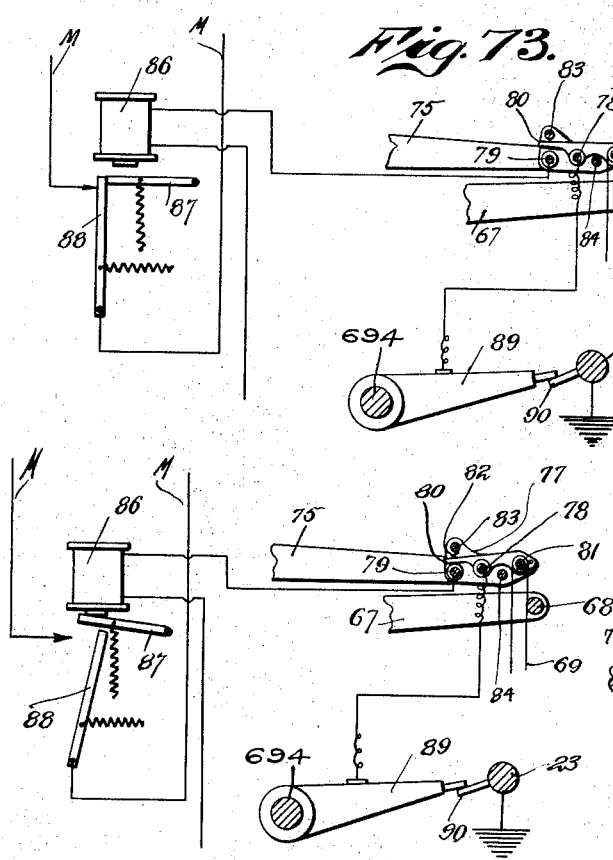
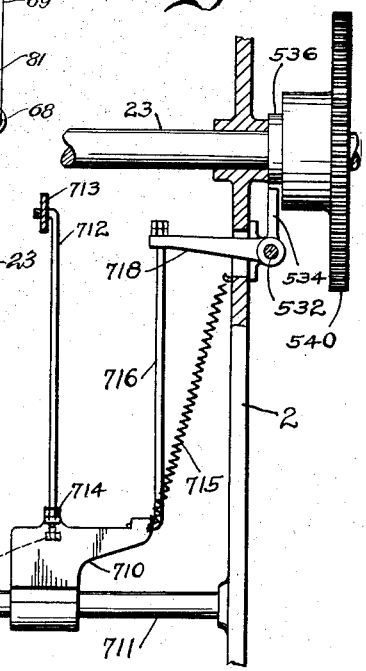

Patented May 29, 1934

1,961,103

UNITED STATES PATENT OFFICE 1,961,103

AUTOMATIC BOOK MAKING MACHINE

Jesse Gannon, Winfred Elmo Reavis, and George Baker, Los Angeles, Calif., assignors to Oversewing Machine Company, Los Angeles, Calif., a corporation of California Application February 7, 1931, Serial No. 514,182

69 Claims. (Cl. 112—21)

This invention relates to a machine for making books and it has especial reference to a machine for making books by sewing one signature onto another in continuous succession in accordance with the method explained and carried out in and by those types and characters of machines described and claimed in those certain patents issued to John Griesinger, April 21, 1914, No. 1,093,694, and May 21, 1918, No. 1,266,793; and to W. E. Reavis et al. Feb. 12, 1924, No. 1,483,521.

The principal object of the present invention is to provide a machine which embodies all the essentials of the sewing machines disclosed in the patents referred to, with many others not revealed therein and in which all of the sequential functions, with others, are automatically accomplished.

Other objects are to provide a machine for automatically making books in which greater speed in the sequential sewing of signatures is attained than is possible with the hand operated machine; in which books may be made continuously regardless of the number of signatures comprised in a book or set or number of books; and in which the controls for the various sequential mechanisms of the machine are interrelated in such wise that failure of the performance of any one function of the machine will cause the machine to come to a halt.

These and other objects are accomplished by a form of embodiment of the invention expressed in the accompanying drawings, which are illustrative merely of practical ways and means for carrying out the sense of the invention and hence attach no limitation to them, separately or in combination.

Of the drawings:

Fig. 4 is a vertical sectional elevation taken approximately on line 4—4—Fig. 1, looking in the direction of the arrow.

Fig. 5 is a vertical sectional elevation taken approximately on line 5—5—Fig. 1, looking in the direction of the arrow.

Fig. 6 is a fragmentary enlarged view similar to Fig. 4.

Fig. 6a is an enlarged fragmentary detail of the bar carrying the dies or bushings, the section being taken on line 6a—6a—Fig. 45, looking in the direction of the arrow.

Fig. 6b is an enlarged front view of same.

Fig. 9 is a fragmentary elevational view looking from the right of the machine as shown in Fig. 1 and illustrating the friction operating means, the means for operating the movable section of the clamp table, and the front jogging means for the signatures; parts of the machine are omitted to illustrate the elements otherwise hidden.

Fig. 9a is a section on line 9a—9a—Fig. 9, showing switch contained in the clamp table and operating means for the switch contained in the swinging support for the signature stack, whereby the operation of the machine is prevented while such signature support is open.

Fig. 10 is an enlarged plan view, the view being taken along line 10—10—Fig. 9 and showing a flexibly supported means by which the operation of the frictional means for the clamp to either closed or released position may be affected either automatically or manually.

Fig. 11 is an elevational sectional view showing the reciprocable slide for the needle and punch bar, the operating cam therefor, and the means for shifting the signatures to stagger the stitches.

Fig. 15 is an enlarged plan view of the table top with the cover partly removed showing the sectional clamp table, the thread shearing or cutting mechanism in a section of the table, and operating means therefor; the view also shows the vacuum cups associated with the table for holding a sewed book thereon during the movement of the movable clamp table section.

Fig. 16 is an enlarged fragmentary section on line 16—16—Fig. 7 showing the means for shifting the signatures to stagger the stitches.

Fig. 17 is an enlarged fragmentary section on line 17—17—Fig. 7 showing means for jogging or alining the ends of the signatures.

Fig. 18 is a section on line 18—18—Fig. 16.

Fig. 19 is an enlarged fragmentary sectional side view showing mechanism for dislodging sections from the clamp head.

Fig. 20 is an enlarged fragmentary sectional detail, the section being taken on line 20—20—Fig. 19.

Fig. 21 is an enlarged plan view of the swinging table upon which is supported the magazine or stack of signatures; and it also shows the mechanism by which the stack is advanced.

Fig. 22 is an enlarged fragmentary detail showing the jogging finger for alining the signatures in the stack upon the swinging table.

Fig. 23 is a fragmentary section on line 23—23—Fig. 22.

Fig. 24 is a fragmentary side elevation partly in section, viewed approximately along line 24—24—Fig. 21, and showing the swinging table and means for advancing the signature stack therealong.

Fig. 25 is a fragmentary side elevation showing the operative position of the means for advancing the signature stack along the swinging table.

Fig. 26 is an enlarged segregated detail, partly in section, of certain essential parts of the stack advancing mechanism shown in Fig. 25.

Fig. 27 is a fragmentary rear view of the swinging stack table, showing the stack advancing means, and one of the metal separator plates which divides the stack into groups representing complete books; it also shows means for removing the metal separator plates.

Fig. 34 is a diagrammatic view looking from the left of Fig. 1 and showing chiefly the link mechanism for operating successively the switch for starting feed of signatures and the ejector shaft; the switch for starting the delivery shaft on completion of a book; and the switch for starting feed after book delivery.

Fig. 35 is an enlarged fragmentary view showing means for controlling the sewing of signatures.

Fig. 36 is a rear view of Fig. 35.

Fig. 37 is a plan section on line 37—37—Fig. 35.

Fig. 38 is an enlarged fragmentary sectional elevation, the section being taken from the inside of the machine and on line 38—38—Fig. 36.

Fig. 39 is a fragmentary rear view showing the shuttle operating lever and connection by which the machine will stop should the shuttle lever arm break.

Fig. 40 is an enlarged front view of the signature pick-up fingers.

Fig. 41 is a section on line 41—41—Fig. 40.

Fig. 42 is an enlarged section on line 42—42—Fig. 40 showing one of the vacuum cups in the end of the fingers.

Fig. 43 is an enlarged fragmentary side view partly in section, showing the paste roll and the operating means therefor.

Fig. 44 is a plan view partly in section showing the lock thread needles and the operating means therefor, and also showing a means for catching and holding the lock threads; the view is a section substantially on line 44—44—Fig. 45.

Fig. 44b is an enlarged section on line 44b—44b—Fig. 44, looking in the direction of the arrow.

Fig. 45 is a front view partly in section of the sliding frame carrying the punches and the needles and of the operating means therefor.

Fig. 45a is an enlarged fragmentary section on line 45a—45a—Fig. 44.

Fig 50 is an elevational view of another set of switches.

Fig. 51 is a section on line 51—51—Fig. 50, looking in the direction of the arrow.

Fig. 52 is a section on line 52—52—Fig. 50 looking in the direction of the arrow.

Fig. 53 is an enlarged section on line 53—53— of Fig. 34.

Fig. 54 is an enlarged fragmentary detail, partly in section, showing the solenoid for operating feed clutch; the view is a fragmentary section on line 54—54—Fig. 67.

Fig. 55 is an enlarged fragmentary detail showing the sewing ejector and delivery clutches and the solenoids for operating same; the view is substantially a section on line 55—55—Fig. 67.

Fig. 55a is a section on line 55a—55a—Fig. 48.

Fig. 56 is an enlarged fragmentary view showing the shaft and connections for operating the cutting of the threads, the clutch and solenoid for operating the clutch, and switch control.

Fig. 57 is a fragmentary section on line 57—57—Fig. 56.

Fig. 58 is a section on line 58—58—Fig. 56.

Fig. 59 is a fragmentary section approximately on line 59—59—Fig. 48.

Fig. 61 is an enlarged horizontal section on line 61—61—Fig. 7.

Fig. 62 is a plan detail of the arms for restoring the clamp table.

Fig. 63 is an enlarged section on line 63—63—Fig. 62.

Fig. 64 is an enlarged sectional side elevation showing the tension control and operating means therefor.

Fig. 65 is a section on line 65—65—Fig. 66.

Fig. 66 is a plan view of the thread tensions and control therefor.

Fig. 67 is a fragmentary plan view of Fig. 2.

Fig. 68 is a transverse section through the feed clutch and operating gear.

Fig. 69 is an enlarged sectional view of the valve for controlling the vacuum by which the joggers for the front of the signatures are operated.

Fig. 72 is a fragmentary plan view of the means for stacking finished books.

Fig. 73 is a diagrammatic illustration of the thread tension control and the circuit which is interrupted when the tension fails to operate or the thread breaks.

Fig. 74 is a similar view showing the parts in operative position and

Fig. 75 is a fragmentary detail of treadle control mechanism for sewing.

Figure 1:
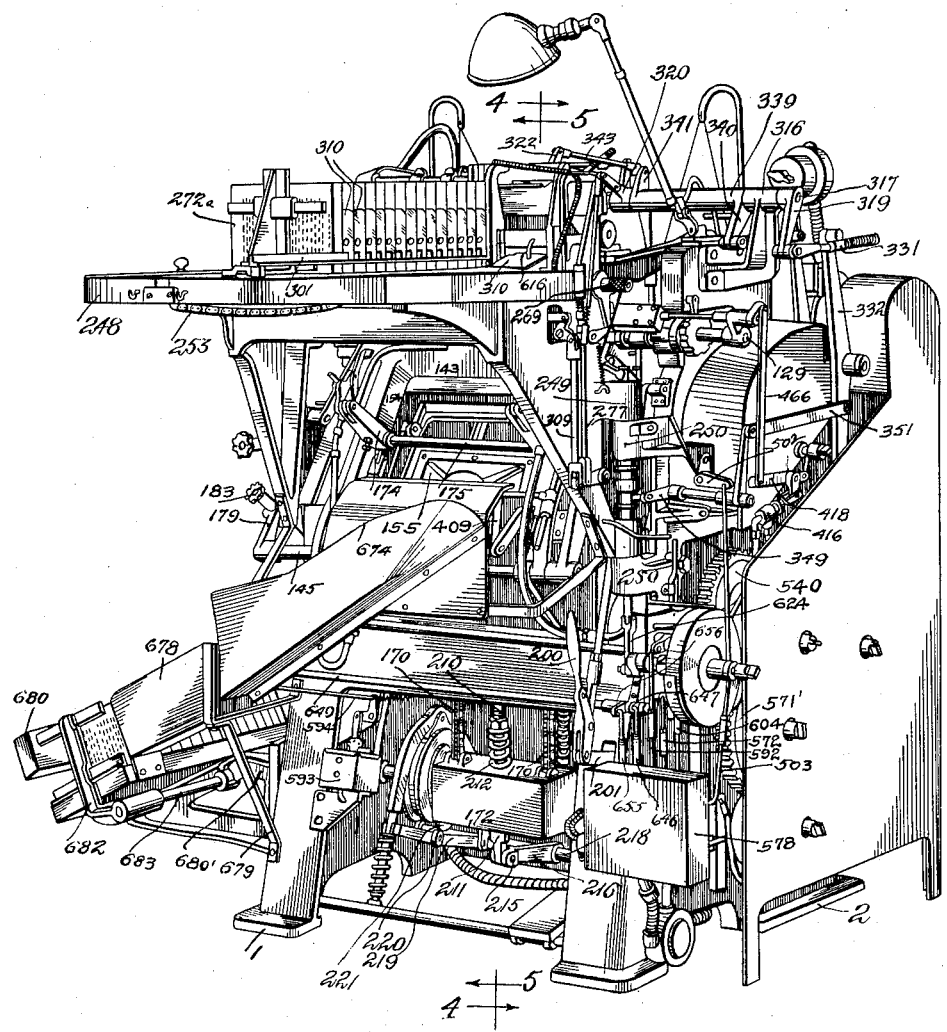
Fig. 1 is a perspective view showing a machine embodying our invention.

The invention, in its broadest aspect, consists of a series of mechanisms interdependently related to sew one signature to the next in continuous succession to make a book; in its narrower sense the invention comprises a plurality of means for sewing signatures together; means for successively feeding signatures to the sewing means, and a means for removing books of sewed signatures from the sewing machine; it also comprises electric, mechanical and vacuum means combinatively associated and interdependently actuable to control the various functions of the machine in the sequence in which they are to be performed, the successive performance of the various mechanisms being mutually interdependent whereby the failure of any one mechanism to function, either partly or wholly, brings the machine to a complete stop, and thereby prevents injury to the machine.

*Frame and sewing mechanisms*

Referring to the drawings;

Two spaced side plates or members 1 and 2 compose the essential parts of the frame, and these side plates or members 1 and 2 are conjoined in any suitable manner and by any usual means, not shown, also by a cross-member 3 onto which is secured a bar 4, formed with a face 4', at an angle to the horizontal for purposes appearing presently. The bar 4 (Figs. 6, 6a and 6b) is provided with a plurality of dies 5, held in place by screws 6 and extending for a short distance beyond, and having the same angularity to the horizontal as, the face 4' of the bar 4. Coinciding vertical perforations 8 and 9 respectively in the bar 4 and dies 5, serve as needle guides; and perforations 10 penetrating the dies 5 at an angle to the horizontal and terminating above the vertical perforations 9 in the dies 5 serve to guide and support a local signature-supporting and compression equalizing means, hereinafter more specifically referred to.

The spaced side plates or members 1 and 2 are each provided with channels 11 and 11' respectively, as shown in Fig. 44, in which is reciprocable, by means presently set out, a slide frame 12 composed of two spaced horizontal beams A and B conjoined by yokes 13, the beams A and B respectively carrying or supporting a punch bar 15 and a needle bar 16.

In the punch bar 15 is adjustably fixed a plurality of punches 17, which operate through a punch guide bar 18 that is yieldingly associated with the punch bar 15, as by springs 19, secured in the punch guide bar 18 and bearing against the underside of the punch bar 15. Headed guide pins 20 are fixedly mounted in the punch guide bar 18 and extend freely through the punch bar 15 relatively to which they are movable.

The needle bar 16 carries a plurality of adjustable needles 21, which are in direct vertical alinement with, but spaced from the punches 17, as shown.

*Operation of slide frame*

The reciprocation of the slide frame 12 is effected by cam wheels 22 and 22', Figs. 11 and 45, secured on the main drive shaft 23 which for convenience, we shall refer to as the sewing shaft, the slide frame being provided with rollers 24, which extend in the grooves of the cam wheels 22 and 22' which move the slide frame 12 in vertical strokes of varying and intermittent lengths, the periodicity of movement being governed by the cam grooves to effect the progression or sequence of steps required, in the sewing of book signatures to wit, the punching of the signatures, the introduction of the threaded needles into the perforations made by the punches in the stock or signatures, the partial withdrawal of the needles to cause the threads to form loops, and the complete withdrawal of the needles.

*The shuttle and its operating means*

In bearings 30, Figs. 44 and 45, secured to the cross member 3 is journaled a horizontal shaft 31, upon which are mounted bevel gears 32 and 33, which are in mesh with complementary bevel gears 34 and 35, respectively, secured on spindles 34' and 35' that extend transversely through, and are journaled in suitable bearings in the cross member 3. Upon these spindles 34' and 35' are mounted pinions 36 and 37, respectively, that are in mesh with horizontal racks 38 and 39, respectively, slidably contained within the cross member 3 and to which are yoked or otherwise fastened, horizontally disposed lock-thread needles 40 and 41, respectively, which are arranged to be moved periodically forth and back to supply the necessary lock threads for the loops made by the needles 21, by the rotation in alternate directions of the shaft 31, such rotation being effected by the reciprocation of a rack 42, which is in mesh with a pinion 43, keyed on the shaft 31. This rack 42 is part of a slide 42' that is operatively disposed between two spaced plates 44 and 44', Figs. 5 and 44. To said slide 42' is pivotally connected one end of an adjustable rod 45, the other end of which is pivotally attached to one end of a lever 46. The other end of said lever 46 is pivotally supported in a bracket 47, that is fixedly secured to a tie rod 48, Fig. 5, which additionally connects the side members or plates 1 and 2 of the frame. The lever 46, at a point between its ends, carries a fulcrum roller 46', that is disposed within the cam groove 49' of a cam wheel 49 keyed to the sewing shaft 23, and by which cam groove 49' the reciprocation of the slide 42' is effected, in an upward direction, to move the lock threads-carrying needles 40 and 41 through the loops E made by the partial retraction of the sewing needles 21, and in a downward direction to return the lock threads-carrying needles 40 and 41 to normal position.

As shown in Figs. 4, 5, 6, 44 and 45a, the lock or cross threads 40' and 41' pass from the spools through eyes provided in members 51 and 52 that are secured to and project from the cross-member 3, and through eyes in the shuttles or lock-thread supplying needles 40 and 41 through loops E above the signatures C. Means are provided to hold the lock threads 40' and 41' during the withdrawal of the cross-needles 40 and 41, and such means comprises a plurality of pins 53, mounted on a slide 54, operable through the cross member 3. This slide 54 is under the tension of a spring 56 by which the pins 53 are arranged to be thrust into operative position, the slide 54 being held in normally inoperative position, as shown in Fig. 44 by a spring-pressed latch 56', engaging the head 54', of the slide 54 and pivotally supported in a bracket 57 on the cross-member 3. The latch 56' has an angular extension 58 that is disposed in the path of travel of a beveled lug 59, formed on a collar 60 keyed on the shaft 31, for tripping the latch and causing the slide 54 to be projected by the spring 56, and the pins 53 to be thrust into the loops of the cross threads, shown in Fig. 44. The head 54' of the slide 54, limits the outward movement thereof.

The ejection of the pins 53, after the tightening of the loops upon the cross threads, is effected by the beveled end of a plunger 61, Fig. 45a, secured to the bar A of the slide 12 and arranged to engage the beveled portion 55 of the head 54', when the plunger 61 is moved downwardly with the bar A of the slide. Such engagement of the plunger 61 with the beveled portion of the head 54', removes the pins 53 thereof from the cross threads and resets the slide 54 as the latch 56 engages the head 54' of the slide.

Referring to Figs. 11, 5 and 6 and especially to Fig. 11, the slide 12 is shown in a position of dwell or rest during which a new signature is inserted, as later explained, for sewing upon previously sewed sections, the slide being held in such position of rest or dwell by the cam groove areas V in the cam wheels 22 and 22', which areas are concentric with the sewing shaft 23. Assuming now that the machine is in operation, and the cam wheels 22 and 22' are moving in the direction of the arrow, the cam groove areas W, and in which the rollers 24 and 24' of the slide 12 are engaged, will draw down the slide and cause the punches 17 to perforate the signatures. As the studs 24 and 24' are engaged during the continued revolution of the cam wheels 22 and 22', by the cam groove areas X the slide frame 12 is lifted to its highest position, thereby carrying and introducing the needles 21 into the perforations made by the punches 17. The cam groove areas Y thereupon draw down the slide frame for a short distance whereby the sewing needles 21 are partially withdrawn for a distance sufficient to cause the threads carried in and by the needles to form loops E, the needles and slide frame being now held in stationary position by the cam groove areas Y which as seen are substantially concentric with the sewing shaft 23. During the halt or period of dwell of the slide frame 12, the lock thread needles 40 and 41 are operated and passed through the loops E as seen in Fig. 44, and then withdrawn, by the mechanism described, and receiving its motion through the cam wheel 49 on the sewing shaft 23, after the pins 53 have been thrust through the loops of the cross threads 40' and 41' and hold the lock or cross threads during the withdrawal of the needles 40 and 41. The continued rotation of the cam wheels 22 and 22' causing the cam groove areas V to traverse the roller 24, completely withdraws the slide and the sewing needles 21 from the signatures, but immediately before the final downward movement of the slide begins and after the withdrawal of the lock thread, loops E are tightened upon the cross threads and the means for accomplishing this tightening of the loops, we shall now detail.

Loop tightening or thread tension means

Referring to Figs. 4, 5, 6 and 64, 65 designates a shaft that is oscillatably mounted in the frame members 1 and 2. To said shaft 65 is pinned or otherwise secured a pair of arms 66 and 67 carrying at their free ends a horizontal rod 68, under which pass the threads 69 that lead to and are threaded through the needles 21. The threads 69 as seen, originating from the spools 70, Figs. 4 and 5, pass through the tension devices 103, Figs. 65 and 66, later to be referred to, over a thread breakage circuit-control, also to be related in detail later, and under the horizontal rod 68 to the needles 21. On the shaft 65 is secured a lever 71, Fig. 5, the end of which is provided with a roller 72, which bears against a cam 73, Fig. 5, the engagement of the roller 72 with the cam being insured by springs 74, fastened to the arms 66 and 67 and a stationary part of the machine.

The cam 73 is composed of peripheral surfaces for actuating the lever 71, oscillating the shaft 65, and thereby causing the arms 66 and 67, to perform the function, to wit of controlling the thread tension.

Thread breakage circuit control

As heretofore related, the threads 69 pass under the horizontal rod 68 which through the means recited, is operated to tighten the loops E made by the partial recession of the sewing needles 21, upon the cross threads 40' and 41'. If for any reason such tightening of these loops or any one of them fails, as will occur when one or more of the threads break, or in the event that the tensioning means fail (to operate), the machine is instantly brought to a full stop and the means for accomplishing this, we shall now describe, reference being made to Figs. 4, 5, 6, 60, 64, 73 and 74.

To the ends of a pair of arms 75 keyed to and relatively spaced upon a trunnion 76 is secured a bracket 77 carrying a fulcrum bar 78 and a contact bar 79. Upon the fulcrum shaft 78 is oscillatably mounted a plurality of fingers 80, the front ends of which carry bushings 81, and the rear ends of which are normally held in contact with said contact bar 79 by springs 82 that are interposed between the top of said fingers 80 and a horizontal rod 83 carried in the bracket 77. The upward movement of said fingers 80 on said fulcrum bar 78 is limited by a stop rod 84 supported in said bracket. As previously recited, the threads 69 pass through tension devices 103. From these devices they pass over the bushings 81, in the fingers 80, thence under the horizontal rod 68 carried by the arms 66 and 67 and thence to the needles. As described, the function of the horizontal rod 68 is to tighten the loops upon the cross threads.

Figure 60:
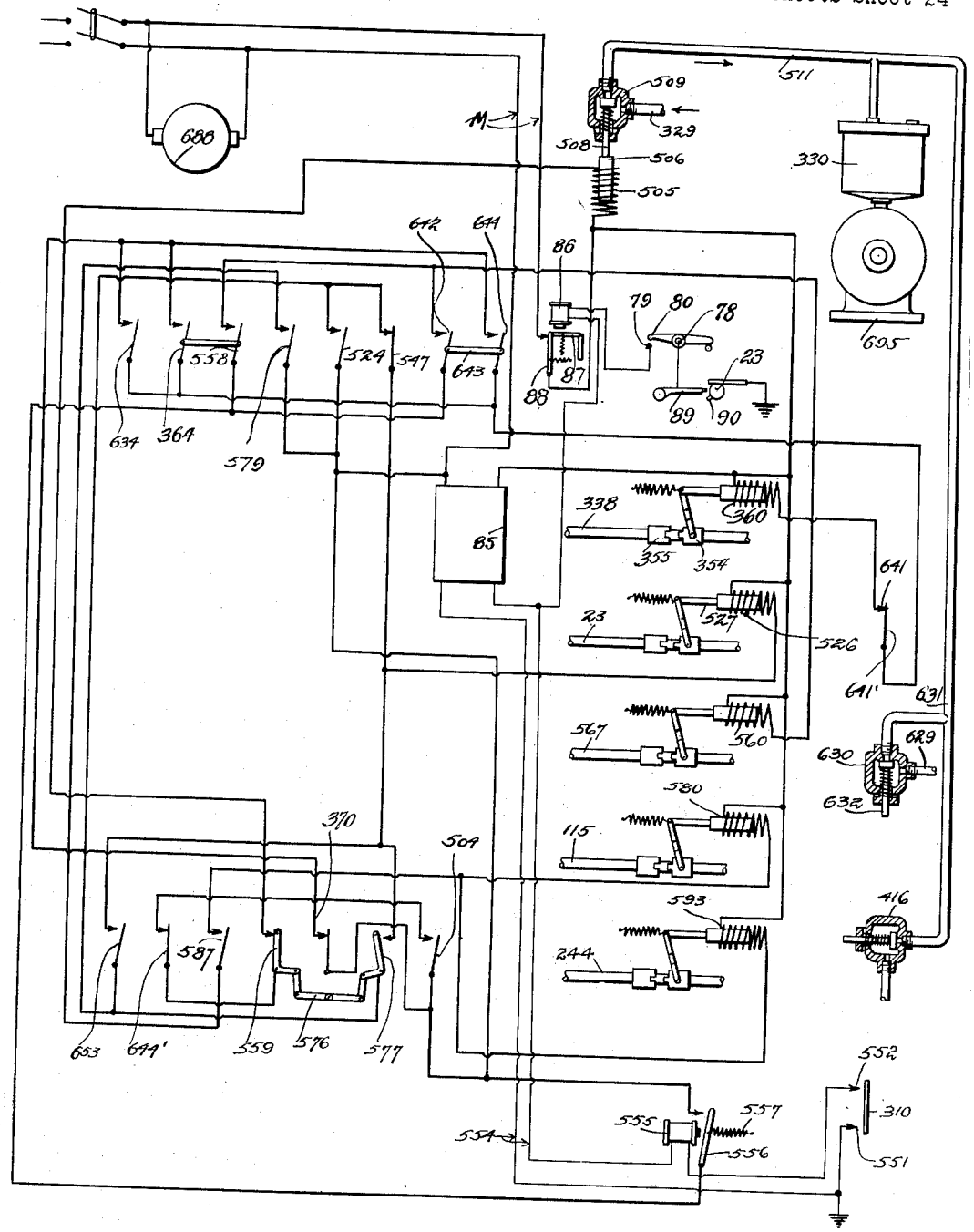
Fig. 60 is a wiring diagram for the electrical circuit.

Referring to Figs. 60, 73 and 74, it will be seen that the fulcrum bar 78 and contact bar 79 are in a secondary electrical circuit, which includes also a source of electrical energy, that may be the usual 110 volt line circuit M or primary circuit, a transformer 85, an electromagnetic coil 86, an armature latch 87 (Fig. 51) for a switch 88, an insulated contact finger 89, Figs. 73 and 74, and a grounded contact 90 on and rotatable with the sewing shaft 23 and relatively to the insulated contact finger 89.

Assuming that the machine is in operation, at the proper moment, the rod 68 will be moved downwardly to tighten the loops upon the cross threads. Such downward movement of the rod 68 exerts a pull on the threads 69 which pass over the bushings 81 and thereby rocks the fingers 80 about the fulcrum shaft 78 and against the tension of the springs 82. The rear ends of the fingers 80 at this moment are held out of contact with the contact bar 79, by the pull of the threads. When therefore the contact 90 on and rotatable with the sewing shaft 23 wipes against the insulated contact arm or finger 89, no circuit will be made. Supposing, however, that the tensioning device 103 fails to operate, or that any one or more of the threads break, it will be seen that the downward movement of the rod 68 will therefore exert no pull on the particular finger 80 over the roller 81 of which runs a loose or tensionless or broken thread. The rear end of such finger or fingers, as the case may be, will then remain in contact with the contact bar 79. When now the grounded contact 90 on the sewing shaft 23 contacts the finger 89 a circuit is completed, energizing the coil 86 which attracting the armature latch 87 that is normally held out of contact with the coil by a flat spring 87a, Fig. 51, removes it from engagement with the switch 88, which under the influence of a spring 91, is instantly removed from engagement with a contact 92, that is included with the switch 88 in the primary electrical circuit M, and such interruption of the circuit brings the entire machine to a halt.

As seen in Figs. 50 and 51, this armature latch 87 is in the form of a bell crank and is pivotally mounted at 87'. By means of a button 87'', which is fastened to one leg of the bell crank and which protrudes through a switch box 95, the armature latch may be manually operated, when required or desired to bring the machine to a stop. By means of a button 87''' also extended through the switch box 95, the actuation and setting of the switch 88 for closing the electrical circuit, may be effected.

To the trunnion 76 is keyed a lever 93, Figs. 6 and 64, which is connected with an extension 94 depending from one of the lugs 121 on the rear of the main clamp table 120, by a rod 94'. The purpose of this connection is to cause the arms 75 that are keyed on the trunnion 76 to tilt downwardly as the main plate 120 is opened and thereby to provide the necessary amount of slack in the threads 69 that are attached to a book being sewed to permit of this movement without drawing additional thread through the tensioning means which would become snarled and tangled. When the clamp plate 120 is moved back to normal position for sewing, the slack in the threads is automatically taken up as the arms 75 are tilted back to normal position.

Local signature support

We have previously herein referred to dies 5 that are secured in the cross bar or member 3 and that are provided with perforations 10 which penetrate the dies 5 at an angle to the horizontal and serve to guide a local signature supporting means during the punching of the signatures, for the essential purpose of causing the punches 17 to penetrate the stock or signatures in a straight and true line. Such local support comprises a head 96, Figs. 4, 5 and 6, formed or provided with a plurality of tines 96' that in normally inoperative position lie retracted in the perforations 10 in the dies 5 as shown in Fig. 6. The tine head 96 is secured to the ends of arms 97, that are pivotally connected to the ends of levers 98, integral with a sleeve 99, which is mounted for oscillation and fulcrums on the shaft 65. Also integral with the sleeve 99 is a lever 100, provided with a roller 100' that is disposed within a cam path 101 formed on the inner face of a wheel 102, which is keyed upon the sewing shaft 23, and which cam path 101 operates the lever 100 to cause the tines 96' to be thrust below or between and in a plane parallel with the signatures or leaves and immediately in advance of the downward movement of the punches 17. The series of tines 96' severally comprise two or a pair of tines for each punch, that is, two tines each of the series are projected under the signatures or leaves prior to the punching of the stock, so that the punches will pass through the signatures and between the projected tines 96' which furnish the necessary substantial support during the punching operation. After the punching of the stock or signatures the tines 96' are retracted by the lever 100, the roller 100' of which follows the cam groove or path 101.

Tension and tension relieving control

The threads 69, as stated, pass through spring-pressed devices 103 which impose upon them the frictional pressure required to maintain the same in tension during the sewing operation. Since these tension devices are of known construction, no detailed description of them is deemed necessary. These tension devices 103 are mounted upon a horizontal bar 104, which is secured to the side members 1 and 2 of the frame, Figs. 65 and 66, and include in their organization, stems 105 which are operable through the bar 104. The tension devices 103, which as seen in Fig. 65, consist merely of two disks between which the thread passes one of said disks having a central web 105' and being under the tension of springs 103' which normally presses one of the disks against the other.

Referring to this Figure 65, it will be seen that the ends of the stems 105 lie normally, that is, when the tension is on the threads, against the vertical flat surface 106' of a shaft 106 that is journaled for oscillation in brackets 107 projecting from the horizontal bar 104. The shaft 106 is provided with a lever 108, the end of which is connected by a rod 109 with the end of a lever 110 that is secured to a stub-shaft 111, Figs. 3, 65 and 70, journaled in the side member 1 of the frame. On the stub shaft 111 is also secured a crank 112 that is disposed in the path of an adjustable abutment 113 carried by a cam wheel 114 that is keyed upon a shaft 115, which, for the purpose of identification, we shall designate and hereinafter refer to, as the delivery shaft. The position of the crank 112 in the path of the abutment 113 is insured by a spring 116, Fig. 3, which normally maintains a lug 117, Fig. 70, on the stub shaft 111 in engagement with a stop 118 on the bearing 119 for the stub shaft 111, Fig. 70.

Figure 3:
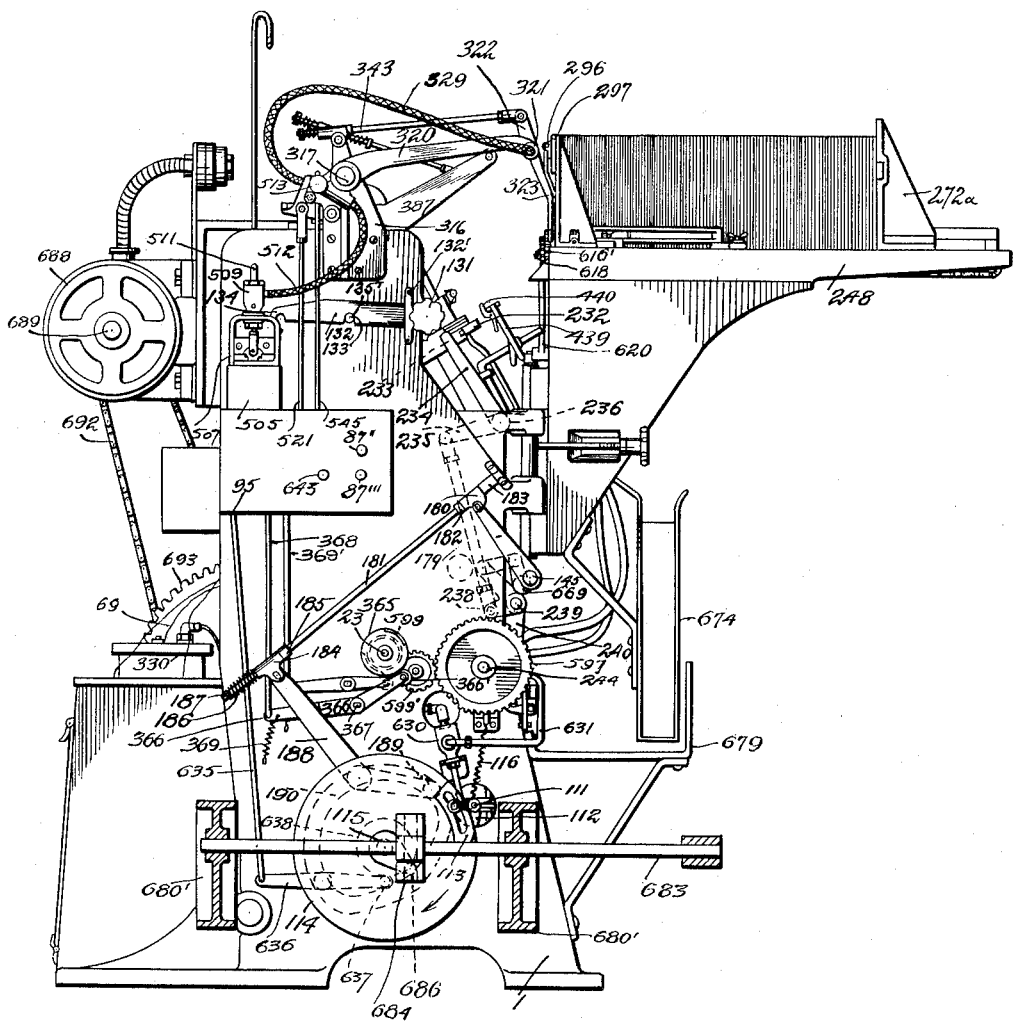
Fig. 3 is a side elevational view looking from the left of Fig. 1.

Now assuming that the machine is in operation and that the cam wheel 114 is revolving in the direction of the arrow, Figs. 3 and 65, the abutment 113 thereon operating against the crank 112, will cause the stub shaft 111 to turn, its rotative motion being communicated through the connections explained to wit, the lever 110, rod 109, and lever 108 to the shaft 106, which thereby is moved rotatively. In so doing, the flat surface 106' of the shaft 106 pushes the stems 105 which press the tension springs 103' away from one of the disks of the tension devices 103, thereby relieving all frictional pressure from the threads. This relief of the tension occurs only to provide the slack necessary when a sewed book is to be delivered, as later explained, and it will be obvious that such relief of the tension may be accomplished by manual operation, when for any reason it is required.

*Clamp table*

Referring to Figs. 4, 5, 6, 7, 8, 15, 61 and 64, the main portion of the clamping arrangement is shown at 120 and consists of a plate provided with lugs 121 by which it is supported and arranged to swing upon a stationary fulcrum shaft 48, secured in the side frame members 1 and 2. This plate 120 is provided with side walls 123 at right angles to the plane thereof and with a stationary clamp head 124, a space or opening 125 being provided in the top portion of the plate 120 for the accommodation of a support for the back of the signatures which in this type of sewing, lie at an angle to the horizontal and with respect to the punches and needles. The support, Fig. 64, comprises an angle plate 126 secured to the underside of the clamp head 124 and to the face of the main plate 120 and the angle of which plate projects through the opening 125 in the plate 120. The portion 126a of the plate 126 against which the edges of the signatures to be sewed rest is provided with openings 127 into which the dies 5 extend and the portion 126b that projects beyond the clamp head 124 is provided with a longitudinal slot 128 through which the punches and needles are arranged to pass, Fig. 64.

In order to prevent a shifting or displacement of the book-signatures as they build up in the making of a book, the instability of which is occasioned by the variation in thickness between the sewed edge and the plane of the signatures, we provide a means whereby a supplemental pressure is automatically imposed upon the signatures during each clamping movement of the clamp table. By preference, we have adopted the means shown in Figs. 6 and 12 and comprising a plate 800 provided on the underside of the clamp head 124. This plate 800 is provided with a plurality of rivets 802, having threads 803, by which the rivets 802 are held associated with the clamp head 124 in such wise that they may move relatively thereto. The plate 800 that is provided with rivets 802 is held projected normally beyond the head 124 by a series of coil springs 805, that are disposed in a cavity 806 in the clamp head 124. It will be observed that the point of engagement of the plate 800 with the signatures as shown in Fig. 6 is outwardly of and parallel with the sewed edges thereof. The function therefore of this plate is to impose a pressure upon the area of the signatures that is not sewed, at the same time that the sewed area is subjected to the pressure of the clamp. Thus the imposition of this supplemental pressure through the plate 800 may occur coincidentally with the subjection to pressure by the clamp of the sewed edge, or it may occur in advance of latter pressure. In either event the supplemental plate pressure is an active one at all times and is sufficiently high to prevent displacement or shifting of the signatures during the punching and sewing operation. Thereby the liability of breaking punches and needles is greatly minimized. The plate 800 and its associate parts are also illustrated in Figs. 4, 5 and 6.

Means are provided to hold the main plate 120 which includes the clamp head 124, in secure position during the operation of the machine. The clamp head 124 is provided with extensions 129 on each end, Figs. 7 and 8, that are arranged to fit in recesses 130 in the side members 1 and 2 of the frame, Fig. 7. On the extensions 129 are oscillatably mounted knobs 131, with which are connected latch arms 132, each formed with an intermediate notch 133, Fig. 3, and with hooked ends 134, that are arranged for engagement with the ends of a shaft 135 journaled in and projecting beyond the side members 1 and 2 of the frame, this engagement of said hooked ends limiting the outward movement of plate 120 and its complementary parts about the fulcrum or tie bar 48. The arcuate movement of these latch arms 132 is limited by retaining members 132', Figs. 3, 8 and 9, secured to the outside of the frame members 1 and 2, this provision being necessary to insure positively the engagement of the hooked ends 134 of the latch arms with the eccentric ends 135' of the shaft 135, when the plate 120, mounting the clamp table is swung about the fulcrum or tie bar 48, to the position illustrated in Fig. 8. The protruding ends 135' of shaft 135 are eccentrics which are designed to fit in the notches 133 formed in the latch arms 132 for the purpose of locking home the plate 120 and its associated parts, by the following means, reference being had to Figs. 4, 8 and 9:

Upon a tie rod 136, carried by the side frame members 1 and 2, is fulcrumed a hand lever 137, to one end of which is pivotally joined a link 138, pivotally connecting with an arm 139, that is fixedly mounted upon the shaft 135. By turning the shaft 135 in one direction, through the hand lever 137, the eccentrics 135' draw and lock the main plate 120 in position, and by turning the shaft 135 in the opposite direction, the latch arms 132 are unlocked.

Figure 7:
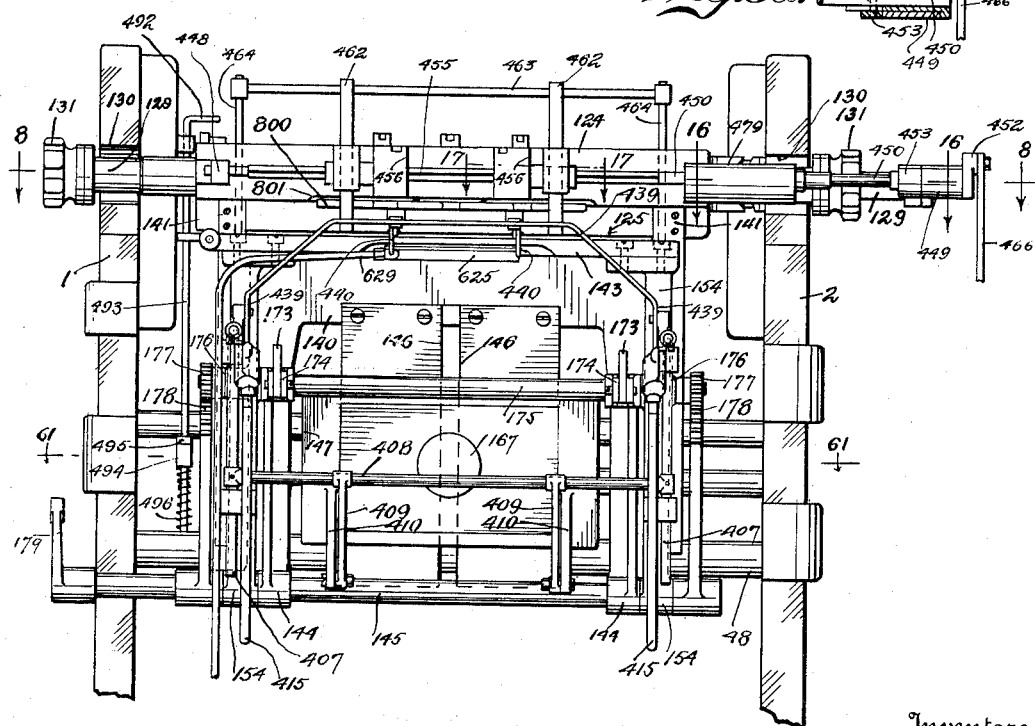
Fig. 7 is a detailed front view of the complete clamping and shifting mechanism for the signatures, also the front and end jogging means for the signatures, and also of the sectional swinging portion of the clamp table and the operating means therefor.

The main plate 120 with its side walls 123 supports and forms a slide way for that portion of the clamp table designated at 140 and consisting of a substantially cross sectionally U-shaped plate which is held in slidable relation to the main plate 120 by gibs 141, Fig. 15. The clamp table plate 140 is provided at the top with a shear bar 142, the top surface of which co-operates with the clamp table portion 143 to form a support or table for the signatures. The clamp table plate 140, Fig. 7, is provided with spaced bearings 144 which support a shaft 145; it is also provided with flat spaced bars 146, which extend through a friction box 147, Fig. 61, through the medium of which the shear bar 142 and its co-operating portion 143 are operated to clamping and unclamping position. This friction box 147, the composition of which will be presently described, is connected with the main plate 120 for sliding movement relatively thereto, and for this purpose is provided with lateral extensions 148 that are operably disposed in guideways formed on the main plate 120 by gibs screwed or otherwise attached thereto.

The support for the friction box 147 comprises a link 149, Figs. 4 and 6, that is pivotally connected at one end to the back of the friction box 147 and at the other end is pivotally connected to one end of a bell-crank lever 150, suspended from and fulcrumed in ears 151 that are fixed or provided on the tie bar 43; the other end of said bell-crank lever 150 is provided with a roller 152 that is disposed in a cam groove 153' in the cam wheel 153, which is keyed to the sewing shaft 23 and which cam groove 153' oscillates the bell-crank lever 150 and thereby reciprocates the friction box 147, in an upward direction to move the clamp table, which comprises the parts 140, 142 and 143, to clamping position and in another direction to move the clamp table parts to unclamping position. The clamp table complement 143, which as stated, co-operates with the shear bar 142 to form a unit clamp table, surmounts and is removably secured to a pair of spaced arms 154, which are mounted upon the shaft 145, upon which are also mounted the spaced bearings 144 of the clamp table plate 140, as stated. The individual or separate mounting of said arms 154 carrying the clamp table complement 143 is for the purpose of enabling said table complement to swing about the shaft 145 and relatively to its complement which is the shear bar 142. This is necessary when a finished or completely sewed book is to be delivered, that is, removed from the punching and sewing area and ejected from the machine, as hereinafter pointed out.

The friction box 147 contains a pair of friction plates 155, Fig. 61, that are faced with liners 156 to insure a firm hold upon the flat spaced bars 146, secured to the clamp table plate 140 and passing between said liners, when said friction plates 155 are operated to grip said bars. These friction plates are operable for this purpose by a draw bolt 157, which extends through the friction plates 155, through the space between the flat bars 146 and through the friction box 147. On one end of the draw bolt 157 is secured a stirrup 158 having an aperture 159, a portion of which is found and another portion of which is flat, as seen at 160, for the accommodation of a bar 161, which in the area contained within the aperture 159 of the stirrup 158 is also provided with a flat surface, 162. The bar 161 is journaled in bearings formed by extensions 163 on the rear of the box 147, and in the areas defined by the bearings 163, is formed with flat surfaces 164 on the side of the bar opposite to the flat portion 160. In contact with the bar 161 is a plurality of pins 165, that are disposed in openings 166, penetrating one wall of the bearings 163 and contacting the rear or back presser plate 155. The axial rotation of the bar 161 in one direction therefore, by the means hereinafter described, causes the round portion of the bar to exert a pull on the draw bolt 157 and upon the top presser plate, while at the same time pushing the pins 165 against the bottom presser plate. In this wise, the presser plates 155 are caused positively to grip the flat spaced bars 146, with a pressure that is predetermined by a head 167, that is adjustable on the draw bolt 157 and operable against the top presser plate. When the axial movement of said bar 161 occurs in another direction so that the flat surface 162 thereon is parallel with the flat surface 160 of the stirrup 158, and the flat surfaces 164 thereon are in direct alinement with the ends of the pins 165, the pressure of the presser plates 155 is relieved from the spaced bars 146 and in order that such pressure relief will be positive and that adherence of the liners 156 to the flat bar 146 will be positively prevented, springs 168 are provided, these springs being interposed between and forcing the presser plates 155 apart and away from the flat bars 146. On the ends of the flat bars 146, that project beyond the friction box 147, are secured members 169, Figs. 4 and 6, to which are connected chains 170 running over sheaves 171 on the fulcrum shaft or bar 48. The ends of the chains 170 are connected to a weight 172 which counterbalances the clamp table, represented by the co-operating parts 142 and 143, when the pressure of the presser plates 155 is relieved.

It will be observed that the operation of the clamp table—the co-operating parts 142 and 143—is effected solely through the friction box 147 and the flat bars 146 of the plate 140, upon which bars 146 the friction plates have been pressed, by the means presently described. When such pressure of the friction plates upon the bars has been applied, the upward movement—to clamping position—and the downward movement—to unclamping position—of the clamp table 142—143, is accomplished by the operation of the friction box 147, through the medium of the bell-crank lever 150 and the cam groove 153' which operates it. During the substantially vertical movement of the clamp table part 142, the complementary clamp table part 143 is also moved, since as described, the bearings 144 on the plate 140 carry the shaft 145 to which the arms 154 of the table complement 143 are connected for pivotal movement relative to its companion part 142. As the thickness of the book being sewed increases, the increased pressure beyond that established by the friction plates causes the flat bars 146 connected to the plate 140, Fig. 7, to slip relatively to the friction plates 155, while at the same time always maintaining upon the signatures a continuing pressure. The clamp table complement 143, being designed, as stated, to swing upon the shaft 145, when a sewed book is to be delivered, that is, removed from the clamp table, is locked in position during the operation of clamping, and moved outwardly or away from the clamp table part 142, by the following means, see Figs. 7, 9 and 12. The clamp table 140 pivotally mounts upon its face and at the sides thereof a pair of links 173. To the ends of said links 173 are pivotally conjoined a pair of arms 174. The rear ends of said arms are pinned or keyed upon a horizontal shaft 175, that is oscillatably carried in bearings 176 provided on the arms 154 of the clamp table complement 143. On the ends of said shaft 175 are secured pinions 177, Figs. 7, 9 and 12, in mesh with which are segmental gears 178 that are keyed or otherwise secured upon the shaft 145. This shaft 145 is provided with a lever 179, Figs. 3 and 12 to which is pivotally connected a sleeve 180. Through this sleeve 180 extends one end of a rod 181 that is provided on one side of the sleeve with a stop member 182 and on the other side of the sleeve with a hand nut 183 which threads upon the rod 181 and locks the sleeve 180 in position upon the rod. The other end of the rod 181 extends through a sleeve 184, Figs. 3, 12 and 34, that is held in yielding engagement with a stop member 185 by a spring 186, coiled about the rod 181, the tension of which is regulated by a nut 187. The sleeve 184 is pivotally connected to a bell-crank lever 188 that is fulcrumed in the side frame member 1. On the end of said bell-crank lever 188 is journaled a roller 189 that tracks in a cam groove 190 on the inner face of the wheel 114, which as heretofore described is keyed to the delivery shaft 115.

Figure 12:
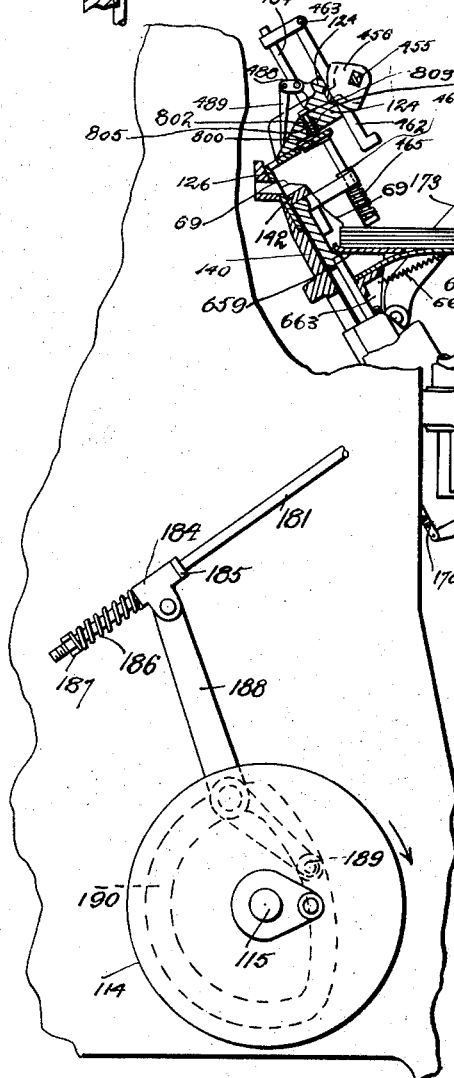
Fig. 12 is a fragmentary side elevation partly in section showing the movable section of the clamp table in open position and the means for moving same to open position; it also shows a book of sewed signatures removed from the movable clamp section and the shelf upon which it is received, preparatory to dumping the shelf.

When the parts just described, 173—190, are in the position substantially as illustrated in Figs. 3, 4, 5, 6 and 9, the centers of movement of the links 173, arms 174 and shaft 175 are in alinement, and when these parts are on dead center, as shown, the clamp table complement 143 is positively locked against any independent rotative movement relative to the clamp portion 142, such locking being insured so long as the roller 189 on the end of the bell-crank lever 188 tracks or remains in the concentric portion of the cam groove 190, of the wheel 114. Since the relative movement of the table complement occurs only when a completely sewed book is to be carried by said table complement 143 out of the sphere of the sewing mechanism for subsequent discharge into a stacker, the shaft 115, which for convenience, we have designated the delivery shaft, remains inactive during the sewing operation. The initiation of its motion is synchronized with the completion of the sewing operation for each book and the means by which this shaft is set in motion at the proper moment will be detailed later. Presently it will be assumed that the shaft 115, and the cam wheel 114 mounted thereon are at rest and that the roller 189 is in the concentric area of the cam groove 190 which insures that the links 173, the arms 174 and the shaft 175 are on dead center, whereby any relative movement of the table complement 143 is positively prevented. Assuming that a book has been sewed, is ready for removal from the sewing mechanism and that the delivery shaft 115 has been set in motion, in the direction of the arrow indicated in Fig. 12, the roller 189 tracking then in the eccentric groove of the wheel 114, will move the bell-crank lever 188, about its fulcrum. The motion of said lever 188 will then be transmitted, through the rod 181, to the lever 179, and the shaft 145 upon which it is mounted, will be turned. So doing, the segmental gears 178 thereon will rotate the pinions 177 which are in mesh with the segmental gears 178 and which are keyed upon the shaft 175, as are also the arms 174. The rotation of the shaft 175 lifts the ends of the arms 174, that are pivotally connected to the links 173, and breaks the dead center position of the links, arms and shaft. As the shaft 175 is rotated, it is also moved in an arcuate path by and with the segmental gears 178, carrying with it the table complement 143 which, as related, pivots independently on the shaft 145. The open position of the table complement 143 is shown in Fig. 12, and it remains in this position during the traverse of the roller 189 in the cam area of the groove 190, whereupon it (the table complement) is returned to closed position and locked in such position as the roller 189 enters the concentric groove portion and the pivotal points of the links, arms and the shaft are again on dead center.

In case of a jam or interference with the regular sequential operation of the machine, as may occur when the threads, or any one of them, catches in a broken needle or becomes entangled and therefore prevents the sewed books from moving with the table complement 143, it is necessary to rotate the shaft 145 manually in order to break the dead center position of the pivots; connection between the links 173, arms 174 and shaft 175 and thereby enable the table complement 143 to be moved manually away from its companion part 142, it being understood that this table complement 143 is rigidly locked in position by the link 173, arms 174 and shaft 175 and maintained in this rigid position automatically by the bell-crank lever 188 and cam groove 190, as previously explained. For this reason we provide the hand nut 183 which when removed from the rod 181, permits the lever 179 to be pulled outwardly manually producing thereby a rotation of the shaft 145 and the parts connected with it, as already explained.

It will be seen from the description that the clamp table which comprises the shear bar 142 surmounting the plate 140, the table complement 143, surmounting the arms 154, and the shaft 145, is movable in a straight line by the friction box 147, when the friction plates 155 thereof are pressed in engagement with the flat bars 146 that are connected to the plate 140; it will also be seen that these friction plates 155, move relatively to the flat bars 146 as successive signatures are sewed together and the book thickness increases, thereby maintaining a continuing pressure upon the signatures during the punching and sewing operation. It will also be seen that the clamp table complement 143 which includes the arms 154 is movable about the axis of the shaft 145, when the removal of a sewed book out of the region of operation of the sewing mechanism is to be effected.

Obviously before a sewed book may be removed, the clamping pressure of the clamp jaw co-ordinates 142—143 must be relieved and such relief occurs in the normal operation of the machine whenever a new section or signature is to be delivered to the clamp table in the building or making of a book, or whenever a completely sewed book is to be removed, and this operation of the clamp jaw for this purpose is effected by the periodical tilting of the bell-crank lever 150 which is connected with the friction box 147 and with the cam groove 153. During the making of a book by sewing sections successively on previously sewed sections, the clamp jaw complements 142—143 move in and relatively to the main plate 120 as the book increases in thickness, each section added causing the clamp jaw 142—143 to yield as the clamping pressure overcomes or exceeds the friction pressure of the plates 155. When a book of sewed signatures or sections has been made and removed from the clamp jaw, by the means detailed later, the space between the clamp jaw 142—143 and the co-operating head 124, represents approximately the thickness of the book. In order therefore that the continuation of the sewing operation of other signatures in the making of another book can take place it is necessary to restore the clamp table units 142—143 to normal or original position and such restoration is accomplished by the means and in the manner presently described, after the pressure of the friction plates 155 has been relieved from the flat bars 146.

Friction relief

The bar 161, Figs. 9, 10 and 61, which as heretofore described, is carried by the friction box 147 and is oscillatable to effect the engagement or disengagement of the presser plates 155 with the flat clamp table bars 146, is provided at one end thereof with a head 191 having a kerf 192, in which is slidably contained a key 193. This key 193 is carried by and is connected to a suspender 194 hanging from the frame member 2, by a trunnion pin 195 upon which it pivots; and it is provided with an extension 196, for pivotally mounting a clevis 197, to which is secured one end of a rod 198. The other end of said rod 198 is secured to a member 199 to which is pivotally connected at a point between the ends thereof, a hand lever 200, the one end of which is pivoted to a lever 201, and the other end of which forms the handle, Fig. 9. The lever 201, is fulcrumed on a stud 202, mounted in the side frame member 2, and its end is provided with a roller 203 that is disposed and tracks in a cam groove 204 in a wheel 205 which is keyed to the delivery shaft 115. When the parts just described are in the position shown in Fig. 9, it will be seen that the pivot for the clevis 197, the pivot for the hand lever 200 and the fulcrum for the hand lever 200, which is the connection with the lever 201, are in a straight line, this position of the hand lever 200 being insured by a latch 206 which is held in engagement with an abutment or stud 207, Figs. 4 and 9, on the rod 198, by a spring 208, and which is formed with a finger or thumb piece 209 by which it may be operated. In the position of the parts shown in Fig. 9, the rotation of the cam wheel 205 will rock the lever 201, the motion of which will be communicated to the rod 198 and to the key 193, which being turned relatively to its supporting trunnion pin 195 and engaging the kerfed head 191 thereon, will turn the bar 161, thereby relieving the pressure from the friction plates 155 and leave the flat bars 146 free and held in position only by the counter-balancing weight 172. Obviously when the bar 161 is rotated in the direction opposite from that just described, the plates 155 are again frictionally applied and this occurs automatically, and, as stated, whenever a restoration of the clamp jaw units 142—143 is required after a sewed book has been delivered. By means of the hand lever 200, the relief of the presser plates 155 may be accomplished manually, when desired or necessary, it being apparent that a pull on the hand lever 200, after the latch 206 has been opened, will cause the rod 198 to be drawn downwardly, thereby rotating the key 193 in identically the same manner and with the same result as effected by the lever 201 in an automatic fashion. The construction of the kerfed head 191, key 193 and hanger 194 is such that they remain in their interengaged position during any movement of the clamp table plate 120 and the associated clamp complement 142, which carries the friction box 147 and its component parts, relative to the frame plate 2, from which the hanger 194 depends.

It will be observed that, as the clamp table 142—143 is elevated to clamping position, the shaft 161 with its kerfed head 191, moves relatively to the key 193, the shaft 161 then being out of alinement with the bearing or trunnion stud 195. The actual rotation of the shaft 161 to relieve the presser plates 155 from the bars 146 and to actuate the presser plates to frictional engagement with the bars 146, occurs when the bearing or trunnion stud is in alinement with the shaft 161. When the pressure of the presser plates has been relieved, the flat bars 146, which form an integral part of the table complement 142, being free, are now moved back to original position for the purpose of clamping signatures that are to make another book, and we will now describe the mechanism and the manner of accomplishing the restoration of the clamp table.

As previously pointed out, the flat bars 146 which form a part of the table complement 142 and which extend between the friction plates 155 in the friction box 147 are balanced by a weight 172, suspended on chains 170 that are connected to members 169 fastened to the ends of said flat bars 146, Figs. 1, 4 and 5. Extended centrally and vertically through the weight 172, is a bolt 210, Figs. 62 and 63, provided on the bottom with a shouldered enlargement 211, against which the bottom of the weight contacts, without however being supported thereby, the support for said weight being provided by the chains 170 as explained. The engagement of the shouldered enlargement 211 with the weight 172 is insured by a spring 212, coiled about the upper part of said bolt 210 and seated in a socket 213 provided therefor in the weight, and exerting tension against a nut 214 adjustably connected with said bolt 210. The shouldered enlargement 211 has an aperture for a pin 215 by which it is pivotally connected to an arm 216 that forms an integral part of a sleeve bearing 217 which is mounted for oscillation upon a tie rod 218 secured and supported between the frame plates 1 and 2. Also integral with said sleeve bearing 217 is a lever 219, having a roller 220 that is disposed within the path of movement of a cam 221 secured to the delivery shaft 115, and shown in normally inoperative position in Fig. 5, in which position the cam 221 remains during the entire operation of sewing a book and during which, as the clamp jaw complements are depressed by the increasing book thickness, the weight 172 is elevated. The revolution of the delivery shaft 115, at the time required, which is after the completion of sewing a book, and through the means detailed later, causes the cam 221 to engage and depress the roller 220 on the lever 219 and thereby to depress also the arm 216, that is integrally connected with the sleeve bearing 217 and with the bolt 210. The weight 172 is thereby pulled down and the chains 170, riding over the sheaves 171 elevate the flat bars 146 and the table complement connected with them, the elevation of the flat bars 146 being limited by the stop members 169 provided thereon, and any movement of the arm 216 downwardly beyond that necessary to restore the table complements being absorbed by the spring 212. It may be stated here that the clamp jaw complements 142—143 when restored are approximately three quarters of an inch removed from the clamp head 124, this being necessary to provide the space for the signature feed fingers, as presently explained.

*Thread cutter*

Figure 13A:
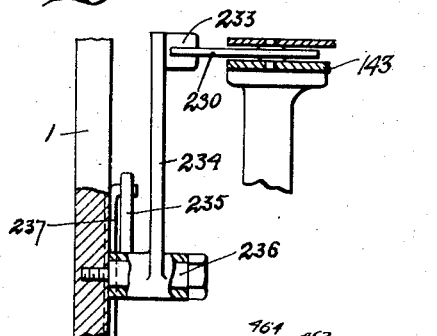
Fig. 13a is an enlarged section approximately on line 13a—13a—Fig. 15, showing the means for operating the thread cutting mechanism.

Referring to Figs. 6 and 15, and in connection therewith to Figs. 3, 4 and 5, the under edge of the shear bar 142, which is secured to the top of the clamp plate 140 by screws, as shown in Fig. 15 co-operates with a shear blade 222 carried by the table complement 143 to cut the threads after a sewed book has been removed from the sewing mechanism and after the threads to which the sewed book is still connected have been locked or caught in the first signature of a new book, as hereinafter explained. The blade 222 is secured to the tapering face of a support 223 that overhangs the rear edge of the clamp table or table top, see Fig. 15, and that is provided with rearwardly extending branches or guides 224, having notches 225 for purposes to appear presently. The branches or guides 224 of the support 223 are disposed and operable in grooves or recesses 226 formed in the clamp table top 143, by toggles 227 that are fulcrumed in a chamber 228 in the table top 143 and that are provided with intermeshing teeth 229. The other ends of said toggles 227 are disposed in the notches 225 of the branches or guides 224. The support is operable to cause the blade, which as seen is at an angle to the shear bar 142, to shear the threads, by a lever 230 fulcrumed in the recess 228 which is part of the chamber in the table top 143, one end of this lever being engaged in preferably a notch 231 in one of the branches or guides 224, and the other end of said lever 230 being under the tension of a spring actuated detent 232 to maintain the shear blade 222 and its support in retracted or inoperative position, as shown in Fig. 15. Said other end of the lever 230 is also disposed in the path of movement of an extension 233 formed on one leg 234 of a bell crank that is journaled upon a stud 236 secured in the frame plate 1, Figs. 3, 13 and 13a. This leg 234 is operable through the connection presently related, against the lever 230 to move the shear blade and its support relatively to the table top 143, and in order that the pressure of the lever 230 against one of the branches or guides 224 of the support may be transferred equally to the companion branch or guide 224, we have provided the toggle mechanism 227, already referred to. The other leg 235 of the bell crank is connected by a rod 237 with one arm 238 of a bell crank which is secured to a stub shaft 239 journaled in a bearing that is mounted upon the frame plate 1. The other arm 240 of the bell crank is provided with a roller 241, Figs. 13 and 34, that tracks in a cam groove 242 of a wheel 243 journaled on a stud 244, the rotation of said wheel 243 at the proper moment with its cam groove 242, rocking the bell crank arms 238 and 240 and thereby causing the shear blade 222 to sever the threads.

By means of a series of flat springs 245 fastened on the underside of the table 143, Fig. 15 and projecting beyond the rear edge thereof, pressure is exerted upwardly against the shear blade support 223 and shear blade 222 and these springs insure the shearing action between the blade 222 and shear bar 142. The table top 143 is provided with a cover 246, Figs. 4, 5, 6 and 15.

*Section support and advancing means*

Figure 2:
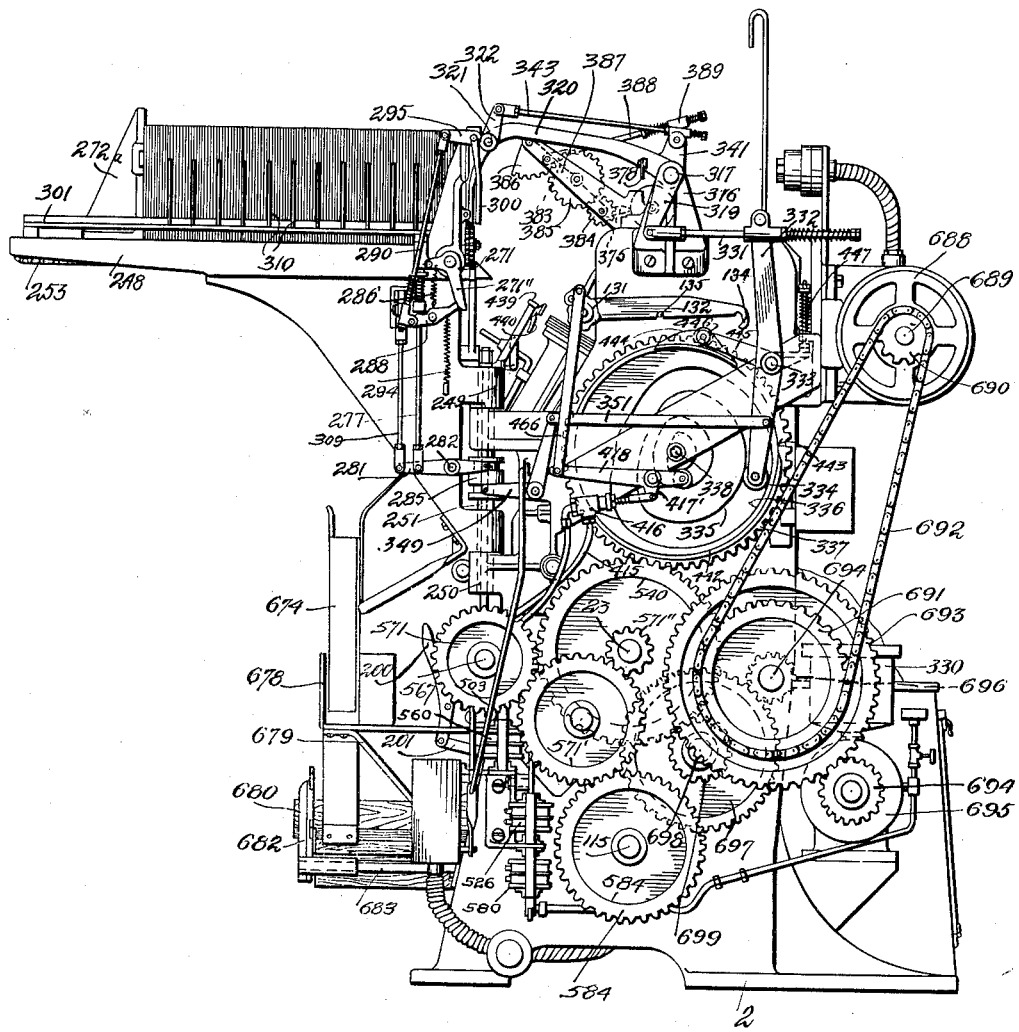
Fig. 2 is a side elevational view looking from the right of Fig. 1.
Figure 31:
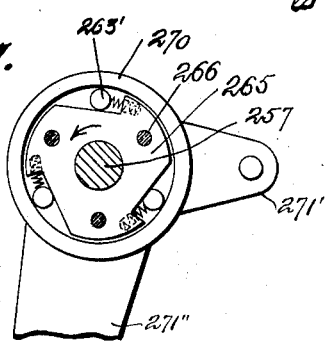
Fig. 31 is an enlarged section on line 31—31—Fig. 29, looking in the direction of the arrow.

Referring to Figs. 1, 2, 3, 4, 5, 21, 22, 23, 24, a support is provided for the signatures or sections that are to make up a book and this support consists of a table 248 that is provided at one side with spaced lugs 249 co-operating with spaced lugs 250 on the frame member 2, Figs. 1 and 2, to support said table, hinging connection between said lugs 249 and 250 being provided by a hollow hinge pintle 251, secured to the lugs 250 on the frame member 2. The table surface is provided with a central longitudinal groove 252 forming a trackway for the upper course or section of a chain 253 that runs over a sprocket 254 journaled in a slot 255 in said table 248, and a sprocket 256 pinned to a horizontal shaft 257, which extends transversely of and is supported in bearings 258 and 259, Fig. 27, underneath the swinging table 248. The bearing 259 is a tubular extension of a clutch member 269, Fig. 29, that is loosely carried upon the shaft 257, the tubular extension 259 operating in a bushing 261 and being held against movement relatively thereto by a collar 262 set upon the tubular extension and against the bushing 261. The clutch member 260, seen in Fig. 30 is a disk having peripheral tangential planes 262', upon which are disposed spring pressed rollers 263. The clutch member 260 with the rollers 263 is surrounded by a clutch complement 264 that is fixedly mounted upon the table 248. The clutch member 260 is united or joined with a similar clutch member 265 by pins or rivets 266. This clutch member 265 is loosely mounted upon the shaft 257 and is provided with a tubular extension 267 formed on the end thereof with notches 268 with which are arranged to engage projections 269' on a hand clutch 269 that is feather-keyed to the shaft 257, Fig. 29. Surrounding the clutch member 265 and the rollers 263' is a complementary clutch member 270, which is held against lateral movement relatively to the clutch member 265 by a collar 265', the clutch member 265 in construction and design being identical with the clutch member 269; they are disposed upon the shaft 257 in identically the same relation but they operate in reverse relation as shown in Figs. 30 and 31. The complementary clutch member 270 is provided with a bell crank 271 for purposes presently appearing.

Figure 29:
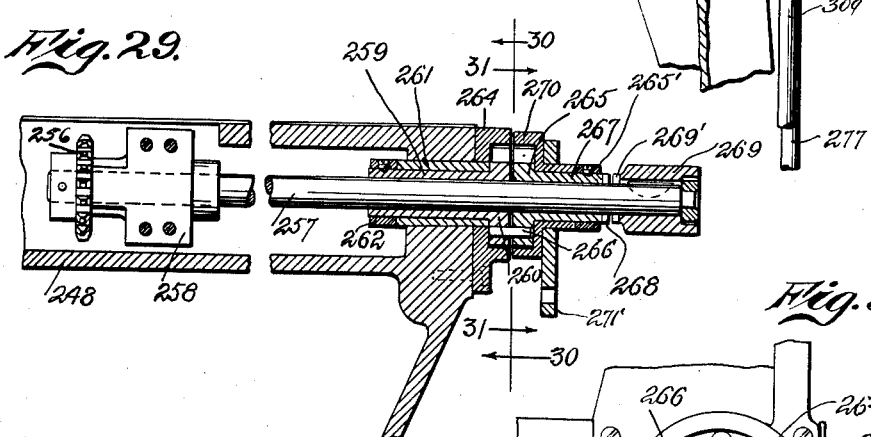
Fig. 29 is an enlarged section on line 29—29—Fig. 28, looking in the direction of the arrow.
Figure 30:
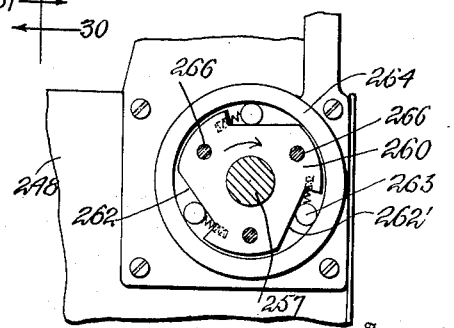
Fig. 30 is an enlarged section on line 30—30—Fig. 29, looking in the direction of the arrow.

In the position of the parts illustrated in Fig. 29, it will be seen that the hand clutch 269 is disengaged from the notches 268 in the end of the tubular extension 267 of the clutch member 265. In this position of the hand clutch, the shaft 257 may be rotated by the hand clutch in either direction, as desired, thereby to move the chain 253 in either one direction or the other. When, however the hand clutch member 269 is engaged with its complement 268, it will be seen that as the bell crank 271 is moved in one direction, say to advance the book sections on the hinging table, the clutch complement 270 will co-operate with the clutch member 265 through the rollers 263' and thereby rotate the shaft 257 forwardly, but any rearward rotation even for a negligible distance is precluded by the companion clutch members 260 and 264 which instantly interlock so soon as there is any tendency for the shaft to rotate in a reverse direction.

By means of a follower 272a, that is arranged to be moved along the surface of the table 248 by the chain 253, in the manner and by the means presently referred to, the series of signatures or sections are advanced with periodical regularity for delivery to the sewing mechanism in steady sequence during the making of a book. For this reason it is necessary that the signature to be delivered be accurately in position for pick up by the delivery mechanism at the proper moment and to accomplish this and also to compensate for variations in the signatures or sections thickness, we provide the following mechanism. One arm 271' of the bell crank 271 is pivotally connected to a sleeve or clevis 272, Figs. 24, 25 and 26, and the other arm 271" of the bell crank is provided with a series of steps 273. Through the sleeve 272 is extended a tubular member 274, of greater longitudinal extent than the sleeve 272, said tubular member provided with a shoulder 275 at the bottom. A collar 276 is secured by a pin 278 to a rod 277 which extends through the tubular member, the collar 276 being provided to limit the movement of the sleeve 274 relatively to the rod 277, the normal position of the sleeve 274, that is, with its shoulder 275 spaced from the bottom of the sleeve 272 being that shown in Fig. 26. Between the bottom of the shoulder 275 and a stop collar 279 pinned upon said rod 277 and coiled thereabout is a spring 280. The end of the rod 277 is pivotally and adjustably secured to one end of a lever 281, Figs. 32 and 33, that is fulcrumed upon a stud 282 on the hinged table 248. The other end of said lever 281 is provided with a roller 283 that is disposed in a horizontal annular groove 284 of a sleeve 285, which surrounds a hollow hinge pin 251 and is operable vertically relatively thereto, by means presently described, the swinging movement of the table 248 being permitted by this connection of the lever 281 with said sleeve 285. The arm 271' of the bell crank is under the tension of a spring 286, which holds the other arm 271'' thereof normally against a step or limiting device 287, Figs. 24 and 25, secured to the side of the table 248. Pivotally mounted upon the side of the table 248, is a pawl 288, one end of which is disposed in operative relation to the stepped end 273 of the bell crank, and to the other end of which is pivotally connected a sleeve 289, through which is extended a rod 290, provided with a collar 291 and having a spring 292 coiled about same and between the sleeve 289 and a collar 293, whereby the upward motion of the pawl 288 is communicated to the rod 290 yieldingly through the spring 292. The pawl 288 is under the tension of a spring 294 which holds the rear thereof in constant engagement with the bottom of the collar 279. The upper end of the rod 290 is pivotally connected with a crank 295, Figs. 24, 25, 27, 28, 32 and 33, that is fixedly secured to a shaft 296 carried in bearings 297, provided on a horizontal plate 298, supported in elevated position above the surface of and at the edge of the table by brackets 299. The shaft is provided with a pair of downwardly extending fingers 300, seen in Fig. 27.

The normal position of the parts is that substantially shown in Fig. 24. Assuming now that the sleeve 285 is moved downwardly upon the hinge pin 251. Such motion rocks the lever 281 around the stud 282, thereby moving the rod 271, upwardly and also the collar 279 and 276 thereon. During the upward movement of the collar 279, the pawl 288 follows same under the influence of the spring 294. So soon as the fingers 300 engage or contact the outermost signature or section, as shown in Fig. 25, the pawl 288 remains or is held stationary, thereby locating the position of the pawl 288 with respect to the stepped end 273, at the same time that the shoulder 275 has engaged the bottom of sleeve 272. The continued movement of the collar 279 with the rod 277, through spring 280, bearing against shoulder 275, moves the sleeve 272 and thereby the bell crank 271, until the stepped end 271'' engages the pawl 288. This operation advances the section stack the distance required.

When the stepped end 271'' is in engagement with the pawl 288, any further movement of the collar 279 and rod 277 is absorbed by the spring 280. Upon the return of the rod 277 to normal position, Fig. 32, the bell crank 271 is also returned to normal position against the stop 287 by the spring 286. It will be clear therefore that the distance of movement of the signature stack upon the table 248 is governed entirely by the degree of arcuate travel of the bell crank 271, and that the extent to which said bell crank may move is limited by the opposing pawl 288 which engages one of the steps 273 on the end of the bell crank 271''.

The aforementioned follower 272a is so constructed on the bottom that it has engagement with the chain 253 by which it is arranged to be drawn along the table top 248 as it advances the stack of signatures or sections, the engagement of the follower with the chain being insured by the weight thereof and the engagement with the chain being such that upon any excessive resistance being offered to the movement of the stack for any reason, the chain may continue to move independently of the follower.

On the surface of the table 248 and in parallel alinement with the slot 252 in which the chain 253 operates, is a rail 301, which is laterally adjustable on the table relatively to the slot or groove 252. Against the side of this rail 301 is arranged to be set the stack of signatures, the forward series of which as it is moved forwardly, is alined by a jogging finger 302, Fig. 21, that is pivoted to a mount 303 adjustable upon the table surface, and to which is pivotally attached a member 304 that is adjustably secured in one arm 305' of a bell crank 305 pivotally mounted underneath and on one side of the table 248, said arm 305' extending through a slot 306 provided therefor in the table. The other arm 305'', Fig. 27, of the bell crank 305 is pivotally connected to a rod 307 which is connected to a bell crank 308, Figs. 27 and 28, pivotally mounted at the other side of the table 248 and connected with a rod 309 which is pivotally secured to the end of the aforementioned lever 281. The movement of the lever 281 downwardly in manner related, to advance the signatures also operates the jogging finger 302 against the side of the signatures pressing them against the rail 301 and thereby alining them. The function of the rail 301 is not alone to guide the stack of signatures during its advance along the table top. Its essential function is to hold in true line a series of separator-contact plates 310, Figs. 1, 2, 27 and 28, which divide the stack into a plurality of series of sections or signatures, each series representing a complete book, and the separator plates 310 performing seriatim and sequentially to control the vacuum for the double sew, all as later detailed with greater particularity. Since these separator plates must be moved at the completion of the delivery of each final section of a book, the rail 301 terminates short of the table top 248, as seen in Fig. 21, and the structure of these separator plates and the mechanism for removing and stacking them we will describe in detail hereinafter in connection more particularly with the mechanism for delivering a sewed book.

Means are provided on the table top 248 to prevent the removal by the pick up mechanism, presently to be described, of more than one section or signature at a time, it being noted that a section or signature in the making of a book may comprise several leaves or pages or but one leaf. Such means may comprise a pair of resilient strips 311 secured to and inset in the surface of the table, the strips 311 having upturned ends 312, Fig. 23, which project slightly beyond the front end of the table 248, and hence slightly beyond the bottom of the signatures. Supplementing this provision and co-operating therewith, are lateral spring strips 313 and 314, the strip 313 being attached to a frame or structure 553, Fig. 28, secured to and upstanding from the table 248, and the strip 314 being fixed in the end of a bar 315 that is adjustably secured in one of the brackets 299 upstanding from and secured to the table 248. These lateral strips 313 and 314 overlap the ends of the signatures, which as seen in Fig. 23, are positioned with their backs upon the table 248, and the spring strips 311 overlap the bottom of the signatures, as explained. Being resilient in nature, these spring strips 311 and 313 and 314 yield readily when a signature is removed from the stack, and they immediately re-engage the bottom of the next succeeding signature as well as the sides thereof and thereby prevent the withdrawal or pick up of more than one section at a time during the operation of the machine.

*Signature feed*

In suitable bearings 316 provided on and rising above each member 1 and 2 of the frame, Fig. 2, is a horizontal shaft 317 to which is pinned the hub 318 of a crank 319 and a pair of arms 320 supporting for oscillation in the ends thereof a shaft 321, integral with which is a crank 322, and carrying a plurality of fingers 323, which are fixed upon said shaft 321, as by set screws 323'. The shaft 321 is provided with a central passageway 324 and with a series of ducts 325 communicating therewith, Fig. 41. Upon said shaft 321 is fixed a series of fingers 323, each of which is provided with a passageway 327, Fig. 41, which is in direct communication with the ducts 325. Near the ends and on the faces thereof the fingers 323 are provided with compressible, flexible cups 328, Fig. 42, which are ported and which are designed to prevent the induction of any air when they are brought into contact with a signature and when the shaft 321 is exhausted of air at the time of such contact. To the end of the shaft 321 is attached a flexible hose 329 through which the air is exhausted, at the proper time, valves in the line which lead to a vacuum tank 330, Figs. 2, 3 and 4, controlling this, as explained later.

Figure 32:
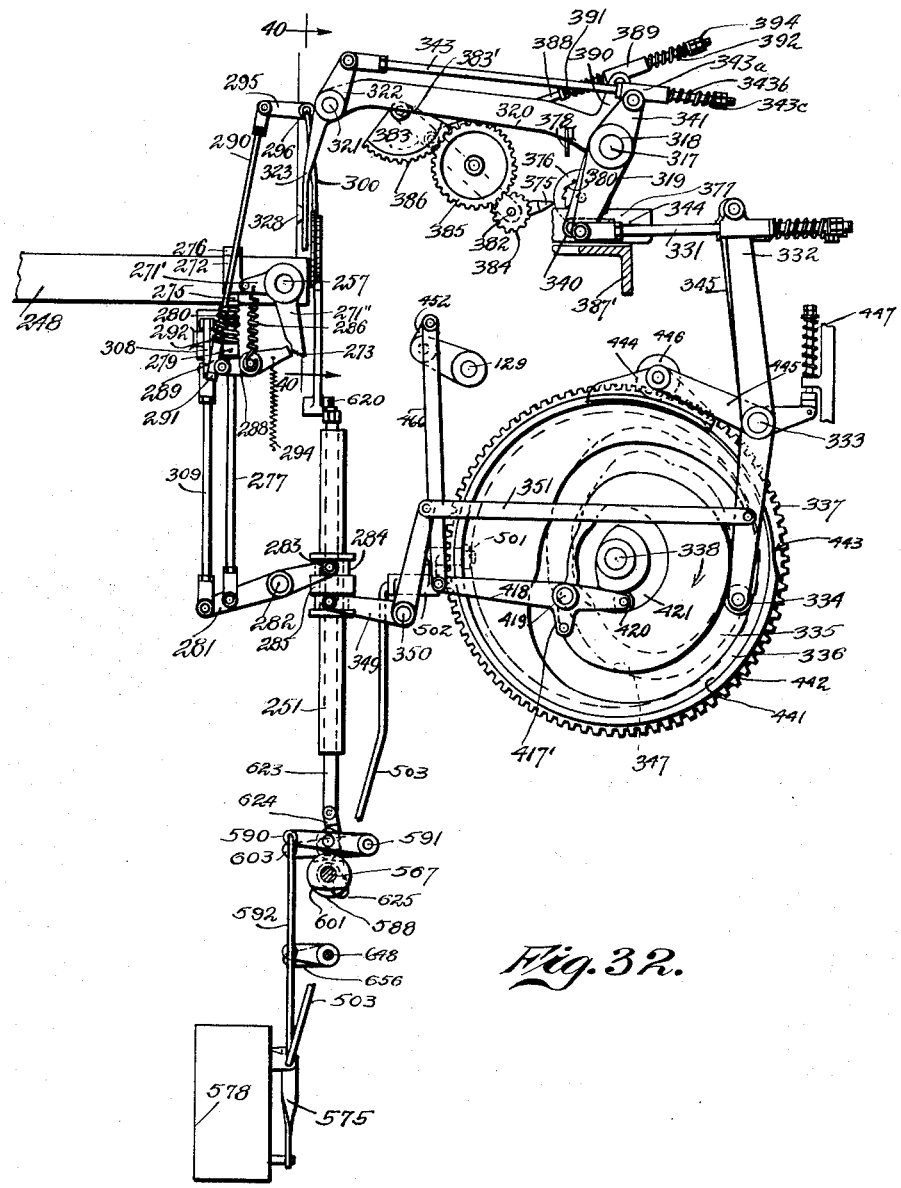
Fig. 32 is a diagrammatic illustration of the link arrangement for operating the feed arms and magazine feed; also for operating joggers and various switches.
Figure 33:
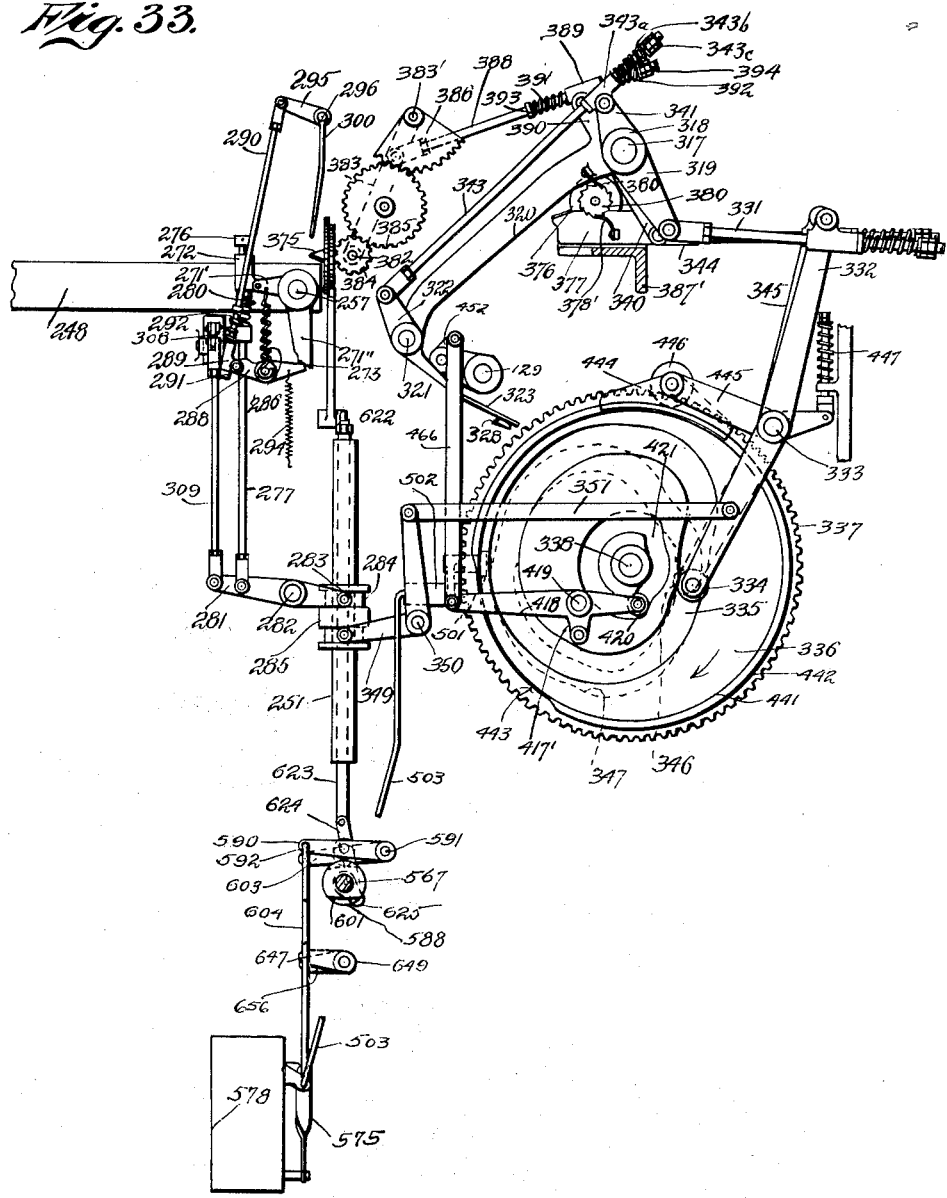
Fig. 33 is a similar view showing the operative position of the signature feed mechanism and co-related parts.

Referring to the horizontal shaft 317, with its associated parts, the crank 319 and the arms 320, which carry in the ends thereof the shaft 321, Figs. 32, 33 and 67, is connected with a rod 331 which in turn is yieldingly connected with one end of a lever 332 that is fulcrumed upon a trunnion 333 carried in the side frame member 2. The other end of said lever 332 is provided with a roller 334, that tracks in cam groove 335 of a cam wheel 336, that is loosely mounted upon a trunnion 338 secured in the frame plate 2. The movement of the cam wheel 336 in the direction of the arrow, Fig. 32, moves the lever 332 about its fulcrum 333 and through its connection as explained, causes the arms 320 to swing in an arcuate path, carrying with them the shaft 321 and the fingers secured thereto, to the position substantially as shown in Fig. 33. Inasmuch as it is impossible for the fingers 323 to move in an accurate arcuate path with the arms 320 during the carriage by them of a new signature into the open jaws of the sewing machine, owing to the many mechanical parts that lie in the normal path of these fingers, it is necessary so to alter or vacillate the movement of these fingers 323 during their traverse with a signature, that they escape these mechanical obstructions. For this reason we have made provision by which the fingers 323 perform an independent relative movement during their carriage by the arm 320. The means for accomplishing this is illustrated in Figs. 1, 32, 33 and 67. Upon the shaft 317 is oscillatably mounted a sleeve 339 that is provided with a downwardly extending crank 340, and an upwardly extending crank 341. The shaft 321 is also provided with the crank 322 and to this crank 322 is connected a rod 343 which is extended through a tube clevis 343a that is pivotally connected with the crank 341. By means of a spring 343b, as shown, coiled about said rod 343, and held thereupon by nuts 343c, the rod 343 is operated to move the fingers 323 into contact with a signature, the contact being accomplished by a slight pressure to cause the vacuum cup 328 in the ends of the fingers 323 to form a perfect seal against the signature, so that no leakage or entrance of air may occur to disturb the vacuum between the cups and signature. This pressure is yieldingly provided by the spring 343b, which, as the lever 345 moves inwardly toward the trunnion 338, first causes the finger-cups 328 to engage the signature, and as the movement of the lever continues, is compressed, the resultant pressure being yieldingly translated to the signature. This is of considerable importance, because, as pointed out presently, the organization of the machine includes a vacuum system for performing a variety of functions, appearing later, among one of which is the air induction means for picking up and carrying a signature, and the failure of the air induction means would operate to bring the machine to a halt. The downwardly extending crank 340 is connected by a rod 344, in yielding manner with the upper end of the lever 345 that is fulcrumed upon the trunnion 333, and the other end of which is provided with a roller 346 that tracks in a cam groove 347, shown in dotted lines, Figs. 32 and 33, in the cam wheel 336 and on the face opposite to that in which the cam groove 335 is provided. The rotation of this cam 336 causes the arms 320, as already explained, to travel in an arcuate path. Simultaneously the cam groove 347 causes the fingers 323 to perform substantially an undulating motion during the travel thereof into the open jaws of the clamp table and in this wise the parts that lie in the path of movement of these fingers are avoided. The cam track or groove 347 performs also the additional and important functions of causing the fingers 323 first, to engage or contact the signature to be fed, and second, to remove the signature from the stack, these two operations occurring independently of the arms 320 and in immediate sequence and immediately prior to the downward movement of the fingers with the arms 320. The cam groove 347 finally performs also the function of elevating or lifting the fingers 326 from a signature which they have delivered as shown in Fig. 4, prior to the withdrawal of the fingers.

Referring to the sleeve 285, which is mounted for sliding movement relatively to the hinge pin 251 and arranged to rock the lever 281, and also referring to Figs. 32 and 33, the movement of said sleeve 285, is effected by a bell crank 349, journaled on a shaft 350. The bell crank 349 is rocked to effect the movement of the sleeve 285 and the parts connected with it by a bar 351, which connects the bell crank with the lever 332.

Upon the trunnion 338 is also loosely mounted a gear 337, Figs. 2, 32 and 33, which with other gears, hereinafter designated, is constantly in revolution during the operation of the machine. The revolutionary motion of the gear 337 is transmitted to the cam wheel 336 through the medium of a coupling unit or dog 353, Fig. 54, interposed between a clutch element 354 that is secured to the gear 337 and a complementary clutch element 355 that is secured to the cam wheel 336, the coupling unit or dog 353 being pivotally connected in any desirable manner and lying in a cut-out 356 in the clutch element 355. The dog or coupling unit 353 is under the tension of a spring-pressed plunger 357 which tends constantly to urge or thrust the dog 353 beyond the peripheral line of the element 355 in which position it couples together the two clutch elements 354 and 355 and hence the gear 337 and the cam wheel 336. The operation of the dog 353 to move same within the peripheral area of the clutch element 355 and thereby leave the elements and the parts to which they are connected free and independent of each other, is effected by a release plate 358, that is bolted onto a square shaft 359, Fig. 54. This square shaft is axially movable in one direction by a solenoid 360, the armature of which is connected to a lever 362 that is pinned upon the square shaft 359. This lever 362 is under the tension of a spring 363 which returns the square shaft and the release plate 358 to normal position when the solenoid 360 ceases to be energized. The solenoid 360 is included in the main electrical circuit M referred to, in which is also included a switch 364, Figs. 50 and 60, the operation of which is mechanically controlled by a cam 365, Figs. 3 and 34, that is adjustably mounted on the sewing shaft 23. The cam 365 operates against a roller 366' in one end of a lever 366, that is pivotally mounted upon a stud 367, secured in the frame member 1, and the other end of which lever 366 is connected to the switch 364, by a rod 368, a spring 369 normally holding the roller 366' against the cam 365. It may be mentioned in this connection that this switch 364 is operated to close the electrical circuit for operating the feed cam 336 during the sewing of the various signatures that make a book. Upon the completion of the sewing, however, this switch 364, though remaining in operative position, completes no circuit to the feed clutch solenoid 360, the flow of current through said switch being at this time prevented by the opening of a switch 370, Figs. 46 and 60, more particularly detailed later, which interrupts the circuit in which the solenoid 360 is included.

*Paste applicator and operating means therefor*

Prior to the delivery of a section or signature to the sewing machine, adhesive paste is applied to the signature along substantially the line wherethrough the penetration of the punches or needles occurs, this being desirable for a firmer or securer anchorage of the threads and consequently for a more substantial book, with less liability to breakage. Viewing this part of the machine in Figs. 32, 33 and 34, also in Figs. 2 and 3, it will be noted that the applicator 375 moves to operative position, that is, into engagement with the signatures in regular order as each signature is sequentially removed from the stack on the table 248 and delivered to the sewing machine; and to inoperative position, that is, in contact with the paste supply, when the pick up fingers 323 are returned for a new signature.

In Figs. 2, 32 and 34, the applicator 375 is shown in the position in which it is contacting a roller 376, that is partly submerged in a glue tank 377, Figs. 2, 32, 33 and 43, for the purpose of gluing the same preparatory to the application of the glue thereon to the signatures. The glue tank 377 is suitably supported between the frame members 1 and 2, and the roller 376 submerged therein is periodically rotated by a spring pawl 378, Fig. 43, that is secured to a boss 379 projecting laterally from one of the arms 320 and adapted to engage a ratchet wheel 380 secured to the roller shaft 381, when the arms 320 are caused to descend in the act of delivering a section to the sewing machine, during which time, as presently explained, the applicator moves to position to apply the paste which it has gathered from the roller 376. A detent 378' is provided to prevent the reverse motion of the roller.

The applicator 375 is provided with a shaft 382 that is journaled in the ends of a pair of arms 383, Figs. 2 and 34, and that is provided at one end thereof with a pinion 384. This pinion 384 meshes with a spur gear 385 journaled in said arms 383 and intermediate the ends thereof, and in mesh with a segmental gear 386 that is rigidly fixed in the end of a bracket 387 secured to a cross member 387' between the frame members 1 and 2. The aforesaid arms 383 are secured to a shaft 383' which is journaled in said brackets 387, Fig. 67, and are operable relatively thereto by rods 388, Fig. 67, pivotally connected thereto at one end and extending through a tube clevis 389 pivotally secured to a crank 390, forming a part of the arms 320. On the opposite ends of said tube clevis 389 and surrounding said rod 388 are helical springs 391 and 392 which are held in position thereupon by a collar 393 and nuts 394 respectively, this arrangement providing for a yielding engagement with the glue roller 376, and with the signature and insuring that a proper supply of glue is taken from the roller by the applicator and that such proper supply is applied to the signature.

Assuming that the arms 320 are now moved from the position illustrated in Fig. 32, to the position shown in Fig. 33, it will be seen that so soon as the descent of the arms 320, with a signature, begins, the rod 388, being moved simultaneously by the crank 390, causes the arms 383 to swing about their pivots in the bracket 387. This movement of the arms 383, causes the spur gear 385, carried thereby and journaled therein, to rotate as it moves relatively to the segmental gear 386, with which it is in constant mesh and the rotating movement of the spur gear 385 is transmitted to the pinion 384, which during its arcuate travel as described, moves the applicator 375 from the position shown in Fig. 32, to the position shown in Fig. 33, in which latter position the application of the glue occurs. Upon the ascent of the arms 320, the reverse action of the applicator takes place, which as seen in Fig. 32 is a return of the applicator to contact with the glue roller 376.

*Front jogging means*

Additional to the various functions performed and operations controlled by the cam wheel 336, Figs. 32 and 33, is the alinement of the signatures or sections against the portion 126a of the angle plate 126, in the clamp table, Figs. 4, 5 and 6, of the sewing mechanism. This alinement is very necessary in order that there shall be no variation in the location of the punch-holes and threads with respect to the signature backs, which would make for a weakened and also a non-uniform book. For this reason means are provided for moving each signature as it is supplied to the sewing mechanism against the back plate 126a, so that the back thereof is flush against the plate and accurately alined with the signatures previously supplied and sewed.

Referring to Figs. 4, 5, 6, 7 and 8, the arms 154 of the clamp table complement 143, are provided with bearings 405 and 406, Fig. 6, in which is slidably disposed a pair of rods 407. To said rods 407 is firmly secured the ends of a horizontal shaft 408, Fig. 7, mounting a pair of links 409 the ends of which are pivotally conjoined with the ends of a pair of arms 410 that are integral with and project beyond the friction box 147. The upper ends of said rods 407 are bent at substantially right angles as shown at 411 and provide supports for extensions 412 on chambers or boxes 413 housing pistons 414, Figs. 4 and 6 and carrying pipes or conduits that lead to a valve 416, Fig. 2. This valve, Fig. 69, is interposed in a vacuum line 417 and its operation to open the vacuum line to the vacuum tank 330, thereby to act upon the pistons 414, is effected by the crank end 417' of a lever 418 that is fulcrumed upon a stud pin 419 in an extension of the frame member 2 and one end of which is provided with a roller 420 tracking in a cam groove 421 in the cam wheel 336, see Figs. 2, 32 and 33. The valve 416 comprises a housing 422 that is provided with a bracket 423 which is attached to the extension of the frame member 2. The housing is provided with a seat 424, formed by the bottom of a plug 426 threading in the end of said housing 422 and having a threaded opening 427 by which the vacuum line 417 may be attached thereto. The housing 422 is also provided with a seat 425 and with a lateral aperture 428 for connection therewith of the vacuum pipes or conduits 415 that lead from the piston chambers or boxes 413. The housing is also provided with a valve chamber 429 in which is contained a valve 430, having a stem 431, which extends through an enlarged passageway 432 in said housing, the passageway 432 having ports 433 for admission of air thereto and the piston chambers 413 when the vacuum is no longer needed.

On the valve stem 431 is a yoke 434 which is maintained in approximate central position relatively thereto by a pair of springs 435 and 436, respectively abutting against a shoulder 437 on the valve stem, and against a nut 438 on the end of said valve stem. The yoke 434 is arranged to be pivotally connected to the crank end 417' of the lever 418, and the movement of said lever operates the valve stem 431 through the springs 435 and 436. To the aforementioned pistons 414 is pivotally connected the ends of a frame 439, that are fulcrumed upon the extensions 412 on the chambers or boxes 413, and which frame 439 carries a plurality of jogging elements 440, which are preferably mounted for yielding movement upon contact with the signatures.

This jogging arrangement as just described constitutes essentially a part of the friction box 147, so that the joggers 440 are always in position to operate against the signature lastly supplied.

Braking device

As has been described, the cam 336 is loosely mounted upon the shaft 338 and is revolved thereon to perform the sequence of operations already pointed out by the gear 337 to which it is arranged to be coupled by the clutch elements referred to. The same series of operations is performed during each complete revolution of the cam 336 after which the disengagement of the gear 337 from the cam 336 occurs, the gear 337 forming one of a train, to be referred to later, continuing its revolution on the shaft 338. Since the momentum of the cam 336, when uncoupled from the driving gear 337 would carry the same beyond the starting point thereof and thereby upset or disarrange the cycle of movements with certain damage to the machine, we have made provision for positively stopping the said cam after it has completed one revolution. For this reason, we have made the following arrangement. The cam wheel 336 is provided with a peripheral tread 441 and with a diametrically larger flange 442, the annular continuity of which is interrupted by a depression 443. A brake shoe 444, that is pivotally carried in the end of a lever 445 fulcrumed upon the trunnion 333, operates against the tread 441 of the cam 336. The lever 445 is provided with a roller 446, that is arranged to ride upon the flange 442 of the cam wheel 336, being held in constant engagement therewith by a spring 447, Figs. 2, 32 and 33. In the normal position, the brake shoe 444 is pressed against the tread 441 of the cam wheel 336, thereby holding it against any revolutionary movement. When the cam 336 is now coupled with the gear 337, the initial revolution of the cam wheel takes place while the brake is applied. So soon however as the roller 446 rides upon the flange 442, the brake shoe 444 is lifted from the tread of the cam 336 and remains removed from the tread until the roller 446 drops into the depression 443 which interrupts the annular flange 442.

Side or end jogging means

Figure 8:
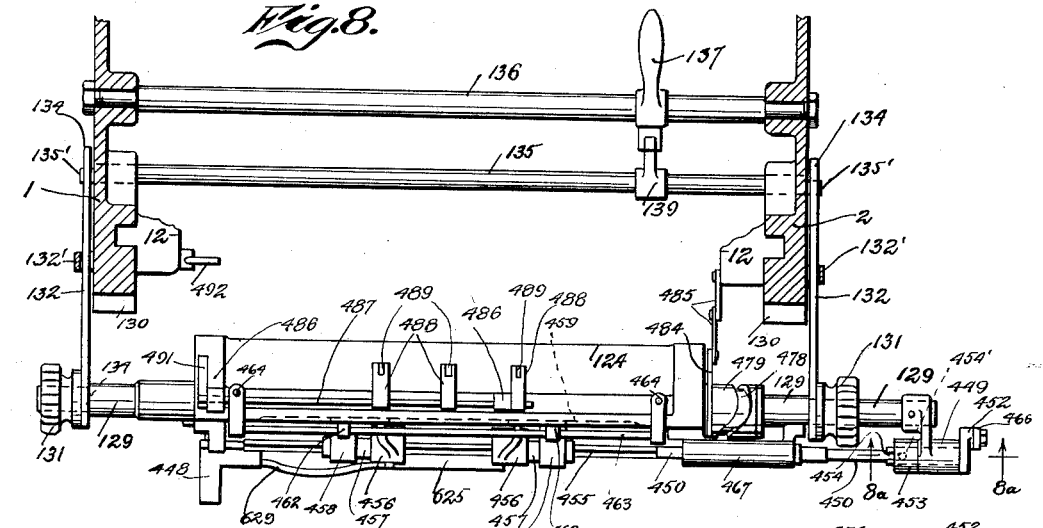
Fig. 8 is a sectional plan view, the section being taken on line 8—8—Fig. 7.
Figure 8A:
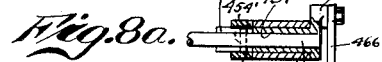
Fig. 8a is an enlarged sectional detail taken on line 8a—8a—Fig. 8.

Referring to Figs. 7 and 8 and also to Figs. 16 and 17 the clamp table head 124, is provided with a bearing 448 and one of the extensions 129 of said clamp head is provided with a bearing 449, the bearing 448 supporting one end of a shaft 450, and the bearing 449 containing for relative oscillation therein the tubular portion 451 of a crank 452, the tubular portion 451 being locked in position by a nut 453 which fits over said portion 451 as shown in Figs. 7, 8 and 8a. The tubular portion 451 is provided with a longitudinal open-ended slot 454 and forms a bearing for the other end of said shaft 450, which is provided with a pin 454' that extends into the slot 454 whereby the shaft 450 is connected with said tubular portion 451 for relative longitudinal movement and for rotative movement therewith. As seen at 455, the central portion of said shaft is squared and such squared section 455 mounts a pair of eccentrically grooved bodies 456, that are adjustable upon said section 455 of the shaft in accordance with the length of the particular signature to be sewed, these eccentrics being locked in position of adjustment by set screws 457', Fig. 17.

Each of the bodies 456 is provided with a tubular extension 457 through which passes the shaft portion 455, the tubular extension 457 forming a bearing for a pair of blocks 458 the rear ends of which are disposed in a horizontal groove 459, in the table head, Figs. 8 and 17, and with laterally extended tongues 460, in which rollers 461 are journaled, these rollers tracking in the eccentric grooves of the bodies 456. Through these blocks 458 extend a pair of jogging members 462 that are carried upon and depend from a horizontal bar 463, that is supported at its ends by a pair of uprights 464 which are relatively movable and carried by the head 124, these uprights being under the tension of springs 465, Fig. 12, which tend constantly to hold the jogging members 462 in contact with the top of the sewing table the downward movement being limited by shoulders 464', Fig. 12. The revolution or more properly the oscillation of said shaft 450 produces a similar motion of the squared section 455 and the bodies 456 thereon and this oscillation causes the eccentric groove therein to move the blocks 458 toward each other to jog a section, that is, aline it with the edges of a series of sections or a book already sewed, and away from each other to enable a new section to be delivered to the sewing mechanism. In the peculiar type of book sewing followed by the present sewing mechanism, that is, by sewing through a series of signatures while disposed at an angle to the horizontal, so that each signature is sewed onto another signature or other signatures, it is highly important that after each sewing operation, that is, after each signature has been sewed onto another signature, the book of sewed signatures be shifted so that the new sewing shall not take place in the perforations made by the previous sewing and thereby weaken the book. Since the section delivering fingers 323 always deliver a section to the same place between the clamp jaws, it is clear that a section delivered to already sewed sections in the process of making a book, which sections have been shifted laterally in accordance with necessity to produce a staggered sewing, will not be alined with the signatures already sewed; hence the necessity for such alinement and the jogging members 462, which are operated by the crank 452 through the medium of a link 466 that is pivotally connected to the end of the lever 418, to which reference has already been made and which is shown clearly in Figs. 31 and 32, the lever 418 being under the operation of the cam wheel 336.

*Shifting of signatures for staggering stitches*

The lateral shifting of the sections is accomplished by one or the other of the jogging members 462 and we will now describe the means by and the manner in which such shifting is accomplished, reference being especially made to Figs. 16 and 18.

To the head 124 of the clamp table is secured a housing 467 in which is disposed for relative sliding movement a bored block 468 having an internal shoulder 469 at one end and a bushing 470 threading in the opposite end. With and slidable relatively to the tube 468 are sleeves 471 and 472 that are pinned to the shaft 450 which extends through them. About the shaft 450 is coiled a spring 473, the tension of which is exerted on the one side against a washer 474 loosely mounted on said shaft and bearing against the inner end of said sleeve 471 and also against the offset 469 on the inside of said block 468; and the tension of which spring 473 is exerted on the other side against a washer 475 loosely mounted on said shaft 450 and bearing against the inner end of said sleeve 472 and also against the inner end of said bushing 470 that threads into said block 468 and surrounds said sleeve 472. To the block 468 is fixed a pin or journal for a roller 477, that is disposed and tracks in the cam groove 478 of a cylinder 479, rotatively mounted upon the extension 129 of the clamp head. The cam groove 478 is a four stage path, each stage representing a quarter of the circumferential area of the cylinder 479. By means of a collar 480, arranged to be locked on the extension 129 of the clamp head, and provided with a series of depressions 481, for receiving a ball detent 482, the cylinder 479 is arranged to be held in the position into which it has been moved, by the slide frame 12, which carries the punch bar 15 and needle bar 16. The cylinder 479 is provided with circumferential teeth 483, that are surrounded by a crank ratchet 484, Fig. 11, the crank ratchet being connected with the slide frame 12 by a link arrangement shown at 485, Figs. 8 and 11. In operation the shifting device works as follows, it being assumed that the clamp jaws of the book table are closed firmly upon signatures and that the sewing of another signature onto those already sewed is about to occur.

When now the slide frame 12 rises to carry the threaded needles into the perforations made by the punches, the crank ratchet 484 is moved axially through the link connection 485 and thereby the cylinder 479 is revolved for a quarter of its circumference. During such revolution of the cylinder 479 the cam groove 478 therein has moved the block 468 through the roller 477 to one side or the other, depending upon the particular area or section of the groove which the roller 477 has traversed. As has been explained, the jogging members 462 are mounted upon the shaft 450 and are movable with the shaft in a longitudinal direction. One or the other of the jogging members 462 may be in engagement with an end of the clamped book. Assume now that the block 468 is moved to the left, Fig. 16. Such motion moves the bushing 470, and the washer 475 relative to the sleeve 472 which is connected with the shaft 450, that is held immovable by one of the jogging members 462 pressing against the clamped signatures; this motion of the block 468 also causes the shoulder 469 on the inside of the block to move away from the washer 474, as the washer 475 compresses the spring 473. So long as the clamp is operative, that is, holding signatures clamped, the jogging members 462, though the spring 473 is under considerable compression, cannot operate. So soon, however, as the clamp jaws are opened, the spring 473 instantly moves or shifts the sections laterally to the extent defined by one of the stages of the cam groove. The construction of the shifting mechanism as explained, provides for a similar shifting to the right, the spring 473 acting equally in both directions and hence providing a steady, even and uniform pressure regardless of the direction in which it exerts its pressure. Upon the opening of the clamp jaws and after the shifting of the signatures, a new signature or section is fed to the sewing machine, and the feeding of such signature is immediately followed by both the front jogging through the jogging elements 440 and the end jogging by the elements just described, to wit the jogging elements 462.

*Means for dislodging section from clamp head*

As previously described herein, to each section or signature is applied a supply of glue or paste for a more efficient binding together of the sections and also a securer anchoring of the sewing threads. The paste is applied, as described near the back edge of the signature and upon the upper side thereof when it lies flat or substantially so on the clamp table, so that the top of the signature next to the clamp head contains the paste. During the clamping and sewing operation, the signature, carrying paste tends to adhere to the underside of the clamp head 124, and such adherence would hold the several sewed signatures directly in the path of the feed fingers 323 delivering another section to the sewing machine. We have therefore devised means for breaking this adherence of a section and such means are more especially detailed in Figs. 19, 7, 8, 4, 5, 6 and 12. Referring now to Figs. 7, 8 and 19, the head 124 is provided with a series of spaced bearings 486 in which is journaled for relative oscillation a shaft 487, upon which is secured a plurality of cranks 488 to which are pivotally connected push rods 489 the ends of which lie normally disposed in apertures that penetrate the clamp head 124 and also the top of the angle plate 126 that is secured to the underside of the clamp head 124. The normally retracted position of these push rods 489 is insured by a spring 490, Fig. 19, the tension of which is exerted against a lever 491, that is secured to the end of the shaft 487, Fig. 8. This lever 491, lies in the path of the hook end 492 of a rod 493 that extends through a clevis 494, pivotally connected with the horizontal rod 68, Fig. 19, which controls the thread tension, and which is as already explained carried in the ends of the arms 66 and 67 that are pinned to the shaft 65. The clevis 494 is held normally pressed against a collar 495 adjustably secured upon said rod 493, by a spring 496, that is maintained upon the rod by a nut 497. The downward movement of the arms 66 and 67, carrying with them the rod 493, causes the hook end 492 thereof to engage the lever 491 and to rock the shaft 487. Thereby the push rods 489 are projected through the head 124 and the top of the angle plate 126, and engaging the signature that has adhered thereto, dislodges it. This action occurs immediately upon the opening of the clamp jaws to receive a new section, immediately preceding the shifting of the signatures, and concurrently with the operation of the thread tensioning means. In order to prevent axial rotation of said rod 493, which would carry the hook end 492 thereof out of alinement with the lever 491, we provide in the clevis 494, a slot 498, Fig. 20, in which a pin 499 extending transversely through the rod 493, is operable.

*Vacuum control for feed fingers*

Figure 46:
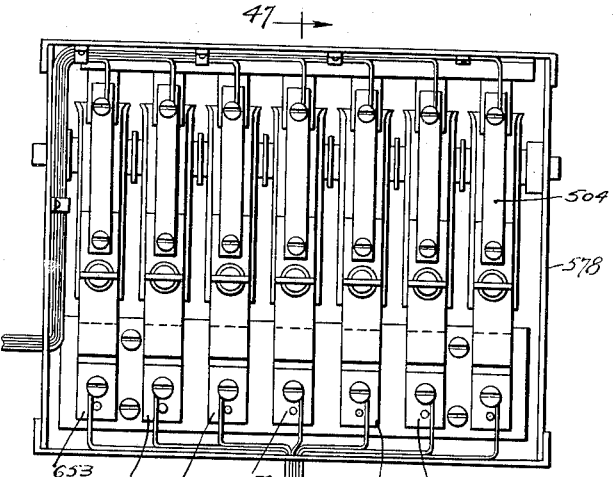
Fig. 46 is an elevational view of a set of switches.

Referring to Figs. 67 and 68 and again to Figs. 32 and 33, the cam wheel 336, in addition to the cam groove and other structural features already mentioned, is provided with a lateral cam surface 500 in engagement with which is a roller 501 carried in the end of a bell crank 502, which is attached to a connecting rod 503 which in turn is connected to a switch 504, Fig. 46, that is included in the main electrical circuit M, as is also a solenoid 505, the armature of which is connected by a yoke 507, Figs. 3 and 53, to the stem 508 of a valve 509 operable in a housing 510. The construction of all valves and housings used in this machine are identical and the description given of the valve 416 will serve for all of them. Referring to Figs. 3 and 34, the valve housing 510 is provided with a conduit or pipe 511, leading to a vacuum tank 330, Figs. 2, 3 and 60, and with a pipe 512, Figs. 3 and 34, that is coupled to a casting 513, provided or integral with one of the upright supports 316, attached to the side frame member 1. The casting 513, Fig. 37, has an L-shaped passageway 514, in communication with one end of which is the flexible hose 329 that connects with the hollow or bored shaft 321, upon which are carried the hollowed fingers 323. The other end of said passageway 514 terminates in a chamber 515 in which is disposed a piston 516, that is held normally pressed outwardly by a spring 517. The line 512 leads to the vacuum tank or pump 330 and is connected to said casting and communicates with the passageway 514, so that the effect of the vacuum, when the valve 509 is operated, is to induce air through the cups 328 in the ends of the fingers 323 and simultaneously to operate said piston 516.

On the shaft 317 which carries the arms 320, is fixedly secured a dog 518, in the path of movement of which is disposed a pawl 519 that is pivoted upon a trunnion pin 520, which pivotally connects said pawl and the end of a rod 521, Figs. 35 and 36, with lever 520', that is pivotally mounted in the upright 316. This rod 521 extends through a guide 522 on the frame member 1, and a spring 523 holds it in normally retracted position. The end of this rod 521 is attached to a switch 524, Figs. 59 and 60, that is contained in a switch box 95 mounted on the side of the frame member 1, and the switch 524 is normally under the tension of the spring 523 to restore it instantly to inoperative position after the actuation thereof to close the circuit, in which the switch 524 is included. Also included in the electrical circuit is a solenoid 526, the armature 527 of which, Fig. 55, is connected with a bell crank 528, mounted pivotally upon a bearing 529 provided on a suitable support 530. The bell crank is connected to a crank 531 that is secured to a shaft 532, which journals in suitable supports 533, and on the end of which is carried a release plate 534. The shaft 532 is under the tension of a spring 535 which normally holds the release plate 534 in its operative position, that is, that position, as will appear presently, in which it prevents a coupling between a driving and a driven element.

Referring specifically to Fig. 55, it will be noted that the clutch essentials are identically the same as those described in connection with the feed shaft 338, Fig. 54. On the sewing shaft 23 is secured a clutch member 536 that is provided with a tangential cut-out 536' in which is pivotally mounted a dog 537. This dog 537 is normally pressed outwardly beyond the periphery of the clutch member 536 and into the area of operation or path of travel of the teeth 538, of a complementary clutch body 539 that is secured to the sewing shaft gear 540, by a spring pressed plunger 541. When the dog 537 is in the position illustrated in Fig. 55, the clutch member 536 is connected with the complementary clutch member or body 539 and remains so connected until the dog 537 is disengaged from the tooth of the complementary clutch member or body 539. Such disengagement occurs when the dog 537, during its revolution with the clutch complements 536 and 539, encounters the release plate 534, which, as stated is held normally in the path of movement of said dog 537, and such disengagement between the complementary clutch members brings the sewing shaft 23 to a halt, while the driving gear 540 continues to revolve freely upon the shaft, the disengaged position of the clutch complements being the normal. Now as the arms 320 rise after the delivery of a section and preparatory to picking up another, the dog 518 is moved downwardly, thereby encountering the pawl 519, which being depressed by the dog 518, depresses the rod 521 and closes the switch 524. The solenoid 526, being thus energized removes the release plate 534 from engagement with the dog 537, which being instantly thrust into the path of movement of the revolving clutch complements 539, causes the clutch member 536 to revolve with its companion clutch 539. In this wise the sewing shaft 23 is thrown into operation, to perform the various steps of punching and sewing the signatures as they are delivered, all of which functions take place during a complete revolution of the sewing shaft 23, which thereafter comes to a halt, as the clutch release plate 534 disengages the driving gear from the sewing shaft 23. The pawl 519 through which the switch 524 is operated by the dog 518, during the ascent of the arms 320, is formed with a central depression 542, in which is normally extended a pin 543, carried in the upright member 316, a spring 544 maintaining the contact of the pawl 519 with the pin 543. As the pawl 519 is depressed sufficiently to actuate the switch 524, the pin 543, forces the pawl 519 out of contact with the dog 518, and the pawl 519 is automatically reset as the dob 518 rises during the descent of the arms 320. So soon as the dog 518 escapes the pawl 519, the spring 523 on the rod 521, immediately returns the rod to normal position thereby opening the switch 524, which as will be clear, was closed but momentarily to cause the solenoid 526 to remove the release plate 534 and permit the interengagement of the clutch members 536 and 539.

We have previously herein referred to the cam wheel 336 that is provided with a lateral cam surface 500, which through the connections recited, operates the switch 504, by which the electrical circuit, which includes the solenoid 505 and appurtenances, is closed and the valve 509 to the vacuum tank is opened for inducting the air through the pick up fingers 323. This opening of the vacuum valve 509 occurs practically immediately with the setting in motion of the feed shaft 338 and it remains open until the signature carried by the pick up fingers has delivered the signature to within the open jaws of the clamp table, when the cam 500, causes the valve 509 to close, thereby closing the vacuum line and releasing the signature from the fingers.

Through the aforementioned piston 516, is extended a rod 545, provided at one end with a hook 546, that normally lies in the path of upward movement of the dog 518. The bottom end of this rod 545 is connected to a circuit breaking switch 547, Figs. 50 and 60, in the switch box 95 and included in the main electrical circuit. This rod 545 is held normally with the hook 546 extended over the top of the dog 518, by the spring 545'. When, during the operation of the machine, the vacuum is effective in picking up signatures in continuous succession, the piston 516 will be indrawn by the vacuum in the L-shaped passageway 514 of the casting 513, against the tension of spring 517, thus holding the hook 546 out of the path of the dog 518 during its elevation. Assuming that the vacuum has failed or that a signature has not been picked up by the fingers, the air induction through the fingers, will fail to draw in the piston and the rod 545. The hook 546, being then in the path of the upwardly moving dog 518, when the fingers move downwardly without a signature, is engaged by the dog 518 and lifted, and such lifting opens the switch 547, which thereby interrupts the electrical circuit and brings the machine to a complete stop. This is very desirable in order to avoid serious injury to the work or book being sewed in case of a jam or other accident.

An additional precautionary measure is provided to prevent damage to the machine, in the event that the lever 46, Fig. 5, governing the rack and pinion mechanism for operating the cross thread needles, breaks. Slidably associated with the upper end of the rack 42 is a rod 549 which is pivotally connected to the end of a lever 550 that is pivotally mounted upon the side frame member 1. The lever 550 is curved to extend over the end 551 of the pawl 519, as shown in Figs. 35, 36 and 37 and the rod 549 is under the tension of a spring 552 which constantly urges it upwardly. Should the lever 46 break, the spring 552 will force upwardly the rod 549, thereby rocking the lever 550 and pressing the curved end thereof against the end 551 of the pawl 519. The pawl 519 is thereby rocked out of the path of the dog 518, which during its descent as the arms 320 elevate, escapes the pawl 518 and thereby fails to operate the switch 524 which controls the sewing shaft. This failure to close the circuit brings the machine to a halt.

When the sewing shaft 23 has made a complete revolution and performed the various functions of punching the signatures, sewing the signatures, and locking the threads, it comes to a halt, as previously explained. Prior, however to the stopping of the sewing shaft, the cam 365 on the sewing shaft 23 operates or closes the switch 364 in the box 95, which as already explained energizes the solenoid 360 that thereupon removes the release plate 358 and causes the interengagement of the clutch members 354 and 355, thereby the cam 336 is set in motion and the feed fingers 323 again pick up and deliver a signature to the sewing mechanism. It will thus be seen that the feed shaft switch 364 and the sewing shaft switch 524 are mechanically operated in continuous alternation during the sewing of the signatures that make a book, and this order is preserved at all times except when sewing the first signature and the last signature, both of which are double sewed for the sake of strength. To accomplish this it is required that the vacuum for the pick up fingers 323 be cut off, without causing the machine to stop, as would occur with the vacuum line closed, as explained, when the upwardly moving dog 518 would engage the hook or the end of the rod 549 and open the switch 547.

Vacuum control for second sewing of last signature of book

Inasmuch as the double sewing of the last signature of a book is followed by the delivery of a completely sewed book and the double sewing of the first signature of a new book and this is automatically accomplished after the machine is set in motion, we will describe first the means by which the control of the vacuum is effected so that the pick-up fingers 323, though passing through the motions of delivering the last signature, do not actually carry a signature into the open jaws of the clamp table. Upon the return of the arms 320 with the pick-up fingers 323, however the dog 518, through the connections described, closes the switch 524 that controls the sewing shaft clutch members 536 and 539, which being thereby set in motion, sews twice the same signature, which is the last signature of the book.

The double stitching operation of the last signature of the book occurs after the book has been shifted by the jogging members 462, heretofore described, this shifting taking place immediately upon the opening of the clamp jaws.

Metal separator plates and ejector

Previously herein we have described the stack of signatures as being divided into series or groups that make up the books, the division between the signatures being made by any desirable means as by metal separator plates 310, the detail construction of which will be described later in connection with the removal and stacking of them. The metal separator plates 310 are advanced with the stack of signatures. As the last signature of a book is picked up from the stack, carried by the fingers 323 into the sewing machine and sewed, one of the metal separator plates 310 engages a pair of contacts 551—552 that depend and are insulated from a support 553 upstanding from the table 248. The contact 551 is grounded. Referring to the wiring diagram, Fig. 60, these contacts 551 and 552 are in a relay circuit 554, in which is included the aforenamed transformer 85, and an electromagnet 555. In operative relation to said electromagnet 555 is a switch 556, that is included in the main electrical circuit M referred to, and which is held normally retracted with respect to the electromagnet by a spring 557. So soon as the metal separator plate 310 engages the contacts 551 and 552, the relay circuit 554 is completed, and the switch 556 closed.

Now as the first sewing operation on the last signature is completed, the sewing shaft 23, as has been mentioned, operates the switch 364, which controls the solenoid 360 by which the feed clutch is thrown into motion. Due to the closing of the relay circuit 554 and the consequent closing of the switch 556, a circuit is completed which includes the switch 364, for operation of the feed fingers; and it also includes switch 558, Figs. 60, 55 and 50, switch 559 and switch 504, which as previously explained, controls the solenoid 505 that actuates the vacuum valve 509, Fig. 53, through which air induction through the pick-up fingers is controlled. It has been explained that this switch 504 is actuated practically simultaneously with or slightly in advance of, the engagement of the pick-up fingers 323 with a signature and remains in actuated position until the signature carried thereby has been delivered to the open jaws of the sewing machine.

Figure 48:
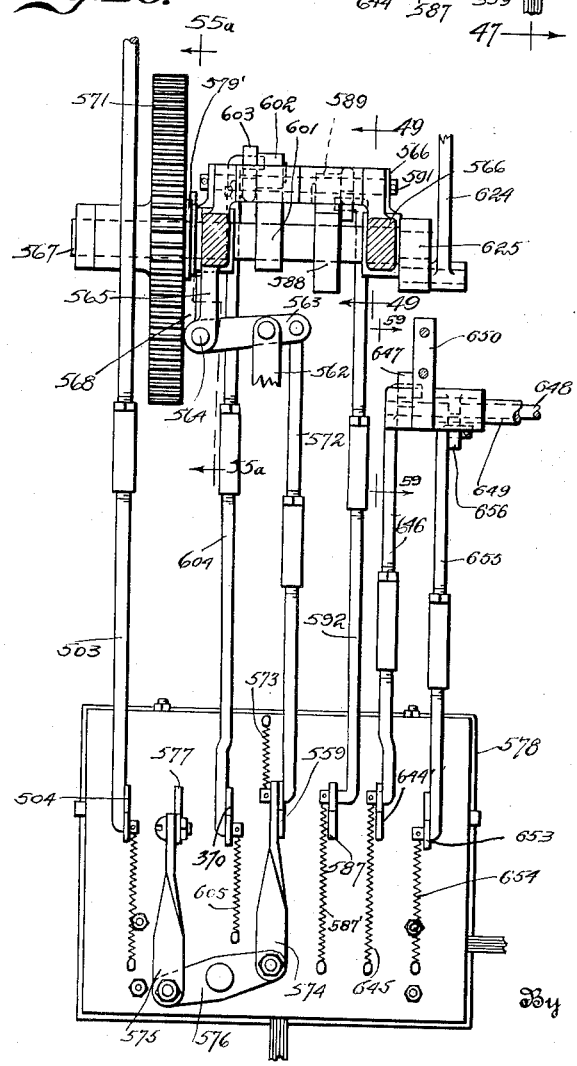
Fig. 48 is an enlarged view looking from the inside of the machine and showing the ejector shaft and the switches shown in Fig. 46.
Figure 47:
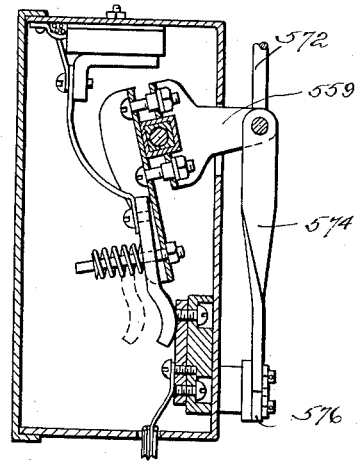
Fig. 47 is a section on line 47—47—Fig. 46 looking in the direction of the arrow.

The switch 558 controls the flow of current to a solenoid 560, Figs. 55 and 60, the armature 561 of which is connected with a rod 562, Fig. 48, that in turn is pivotally connected midway between the ends of an arm 563, that is secured to a shaft 564 journaled in a hanger 565, which is secured to a bracket 566 in which the ejector shaft 567 is rotatably mounted. Shaft 567 has been designated ejector shaft to differentiate it from the other important shafts denominated herein. Its function is to control mechanism by which the metal separator plates 310 are ejected or removed from the stack of signatures.

Upon the shaft 564 is secured a release plate 568 which is operable to cause the interengagement of clutch elements 569 and 570, Fig. 55, respectively connected to a gear 571 and to said shaft 567, whereby the latter is rotated with the constantly moving gear 571 that is in mesh with an idler 571′ which meshes with a pinion 571″ on the gear 540, Fig. 2, which is loosely mounted on the sewing shaft 23. To the other end of the arm 563 is connected a rod 572, the end of which is connected to the switch 559 and is under the tension of a spring 573, by which the normal position of the switch is maintained and established after operation.

On the end of said rod 572 is also pivoted a connecting link 574 the end of which is pivotally connected to a similar link 575 by a teeter arm 576 fulcrumed in the switch case 578. The bar 575 is pivotally connected to a switch 577, in the box or case 578 and included in the electrical circuit M. The release plate 568 controls the coupling of the clutch elements 569 and 570, the clutch element 569 being provided with a cam 579, Fig. 55a, that is designed to hold the release plate 568 in the out position during part of the revolution of the ejector shaft 567, it being noted, that this release plate 568 would be immediately returned to that position by which the disengagement of the clutch complement 569 and 570 would be accomplished when the solenoid 560 is no longer energized, under the influence of the spring 573. When the switch 364, that is the feed control switch, is operated in manner related, by the sewing shaft 23, the ejector switch 558 is also closed, but such switch 558 being in a circuit which includes the switch 556 and which is normally open, no current flows to actuate the solenoid 560 which controls the ejector clutch elements. When, however, one of the metal separator plates 310 is exposed and caused to engage the contacts 551 and 552, the relay circuit 554 and consequently the switch 556 is closed, so that both the feed clutch solenoid 360 and the ejector clutch solenoid 560 are simultaneously energized. The solenoid 560 will then remove the release plate 568 from the element by which the interengagement of the clutch elements 569 and 570 is effected and therefore the ejector shaft 567 will rotate with the gear 571. When the solenoid 560 is energized, it will not only remove the release plate 568, but it will open the switch 559 which is included in the circuit with the vacuum control switch 504, and simultaneously close switch 577. The opening of switch 559 and closing of switch 577 is accomplished by the oscillation of the teeter bar 576.

Since the spring 573 is connected to the rod 572, the release plate 568 would be returned to normal position when the solenoid 560 ceased to be energized; and in the return to normal of the release plate 568, the switch 559 would be closed and the switch 577 would be opened. For this reason we have provided means in the form of the cam 579′, which will hold the switch 559 open during the period required for the feed fingers 323 to move to within the open jaws of the clamp table and which will hold the switch 577 closed during such period. As the feed fingers now move to delivery position, the circuit which includes the switch 559 and the solenoid 505 that operates the vacuum valve 509, being now open, no signature will be picked up and carried to the sewing table. It will be noted that the switch 504 is closed at each revolution of the feed cam 336.

The switch 577, however, being held closed during the same period bridges the normally closed vacuum interlock switch 547, which will be opened by the hooked rod 545 as the dog 518 rises during the descent of the arms 320. The vacuum line being closed, at this time, as explained, the spring 517 will project the piston 516 and hold the hook end in line with the upward movement of the dog which thereby opens the switch 547. As the fingers 323 clear the clamp of the sewing machine, the sewing clutch switch 524 is closed, and a circuit completed which includes said switches 524 and 577, switch 547 being now open. In this wise the last signature is double sewed. On completion of the second sew, switch 364 is operated as previously described to throw in the feed clutch which controls the movement of the pick-up fingers 323 and their arms 320. At this time, however, as pointed out before, the ejector shaft 567 is in motion.

Feed clutch control

Figure 49:
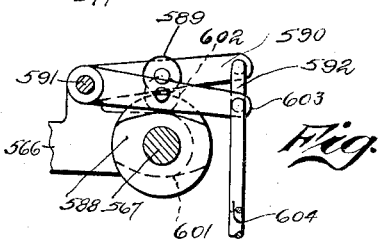
Fig. 49 is a fragmentary section on line 49—49—Fig. 48.

Included in the electrical circuit M and particularly in the circuit in which the feed clutch operating switch 364 is included, is a switch 370 which is controlled by the ejector shaft 567, to break the circuit and thereby cause the signature feed, that is, the arms 320 and fingers 323 to come to a complete stop, while the sewed book is removed from the sewing machine. The means by which the switch 370 is operated is shown in Figs. 48 and 49 and comprises a cam 601 that is secured to the ejector shaft 567, and that operates against a roller 602 journaled midway of an arm 603, one end of which is pivotally attached to the pin 591 that is carried in the bearing 566, mounting the ejector shaft 567, and to the other end of which is attached a rod 604. This rod 604 is under the tension of a spring 605, Fig. 48, and is connected to the switch 370, which as the ejector shaft rotates, is operated and thereby opens the feed clutch circuit and holds it open during the time that the sewing shaft 23 would operate switch 364, leaving the signature feed arms and fingers entirely idle.

Delivery control of sewed book

While the sewing shaft 23 is rotating for the purpose of making the second sew on the last signature of a book, switch 579 normally open is closed to set in motion the cam 114 by which the mechanisms for removing a sewed book from the sewing machine is operated. For this purpose, and referring to Fig. 34, the sewing shaft 23, mounts a cam 365' which operates against a roller 366" carried in the end of a lever 367' that is fulcrumed on a stud 368', secured in the frame plate 1. The end of this lever 367' is connected by a rod 369' with the switch 579 in switch box 95, Fig. 50. For the sake of clarity, we have indicated on the switch box 95, by their respective descriptive numbers, the various switches contained therein. The circuit which includes the switch 579 also includes a solenoid 580, that through connections 581, controls a release plate 582, Fig. 55, by which the clutch element 583 secured to a gear 584 in mesh with the idler 571', loosely mounted on the shaft 115, which we shall designate the delivery shaft, is coupled with a companion clutch element 586 that is keyed to the shaft 115. Also in the circuit which includes the switch 579, is included a switch 587, a solenoid 593, Figs. 56, 57 and 60, which through connections 594, controls the release plate 595, by which the clutch element 596, secured to a gear 597, loosely mounted upon the stud 244, Figs. 34, 56 and 57, and heretofore explained, is coupled with a companion clutch element 598 that is secured to the cam 243, Figs. 56 and 58. At each revolution of the sewing shaft 23, the switch 579 is closed, but no circuit is completed by such closing until the switch 587 has been closed by the ejector shaft 567. The operation of the switch 587 is effected by a cam 588, Figs. 48 and 49, keyed to the shaft 567 and operating against a roller 589, that is journaled on a lever 590 pivotally connected by pivot pin 591, carried in the bearing 566. The end of this lever 590 is connected by a rod 592 with the switch 587, Fig. 48, which is under the tension of a spring 587'. The closing of the switches 579 and 587 occurs when the ejector shaft 567, has opened switch 370 thus interrupting the feed clutch circuit and bringing the feed to a stop. By the closing of the switches 579 and 587 the delivery shaft 115 is set in motion to perform the function of removing a sewed book from the sewing table; at the same time cam wheel 243 is coupled to the gear 597, Fig. 56, that is loosely mounted upon stud 244, and this gear meshes with gear 599 on the sewing shaft 23 through the medium of an idler 599', Fig. 3. The gear 597 therefore revolves only during the sewing operation, to cut the threads attaching to a sewed book and to the first signature of a new book; but such cutting occurs only after the first signature of a new book has been delivered to the sewing machine and double sewed.

It has been pointed out heretofore that the switch 579 is closed at each revolution of the sewing shaft 23, the switch 579 being included in the circuit which controls the action of the delivery shaft 115 and the coupling of the cam wheel 243 with the gear 597; in the same circuit, however, is also included the switch 587 and until this switch has been closed by the ejector shaft 567, no circuit will be completed to set in motion the delivery shaft. We have described how the ejector shaft 567 has been set in motion by the sewing shaft 23 and how the switch 579 cooperating with switch 587 has caused the delivery shaft to be rotated, and we will now describe the mechanism by which the delivery or removal of a sewed book from the sewing machine is accomplished, prefacing this description with a description of the vacuum control means by which the sewed book is held upon the sewing table after it begins its outward movement with the book.

Ejection of separator plates

Figure 28:
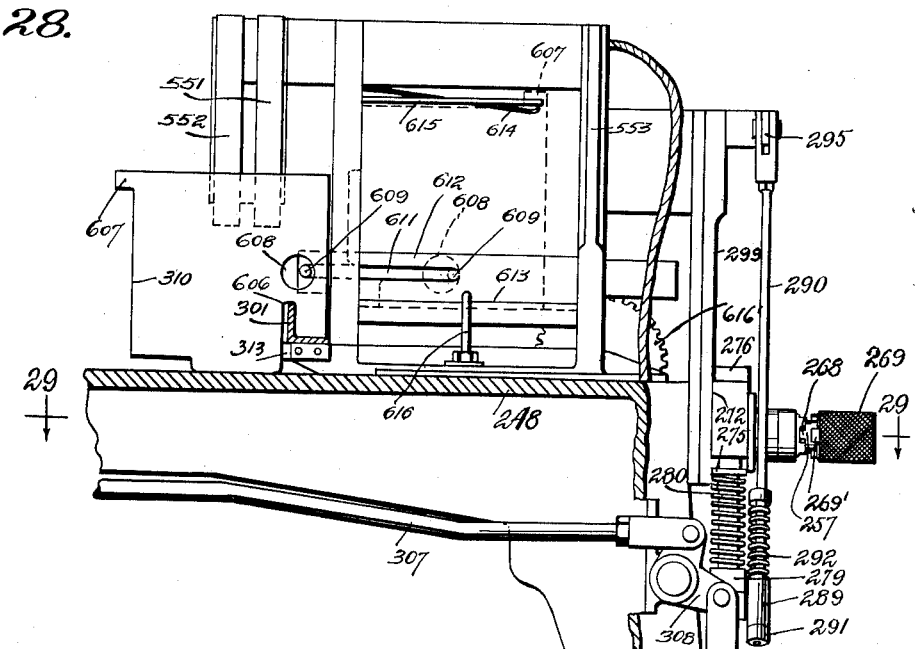
Fig. 28 is an enlarged fragmentary sectional view, the section being taken on line 28—28—Fig. 24.

Before the feeding or picking up of a new signature of a new book can take place, the metal separator plates 310 that, contacting with contacts 551 and 552, closed the relay circuit 554 and the switch 556 and thereby set in motion the shaft 567, which we have designated the ejector shaft, must be removed from the stack of signatures, and we will now describe the means by which this is accomplished. The separator plate 310 comprises a flat sheet of metal, Fig. 28, provided at one side with a slot 606 for accommodation of the rail 301, heretofore referred to, and by which it is held connected with the rail as the separator plate 310 is advanced along the table 248 during the feeding of the signatures. The top edge of the separator plate 310, is provided with a lateral projection 607, which when the plate 310 is tilted or turned on its side as shown in dotted lines, Fig. 28, becomes a vertical projection, its purpose appearing presently. Near one side, the plate 310 is provided with an orifice or hole 608, and it will be noted from Fig. 1, that the side area of the plate 310 which includes the orifice 608, projects beyond the ends of the signatures. Referring to Fig. 27, the orifice or hole 608 in the plate 310 is always disposed in alinement with a pin 609, that is provided on a horizontal rack 610 and projects through a slot 611 provided therefor in a bearing or guide 612 supported upon the table 248. The alinement of the hole 608 with the pin 609 is always insured by the rail 301. When the last signature that is to make the book has been removed from the table 248, the metal separator plate 310 that was immediately behind such last section and that is advanced as the stack of signatures is advanced, is moved upon the pin 609. The lateral movement of the rack 610, presently related, the pin 609 of which is now extended through the hole 608 in the plate 310, tilts the plate upon a shelf or ledge 613, Fig. 28, that is supported upon the frame 553 which surmounts the table 248. During the tilting movement of the plate 310, the projection 607 thereof rides over or against a cam surface 614 fastened to said frame 553 and which causes the plate to assume a position at an angle to the vertical, the plate being held in this position so long as the projection 607 remains in engagement with a horizontal bar 615. So soon however, as the plate is moved or drawn sufficiently far to the side to enable the projection 607 to escape the bar 615, which occurs when the hole 608 in the plate 310 is in alinement with a curved post 616, Fig. 28, the plate 310 gravitates to the position substantially as illustrated in Fig. 1. In so doing, the plates 310 are successively collected and stacked, as the post 616 passes through the hole 608 therein. The lateral movement of the rack 610 by which the plates 310 are removed, is accomplished by a pinion 616' journaled upon a shaft 617, Figs. 24 and 27, and in mesh with the rack 610. Also journaled upon the shaft 617 is a pinion 618, that is in mesh with the segmental rack 619 of a bell-crank 620 pivotally mounted upon the front of the table 248, Figs. 24 and 27. The pinions 616' and 618 are arranged to be locked together by a nut 621, the release of which enables the pinion 616' to be rotated independently of the pinion 618. Thereby the rack 610 may be adjusted in conformity with the heights or lengths of the signatures. When the adjustment of the pinion 616' has been made, the nut is manipulated to lock it with the pinion 618 which being meshed with the segmental rack 619, is rotated thereby, as it, (the rack 610) is oscillated, in the following manner. The end 622 of the bell-crank 620 is connected with a rod 623 by which it is operated, the connection with such rod being also a hinging one to enable the end 622 of the bell-crank 620 to move with the table 248 as it is swung to open and closed positions without disturbing the connection with the rod 623. This rod 623 extends through the hollow hinge pintle 251, Figs. 32 and 33, which conjoints the table with the frame member 2 and the bottom end of it is pivotally joined with a connecting rod 624 that is pivotally connected with a crank 625, secured to the ejector shaft 567, Figs. 32, 33 and 48. As the ejector shaft revolves, the rod 623 is actuated, thereby operating the rack 610 through the bell-crank 620, and withdrawing the exposed plate 310, and then returning to normal position.

Vacuum control for sewed book

Referring to Figs. 7, 8 and 15, the table complement 143 is formed with an extension 625 which is provided with a passageway 626, Figs. 4, 5, 6 and 12, in communication with which is a plurality of ports 627 leading to the surface of the table and to a plurality of flexible and compressible cups 628, Fig. 15. To the passageway 626 is connected a hose or pipe 629 which leads to a valve 630, Figs. 3, 60 and 70, that is interposed in a vacuum line 631, running to the vacuum tank 330. The valve stem 632 is under spring tension normally to prevent communication between the hose 629 and the line 631, and is provided with a yoke 633, Figs. 3 and 70.

Figure 70:
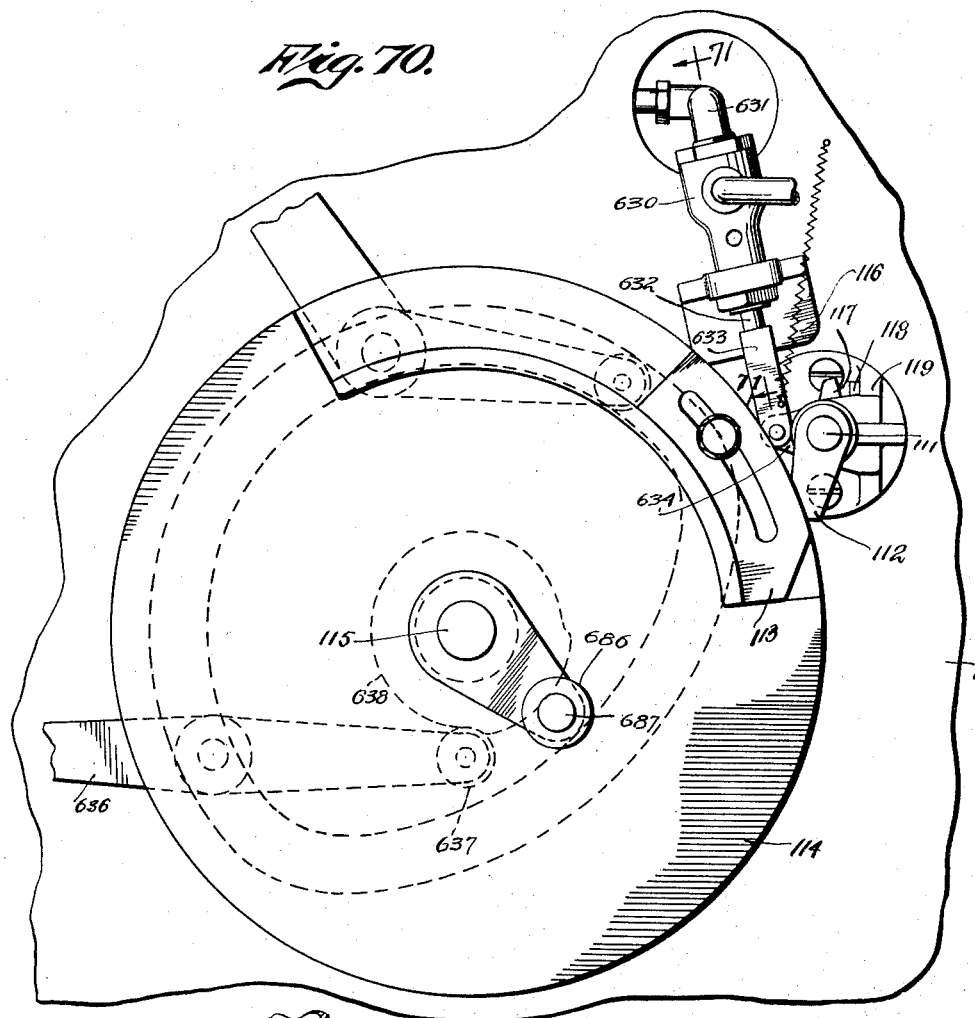
Fig. 70 is an enlarged fragmentary side elevation showing means for simultaneously controlling the thread tension and the clamp table vacuum at the time that a sewed book is to be removed from the sewing machine.
Figure 71:
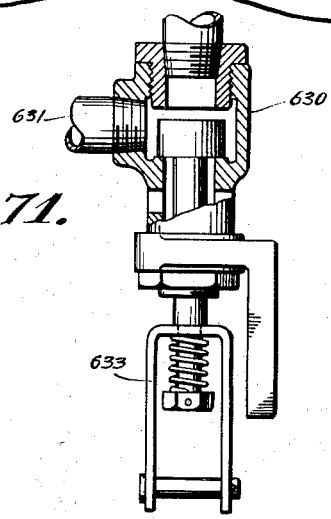
Fig. 71 is a section on line 71—71—Fig. 70.

Hereinbefore we have described the control for the tension and tension relief of the threads and referred to Figs. 3 and 70, in which is shown the stub shaft 111 that is journaled in the side member 1 of the frame, the stub shaft mounting a crank 112 that is in the path of an adjustable abutment 113 carried on the cam wheel 114, secured to the shaft 115, which we have termed the delivery shaft. The revolution of the cam wheel 114, as already related in particular, operates against the crank 112, whereby through the connections detailed the tension on the threads is relieved for a short period of time, namely that period represented by the length of time required for the abutment 113 to traverse the crank 112. Simultaneously with the relief of the tension on the threads and just prior to the opening movement of the table 143, the vacuum valve 630 is operated and the vacuum line opened to the flexible cups 628 on the table upon which the sewed book is now held by the vacuum. The means by which this is accomplished comprises the following, reference being made to Figs. 3 and 70. On the stub shaft 111, is also keyed a crank 634, to which the yoke 633 of the valve 630 is pivotally connected. As now the cam wheel 114 revolves, the delivery shaft 115 on which it is mounted being now in motion, the abutment 113, operating against the crank 112, turns it and the stub shaft 111, also the crank 634. Thereby the tension on the threads is relieved simultaneously with the operation of the vacuum valve 630 and with the movement of the clamp table complement 143 away from its companion part 142, Fig. 12, the vacuum now holding the book upon the table and the tension relief providing the slack thread needed. While the delivery shaft 115 is rotating, all other shafts are at rest.

Hereinbefore the means for locking and swinging the clamp table part 143 have been fully described, (see parts 173—190). Referring again to the parts thus described, it will be seen that as the cam wheel 114 revolves and the roller 189 on the end of the bell-crank lever 188, tracks in the eccentric portion of the cam groove 190, the bell-crank lever 188 will be moved about its fulcrum thereby through the connections already recited, carrying with it the table complement 143, which, as stated is pivoted for movement on the shaft 145 independently of the companion clamp table part 142.

When during the revolution of the cam wheel 114, the abutment 113 thereon rides under the crank 112, the stub shaft 111 is turned and the tension relief and vacuum valve 630 are operated simultaneously as mentioned. The actuation of the vacuum valve 630 and the tension relief continue until the abutment 113 has passed beyond the crank 112, which thereupon is returned to normal position with the stub shaft 111 by the spring 116, Fig. 3. Thereby the tension is immediately restored and the vacuum line closed. The book being now no longer held connected with the table 143 by vacuum is dragged therefrom by the threads which are now again under tension, as the table complement continues its outward movement to substantially the position illustrated in Fig. 12, at which time the sewed book has dropped upon a pair of tables, presently described, with the threads still attached thereto as seen in Fig. 12.

Upon the completion of the outward movement of the clamp table complement 143 and the return to normal thereof, which position is illustrated, for instance, in Fig. 6, the cam 114 by which the movement of the table was accomplished comes to a halt, but before doing so, switch 634 is closed, thus energizing solenoid 360 whereby, through the media already particularized, the feed cam 336 is set in motion for starting the feed of a signature for a new book.

The actuation of switch 634 is brought about by rod 635 connected to said switch and to a lever 636 fulcrumed in the side frame plate 1. In the end of this lever 636 is a roller 637 that rides on a cam 638 secured to the delivery shaft 115, Fig. 34. The cam 638 revolves with the shaft 115, as does also the cam wheel 114. Just after the cam wheel 114 has, through the described connections, closed the book table 143, after delivery of a book, and just prior to coming to a rest, the cam 638 has closed the switch 634 with the result already noted.

Circuit control by book table 143

The clamp table complement 143 is provided with a push button 640, Figs. 9 and 9a, which is in an insulating block on the table complement 143. Mounted on the table complement 142, are switch elements 641 and 641', which are in the electrical circuit M. When the table complement 143 is moved away from its associate part 142, either automatically as described during the delivery of a sewed book, or manually, the contact of the switch elements 641 and 641' is broken, thereby interrupting the circuit, in which are included said contacts 641 and 641', switch 642, operable by push button 643, switch 364, and switch 634, the switch 642 being manually operable, and the switches 364 and 634 being respectively and sequentially operable by the sewing shaft 23, and delivery shaft 115, to control the operation of the clutch for the feed cam 336. With the book table open and moving to open position and contact of the switch element 641 and 641' broken, the feed cam 336 and consequently the sewing shaft 23 remain stationary. When the book table 143, as explained, is returned to normally closed position, the operation of the feed cam 336 follows the closing of switch 634 and the engagement of the switch elements 641 and 641'.

Renewal of feed and sewing

The feed cam 336 being now in motion, and the lateral cam surface 500 thereon having operated the switch 504 which includes the solenoid 505 that operates the valve 509, and the vacuum line being now opened to the vacuum tank 330, the fingers 323 will pick a signature from the stack and deliver it to the open jaws of the sewing machine. As explained, the withdrawal of the fingers 323 from the jaws of the sewing machine and the elevation of them, causes the dog 518, through the mechanism detailed hereinbefore and illustrated in Figs. 35, 36, 37 and 38, to close switch 524 whereby the sewing shaft 23 is set in motion. As the sewing of the signature is completed by the revolution of the sewing shaft 23, the switch 364 is closed by the sewing shaft and the feed fingers 323 are again operated, but in order to effect a second sewing of the signature delivered, the vacuum line must be opened and switch 547, which, with the vacuum line open would be operated by the dog 518 and stop the machine, must be bridged, to prevent the interruption of the flow of current, and the manner in and means by which this is done, will now be explained.

Vacuum and circuit control for second sew of first signature

Previously herein, we have explained how the sewing shaft 23 has operated switches 579 and 587 and thereby set in motion the delivery shaft 115 and simultaneously operated solenoid 593 which has removed the release plate 595 and thereby caused the interengagement of the respective clutch elements contained on the gear 597 and on the shaft 244. We have also described that the gear 597 derives its motion solely from the sewing shaft 23, hence during the operation of the delivery shaft 115, the sewing shaft 23 being at rest, the gear 597 now coupled as explained, to the cam 243, is also at rest. It will be understood, of course that the gear 597, is free to revolve independently of the shaft 244 with and when the sewing shaft revolves.

Heretofore in connection with the description of the thread cutting means, (222—246), we have explained, referring to Fig. 34, how the bell-crank arms 238 and 240 are rocked by the cam wheel 243 to operate the shear blade 222 relatively to the shear bar 142 and cut the threads. When now the sewing shaft 23, has revolved and performed the first sewing on the first signature of the new book, the cam wheel 243 has also made a partial revolution with said shaft 23, but the bell-crank arm 240 is not rocked so long as its roller 241, rides in the concentric area of the cam way in the wheel 242. The switch 364 being again operated by the sewing shaft 23, sets the feed in motion, but to effect a second sew of the first signature that has already been sewed once, the vacuum must be kept closed so that no signature is picked up by the fingers 323, though their motion is not interrupted, and this is accomplished by the opening of a switch 644', which is in the electrical circuit, in which is also the switch 504, and solenoid 505 which actuates the vacuum valve 509. The switch 644' is under the tension of a spring 645, Fig. 48, and is connected to one end of a rod 646. The other end of said rod 646 is pivotally connected to a lever 647 which is secured upon a horizontal shaft 648, that is oscillatable in a tube 649 supported in bearing brackets 650 secured to the frame of the machine. To the horizontal shaft 648 is also secured a lever 651, that is held in constant engagement with a peripheral cam surface 652 on said cam wheel 243, by said spring 645. As the cam wheel 243 revolves, the switch 644' will be opened through the connecting means just described and thereby the circuit which includes the solenoid for actuating or opening the vacuum valve 509 is broken, so that as the fingers 323 descend into the open jaws of the clamp table, they will do so without having picked up a signature. Since, as explained herein, the descent of the arms 320 with the fingers 323 causes the dog 518 to elevate and since at this time, the hooked end of the rod 545 is in line with the movement of said dog 518, because, the vacuum line closed, the piston 516 has not been drawn into its housing with the rod, it will be seen that the lifting of the rod 545 by the dog 518 would immediately operate the switch 547, thereby interrupting the circuit which would bring the machine to an immediate stop. To avoid this, switch 653 is closed before switch 547 is opened as above explained, and these switches being included in the electrical circuit, the continued flow of current is not interrupted. Switch 653 is contained in the switch box 578 and is under the tension of a spring 654. The switch 653 is pivotally connected to one end of a rod 655. The other end of said rod 655 is pivotally connected to a lever 656 which is secured to the sleeve or tube 649 in which the shaft 648 is oscillatable. To the sleeves or tube 649 is also secured a lever 657, that is held in constant engagement with a peripheral cam surface 658 on the cam wheel 243, by the spring 654. As the cam wheel 243 revolves, the switch 653 will be closed by the connections just described, before the switch 547 is opened and the circuit broken by and as the feed arms 320 travel into the sewing machine area. When these arms 320 now return to normal position, switch 653 operating in conjunction with switch 524 completes the circuit which the cut out of switch 547 interrupted.

Thus the sewing shaft 23 is operated to perform the second sew on the first signature of the new book, such second stitching operation occurring after the signature has been shifted by the jogging members 462 upon the opening of the clamp jaws. During the second sewing of the first signature of a new book, the cam 243 on the stud 244, will be rotated and such rotation causes the eccentric area of the cam wheel 243 to traverse the roller 241 on the end of the bell-crank leg 240, Fig. 13. By such traverse of the roller 241, the bell-crank 235—234, through the connections set out before in the description of the thread cutter (222—246) is operated and thereby the lever 230, whereby the shear knife or blade 222 severs the threads that still connect the finished or sewed book with the first sewed signature of a new book. As previously stated, when the table 143 has moved outwardly, for a short distance, the book thereon is dragged therefrom by the threads, and the book falls upon a pair of tables from which it is caused to gravitate by the tilting thereof to a chute.

The table and its operation

Figure 13:
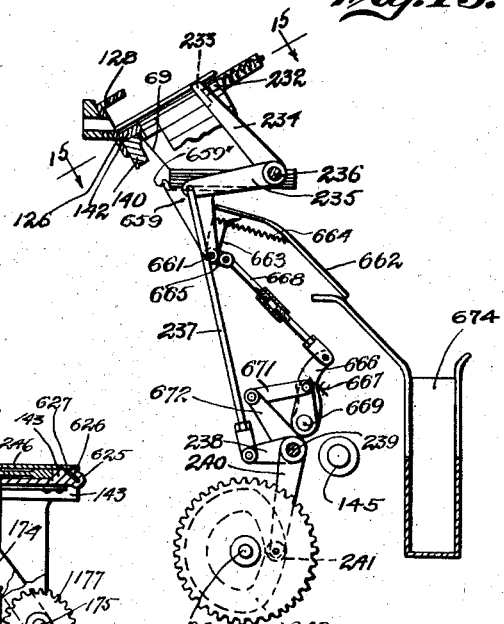
Fig. 13 is a sectional side elevation, illustrating diagrammatically the thread cutting mechanism, the book receiving shelf in operative position, the linkage for dumping the shelf, and the book conveying chute.
Figure 14:
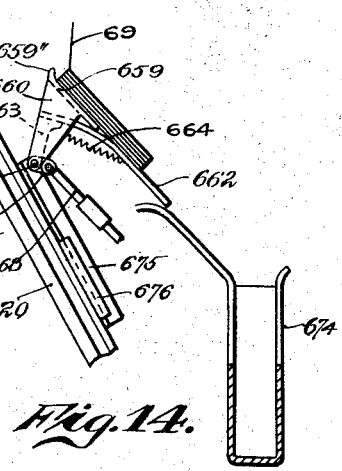
Fig. 14 is an enlarged fragmentary view showing the book receiving shelf in the tilted position for delivering the book to the chute.

Upon the clamp table 120, hereinbefore described, is mounted for pivoting movement a table 659, Fig. 12, the structure of which is shown in Fig. 14 and embodies a flat surface or table top having downward projections 660 by which the table is pivotally mounted upon horizontal pins 661. Co-operating with this table 659 is a complementary table or shelf 662 also provided with lateral extensions 663 by which the shelf 662 is rotatably connected with said pins 661. The shelf or table complement 662, as seen in Fig. 12, is a curving or bended body, the front portion of which forms a continuous plane surface with the table top 659 when in normal position, and the rear portion of which is disposed between the projections 660 of the table 659. The table 659 is provided with stops which are held against the extensions 663 of the complementary table 662 by springs 664. One of the extensions 663 is provided with a crank 665 which is pivotally connected with one leg 666 of a bell-crank lever 667, by a connecting rod 668. The bell-crank lever 667 is keyed to a shaft 669 that is rotatably carried in suitable bearings provided on the clamp table plate 120. The other leg 670 of the bell-crank 667 is connected by a link 671 with the lever 672 that is keyed to the stud 239 already referred to and the oscillation of which is effected by the lever 240, through the medium of the cam 243. Immediately succeeding the cutting of the threads, which occurs, as explained, by the movement of the lever 240, the lever 672 is operated by the lever 240, and its motion is communicated to the bell-crank 667 and through the connections detailed, to the bell-crank 665. The rocking of this bell-crank 665 tilts the table complement 662, which is held by the threads still connected with the book, to the position shown in Fig. 13. In so doing, the spring 664 is placed under tension which is exerted upon the table 659 upon which rests the finished book and the threads of which are still connected to the first signature of a new book. These threads prevent the movement of the table portion 659, which as seen is provided with a flange or lip 659'' against which the back of the book is held by the threads, until the table complement has assumed the inclined position shown, when the tensioned spring 664 tilts the table 659 to the position shown in Fig. 14, just after the threads have been cut, causing the finished book to gravitate from the table and its complement into a chute 674.

The entire table assembly just described is adjustably mounted on the clamp plate 120 for accommodating books varying in thickness. For this purpose the pins 661 are mounted in angle bars 675, which are longitudinally adjustable relatively to the clamp plate 120 and which after adjustment are locked in position by a plate 676 and clamp screws 677, as seen in Figs. 14 and 61.

The chute and stacker

Heretofore we have described how the sewed book, after the double sewing, is dumped from the table 662 into the chute 674. This chute 674 is connected to the table 248 and swings therewith, and when in operative or closed position, is in line with a chute complement 678, that is supported at the rear upon a bracket 679 projecting from the frame plate 1, and at the front is connected to a rack 680 into which the books are successively delivered as they are finished, see Figs. 1, 2, 3, 5 and 72. The rack 680 is supported by brackets 680' and is provided with a step 681 that is disposed in line with the outlet from the chute complement 678. The step is elevated with respect to the rack 680 and is of a width that will accommodate a book of any thickness, and is provided to form a back stop for the books as they are removed from the step and caused to gravitate to the rack.

Means for removing the books in continuous succession from the step is provided in a push member 682, Figs. 72, 2 and 1, that is mounted upon the end of a rod 683. The rod 683 is slidable longitudinally in the said brackets 680' and for this purpose, mounts a lug 684 having a vertical groove 685 in which is operatively disposed a roller 686. The roller 686 is journaled on a stud 687 that is eccentrically mounted on the cam wheel 114, which, as before stated, is keyed upon the shaft 115, and which cam 114, as explained, controls the opening of the book table with a completely sewed book thereon. Each complete revolution of the cam wheel 114 and its stud 687 produces a reciprocation of the rod 683 and its push member 682, after which it comes to a halt with the halting of the cam 114.

Assuming that the machine is in operation and that a sewed book, having been dumped from the table or shelf 662, has lodged upon the step 681 in the rack 680, the rotation of the cam 114 at the time of completion of sewing of a book, operates the movable portion of the clamp table and carries the completed book away from the sewing machine. The sewed book, as explained, drops from the movable section of the clamp table, as and by the means explained, onto the shelf or table 662 and during this operation, the push member 682, operating concurrently with the removal of a sewed book, moves a previously deposited book from the step of the rack. It is then restored to original position by the cam 114, preparatory to repeating the operation.

Drive

The drive of the interrelated mechanisms entering into the organization of the machine described, is effected primarily through the medium of an electric motor 688, Fig. 2, the shaft 689 of which is provided with a sprocket 690 that is connected with a sprocket 691 by a chain 692. The sprocket 691 forms an integral part of a toothed fly wheel 693 that is loosely mounted upon a tie rod 694 carried by the frame plates 1 and 2 and projecting beyond the frame plate 2. The toothed fly wheel 693 meshes with a gear 694', on the shaft of a vacuum pump 695, which maintains the tank or chamber 330 exhausted of air during the performance of the machine, for the purpose already related. Integral with the fly wheel 693 is a pinion 696, which meshes with an intermediate gear 697, journaled on a stud 698 extended through and secured in the frame plate 2. This intermediate gear 697 is provided with a pinion 699 which meshes with the gear 540, to which reference has hereinbefore been made, and which is mounted on the shaft 23 hereinbefore designated the sewing shaft. Recapitulating the train of gears that constitutes the driving force for the various mechanical expedients provided to perform the functions of the machine in systematic sequence, and referring in particular to Fig. 2, the gear 540 meshes with the gear 337, on the stud 338 in the frame plate 2, and this gear 540 is provided with the pinion 571'', meshing with an idler 571', suitably supported upon the frame plate 2; the idler 571' meshes with a gear 571, that is loosely mounted upon the shaft 567, which hereinbefore we have referred to as the ejector shaft, and as including the mechanism by which the separator plates 310 are removed from in front of the stack of signatures, as previously explained.

Also in mesh with the idler 571' is the gear 584, that is loosely mounted upon one end of the delivery shaft 115, this shaft being rotatable in the frame plates 1 and 2 and mounting on the other end the cam wheel 114 for controlling the opening of the book or clamp table, as set out. When the motor 688 is running, the entire gear train, just described is set in motion and with the exception of the pump gear 694', rotates idly until the operation of the machine is initiated by the closing of switches 642—644 through button 643, and switch 88, through button 87''', it being noted that the switches 642 and 644 are simultaneously operated by the push button 643 whereby the solenoid 360 is energized to effect the operation of the signature feed, and the solenoid 560 may be energized to effect the operation of the ejector shaft 567, in the event that at the start of operation of the machine a metal separator plate 310 is exposed. If such a plate is not exposed, the manipulation of button 643 will operate merely to energize the feed solenoid 360 and to initiate this operation, assuming of course that switch button 87''' has also been manipulated to cause switch 88 to contact with contact plate 92, Fig. 51, this switch controlling the flow of current through the entire electrical circuit.

It will be understood that while all of the solenoids, namely 360, 505, 526, 560, 580 and 593 are shown in parallel with the switch 88, which is included in the main electrical or power circuit, no restriction to such definite arrangement is intended thereby, since we have found that in practice it may ofttimes be desirable and advisable to eliminate some of the solenoids from the circuit which includes this switch 88. For instance, when due to any breakage of thread, at the time that the second sew of a finished book, stops the machine in the manner described, by throwing out this switch 88 and thereby interrupting the supply of electrical energy, the delivery shaft clutch though thrown in, will fail to operate. For this reason it may be advisable to re-arrange the circuit so as to include only the feed solenoid 360 and the ejector solenoid 560, and this may readily be done without involving any departure from the spirit of the invention.

Referring to Fig. 4 and Fig. 75 a treadle 710 is provided for operating the sewing clutch release plate 534 when it is desired to oversew signatures in the ordinary manner, without employing the automatic features. Such sewing, with manual feeding of the signatures, can occur only when the swinging table 248 is open, the open portion of the table, as previously explained breaking the contact of the switch elements 641 and 641' and interrupting the electrical circuit in which are included the switches for controlling the automatic feeding of the signatures and the sewing.

The treadle is oscillatably mounted upon a tie rod 711 which conjoins the side frames 1 and 2 of the machine. By means of a rod 712, the treadle is connected with an ear 713, Fig. 4, that projects rearwardly of the main clamp plate 120, which with its complements, is arranged to be swung upon the tie rod 48 when access to the sewing machine or its parts is desired. The rod 712 is provided with a stop 714, for limiting the up or return movement of the treadle under the influence of a spring 715. Also connected with the treadle 710 is a rod 716, the upper end of which is slidingly associated with the end of a lever 718 pinned on the shaft 532, on the end of which is mounted, as heretofore described, the clutch release plate 534 for the sewing shaft 23, which carries the clutch complements 536 and 539. The sliding connection of the rod 716 with the lever 718 which is a limited one is for the purpose of enabling the solenoid 526 to actuate the release plate 534, without affecting, or being impeded by, this rod 716, and on the other hand to enable this release plate 534 to be actuated by the treadle 710 independently of the solenoid, when the automatic sewing of signatures is not desired. At the same time, the connection of the treadle 710 with the ear 713 on the rear of the plate 120 through the rod 712 acts as a lock for preventing the depression of the treadle and operating the sewing clutch release plate when the table plate 120 is swung open about the bearing tie rod 48. The rod 712 is provided for this purpose with a nut or stop 717, which engages the underside of the treadle when the clamp plate 120 is opened, thereby preventing the depression of the treadle.

Operation

The ensuing is a description of the operation of the machine, as herein described, it being understood that the various instruments and their interrelation referred to and explained are exemplary merely and preferential of selected means which in practice have proved satisfactory, sufficient and efficient. The description of the performance of the machine will proceed in its sequence in which the various functions of the correlated mechanisms are carried out and in this connection, where reference is made to clutches, it will be understood to mean the entire organization of elements that contribute to the transfer of motion from a driving element to a driven element.

Assume that the motor 688 and the entire gear train is in motion, the vacuum pump also in operation and the vacuum tank 330 maintained exhausted of air. It will be understood from the foregoing detailed description of the mechanical arrangement of this machine, that the sequential operation of the elements by which the functions of the machine are carried out, are electrically controlled automatically in regular order. To initiate the feed, which is the first operation of the machine, the normal position of the clamp jaws 124 and 142—143— being open, push button 87''' is manipulated to close switches 88 and 92, through which the electrical current is supplied. Push button 643 is then manipulated to close switches 642 and 644, whereby solenoid 360 is energized and the release plate 358 is operated to cause dog 353 to connect clutch elements 354 and 355, by which the feed cam 336 is set in motion. Through the connections indicated, the feed arms 320 are elevated and the fingers 323 are moved against the stack of signatures, a vacuum through the fingers 323 being created at this time by the opening of valves 509 through the solenoid 505 and switch 504 that has been operated by the cam surface 500 of the cam 336. With the vacuum holding a signature, the fingers 323 are moved free of the stack and magazine table 248. The continued rotation of the cam 336 then carries the arms 320 and fingers 323 with the signature into the open jaws 143 and 124 of the clamp and into the path of operation of the punches and needles, 17 and 21, respectively of the sewing mechanism. Concurrently with the operation of the feed fingers 323, is the advance of the signature stack on the table 248, such advance being effected by the cam 336 the motion of which is communicated through a series of connections including rod 277 and bell-crank 271, to the chain 253 operating against the follower 272a by which the stack is periodically advanced at each operation of the arms 320. Simultaneously with the advance of the signature stack along the table, the front signatures are alined or jogged by the laterally operated jogging finger 302 controlled by the rod 309 also actuated by the cam 336. While the fingers are depositing the signature upon the clamp table 142—143, such deposition occurring by the closing of the valve 509 which interrupts the vacuum by which the signature has been held connected to the feed fingers 323, the paste applicator 375 is in position to apply paste to the signature next to be picked up by the fingers, see Figs. 32, 33 and 34, and this paste applicator is operated at each movement of the feed arms 320 and in advance of the pick-up by the fingers 323, whereby each signature is supplied with a line of paste.

In the event that the vacuum through the fingers 323 has failed and that therefore no signature is picked up for carriage into the open jaws of the clamp, the operation of the machine will cease and such cessation will be brought about by the opening of switch 547 through the medium of the hooked rod 545, which due to the fact that the vacuum in the cylinder 515 is broken, is projected by the spring 517 into the path of the dog 518 on the shaft 317. This dog 518, rising with the downward movement of the arms 320 engages the hooked rod 545 and, lifting it, opens the switch 547 which is in the electrical circuit controlling the clutch for the sewing shaft. Thereby the machine will come to a complete stop.

When the fingers 323 have carried a signature into the open jaws 142—143 and 124 of the clamp, the switch 504 is opened by the cam face 500 on the cam 336 thereby closing the valve 509, as stated, and breaking the vacuum, whereupon the signature is deposited upon the book or signature table 142—143, and the fingers 323 are withdrawn. It will be understood that the normal position of the clamp jaws 143—142 is open. As the feed arms 320 are now withdrawn, the deposited signature is alined with signatures already sewed, if any, by front and side joggers 440 and 462 respectively, these joggers being operated by the cam 336, as explained, each time that a new signature is deposited to within the clamp jaws. During the withdrawal of the fingers 323, switch 524 is operated by the dog 518, latch 519 and rod 521, thereby energizing solenoid 526, which through the dog 537, release plate 534 and clutch elements 536 and 539 set in motion the sewing shaft 23. Meanwhile the feed clutch completes a revolution and then comes to a stop. The sewing shaft 23 is now in motion and the clamp 143—142 is elevated by cam 153, crank 150, link 149 and friction box 147, thereby clamping the signatures in position for punching and sewing, which operations follow immediately upon the clamping of the signatures and upon the introduction of the local signature supporting teeth 96' for the purpose of providing additional support adjacent to the punches, these teeth being actuated to operative and inoperative position by the cam 102 fixed on the shaft 23. The slide 12, mounting the punches and needles, is operated by the cams 22 and 22' in a downward direction to punch the signatures and in an upward direction to pass the threaded needles through the perforations made by the punches. Succeeding this, the slide is withdrawn by the cams 22 and 22' for a short distance to cause loops E to be formed by the threads 69 above the signature that is being sewed onto signatures already sewed. During the introduction of the needles with the threads into the perforations made by the punches, the rod 68, over which the threads pass, is elevated by the cam 73 on the sewing shaft 23, to provide the slack necessary in the thread for the movement of the needles. At this point, the cams 22 and 22', now maintaining the slide in a dwell position, the cross thread needles 40 and 41 are operated to carry cross threads 40' and 41' through the loops E, (Fig. 44). When these cross threads have been carried through the loops, the pins 53 are operated, as explained, to catch the threads and hold same until the cross needles 40 and 41 are returned to normal position. Thereupon, the rod 68 is operated to tighten the loops E upon the cross threads that are still held by the pins 53. Immediately succeeding this operation, the slide 12 is returned to normal position in a downward direction, such downward travel operating, by the mechanisms detailed, to retract the pins 53 from the loops of the cross threads, that are now held tight upon the surface of the signature. At this point, all cams come to rest, with the clamp jaws 142—143 open, preparatory to a repetition of the operations above set out, this repetition being continuous until a book of signatures is completely sewed or until some accident stops the machine, as for instance, where a thread or threads break, or the tension of the thread or threads fails. In either of the events noted, the machine will come to a stop, and the stop of the machine will occur with all of the parts of the machine in normal position. The means by which the machine is caused to stop when any thread breaks or upon failure of the tension, is illustrated in particular detail in Figs. 73 and 74, from which it will be seen that with the tension removed or a thread broken, a circuit will be completed through contacts 79 and 80, 89 and 90 and coil 86 to open switch 88, which interrupts the main circuit.

Assuming now that the last signature of a book has been removed from the stack and sewed, it being noted that the stack is divided into a series of books by the series of metal separators 310, it will be seen that thereby a metal separator is exposed and immediately engages the contacts 551 and 552, which are in a relay circuit, that includes the coil 555 and switch 556. The engagement of the metal separator 310 with the contacts 551—552, closes the relay circuit and energizes the coil 555, which closes the switch 556 preparatory to throwing in the ejector mechanism for the separator plates with the next operation of the signature feed clutch. The last signature having been delivered to the clamp, as explained, the punching and sewing takes place in normal manner, the revolution of the sewing shaft operating again, as explained, to control the electrical mechanism for actuating the feed. Due to the fact that the relay switch 556 has been closed by a metal separator plate 310, both the feed clutch elements 354 and 355 and the ejector clutch elements 569 and 570 are caused to engage. At the same time, the teeter bar 576 is operated to open switch 559 which controls the vacuum valve 509 through the medium of the solenoid 505, that is, the operation of the solenoid will be prevented and the vacuum line will remain closed. Also by the operation of the teeter bar 576, the switch 577 will be closed, thus maintaining closed the electrical circuit which otherwise would be interrupted by the opening of switch 547 by the dog 518 and rod 545, during the descent of the arms 320. With the vacuum interrupted, it will be seen that the feed fingers 323 during their normal movement, at this time will pick up no signature, but the sewing clutch elements 539 and 536 being caused to re-interengage by the feed arms, the last signature delivered into the clamp will be double sewed. During the double sewing operation, the ejector shaft 567 is in motion and through the instruments detailed, to wit, rack 610, pinion 616', gear 618, segment 619, Fig. 27, and crank 625 and rod 624, Fig. 48, the exposed metal separator 310 is removed from the face of the stack, as explained. When switch 364 is operated by the sewing shaft 23 again to operate the feed arms 320, the ejector shaft is in motion, as stated, and by such motion of the ejector shaft, the switch 370 is operated by lever 603 and connecting rod 604, through the medium of the cam roller 602 and cam 601 on the ejector shaft. The opening of switch 370 interrupts the feed clutch circuit, causing thereby the feed arms 320 to come to a halt in normally elevated position, as shown in Fig. 32. The continuing revolution of the sewing shaft 23 operates or closes switch 579, through cam 365' on the sewing shaft 23, the switch 579 operating the delivery and thread cut clutches or elements, as described, this switch 579 co-operating for this purpose with switch 587 which has been closed by the ejector shaft 567. As hereinbefore related, the gear 599 which drives the thread cut gear 597 is driven by the sewing shaft and hence revolves only during the sewing operation.

Switch 587 is closed by a cam 588 on the ejector shaft 567, the cam operating against a lever 590, to which is connected a rod 592. Immediately upon the setting in motion of the delivery and thread cut shafts, the sewing shaft 23 comes to rest the clamp being open. The delivery shaft 115 is now in motion and functions to open the book table 143 to carry the sewed book out of the region of the sewing mechanism; prior to the opening of the book table, the thread tension is relieved to give the slack needed, and the vacuum is applied to the table for holding the book upon the table which is now moving to open position, Fig. 12, the vacuum being applied through the valve 630 that is opened simultaneously with operation of the thread tension relief by the abutment 113 on the cam 114. Before the table completes its movement to full open position, as shown in Fig. 12, the thread tension is restored, by the co-operation of the abutment 113 and crank 112, and the vacuum is broken, so that during the continued movement of the table, the book is held stationary with the result that it drops upon the shelf 662, as shown in Fig. 12.

The continued rotation of the delivery shaft 115 will now release the pressure of the friction plates 155 from the bars 146, through the medium of cam 205, lever 201, rod 198, and the key connection to shaft 161, as shown in Figs. 9 and 61. Thereupon the book table is elevated or restored to normal position prior to its return to within co-operative relation to the clamp head 124, the restoration being effected by cam 221 keyed to delivery shaft 115 through levers 219 and 216, rod 210, spring 212, weight 172, chains 170, operating over sheaves 171 on the tie rod 48 and connected to the flat bars 146, Figs. 5, 62 and 63. When the table and its flat bars 146 have been restored to position for receiving the first signature of a new book, the pressure of the friction plates 155 is again applied to the flat bars 146. Thereupon the book table is moved to closed position, as shown in Fig. 13, through the segmental gears 178, cam 114, and intermediate connections as described, Fig. 12; the opening of such book table is accomplished by the same means.

Just before the delivery shaft 115 comes to rest, cam 638 rocks the lever 636 and thereby closes switch 634, which action again initiates the operation of the feed mechanism. The first signature of a new book is now picked up and carried to the sewing mechanism and sewed in manner as already described. The thread cut gear revolving with the sewing shaft 23, will have revolved cam wheel 243, which operating connections including shaft 648, Fig. 56, opens switch 644' that interrupts the flow of current to the solenoid 505 and therefore fails to operate the vacuum valve 510, so that as the fingers 323 are brought into contact with the next signature, they will not pick up a signature, but, as stated, will perform their motion into the open clamp jaws without a signature. At the same time switch 653 will be closed by the cam wheel 243, operating connections which include tube 649, this switch then bridging the switch 547, which the failure of the vacuum caused to be opened, as stated; and maintaining a closed circuit for the next operation of the sewing clutch, thereby causing the first signature delivered to the clamp to be double sewed. During the second or double sewing of the first signature, the shear blade 222, Fig. 15, is operated by the bell-crank lever 234, through connections and cam 243 to sever the threads that still connect a sewed book with the first section of a new book. At the same time, the table 662 is operated through the linkage shown in Fig. 13 and cam 243, to dump the book therefrom into the chute 674, from which it gravitates onto the step 681 in the rack 680, and from which step it is periodically removed ahead of another book by the push bar 682, which is operated by the eccentric roller 686 on the cam 114 mounted on the delivery shaft 115. By the time that the first signature is double sewed, the switches 644 and 653 are restored to normal by the cam 243, and the feeding and sewing of signatures is then resumed, as first explained.

What we claim, is:

1. A machine for continuously making books, comprising a sewing mechanism, means for continuously feeding sections successively to said sewing mechanism, and means alternately controllable by said sewing mechanism and feeding means to control the operation of said feeding means and sewing mechanism.

2. A machine for continuously making books, comprising a sewing mechanism, means for continuously feeding sections successively to said sewing mechanism to be successively sewed to other sections, and means electrically controllable by said sewing mechanism and feeding means to control the alternate operation thereof.

3. A machine for automatically making books, comprising a sewing mechanism, means to feed individual sections to said sewing mechanism in continuous succession to make a book, and means to remove books of sewed signatures, and means to stop the sewing and feeding operation during the books' removal.

4. A machine for making books automatically and continuously, comprising means for binding signatures together, means for feeding signatures successively to said binding means, means to remove the books as they are successively bound and means to stop the binding and feeding means during the removal of bound books.

5. A machine for automatically making books, comprising means for diagonally sewing one signature to the next in continuous succession, means for continuously feeding to said sewing means the number of signatures required for a book and means to stop the feed temporarily when such number of signatures has been fed.

6. A machine for making books, comprising means for diagonally sewing one signature to the next in continuous succession, means to feed signatures in continuous succession, and means to stop the sewing and feeding means when a signature fails to be fed to the sewing means.

7. A machine for making books, comprising means for diagonally sewing one signature to the next in continuous succession, means for continuously feeding signatures to said sewing means and means to interrupt the feeding when any predetermined number of signatures has been fed.

8. A machine for automatically making books, comprising means for binding signatures together, means for feeding signatures successively to said binding means, means for continuously advancing the signatures to the feeding means, and means advancing with the signatures for controlling the feeding means.

9. A machine for making books, comprising automatic means for diagonally binding signatures together, means for feeding signatures to said binding means, and means controllable by said feeding means for advancing signatures to said feeding means.

10. A machine for making books automatically, comprising means for binding signatures together, means for continuously feeding individual signatures to said binding means, and means for preventing the operation of said binding means and feeding means when the signatures required for a complete book have been fed.

11. A machine for making books automatically, comprising a support for signatures and means dividing the signatures into sets comprising books, a sewing mechanism, means to transfer signatures consecutively to said sewing mechanism, and means controllable by said dividing means to interrupt the transfer of signatures.

12. A machine for making books automatically, comprising a support for signatures, means dividing the signatures into sets constituting books, a sewing mechanism, means to transfer signatures in continuous succession to said sewing mechanism, means controllable by said dividing means to interrupt the transfer of signatures, and means to remove said dividing means.

13. A machine for making books automatically, comprising a support for signatures, means dividing the signatures into sets constituting books, a sewing mechanism, means to feed signatures in continuous succession to said sewing mechanism, means controllable by said dividing means to interrupt the feeding of signatures, and means controllable by said dividing means to remove said dividing means.

14. A machine for making books automatically, comprising a clamp, means for continuously supplying signatures to said clamp, means for continuously binding each signature supplied upon previously sewed signatures, means to remove a book of sewed signatures from said clamp, and means to sever the sewing threads.

15. A machine for making books automatically, comprising a support for signatures, plates dividing said signatures into books, a clamp, means to deliver signatures from the support to said clamp in continuous succession, means to bind together the signatures so delivered, means controllable by said plates to stop the delivery of a signature by said delivery means and means to operate part of the clamp to remove a sewed book from the clamp.

16. A machine for making books automatically, comprising a clamp means, a support for signatures, means dividing the signatures into sets representing books, vacuum means for picking signatures consecutively from said support and conveying same to said clamp means, binding means for the signatures and means controllable by said dividing means to open the vacuum whereby no signature will be conveyed.

17. A machine for making books automatically, comprising a clamp, a support for signatures, means dividing the signatures into sets representing books, means for conveying signatures to said clamp, means for maintaining a vacuum in said conveying means to cause the adherence thereto of a signature during the delivery thereof to the clamp, a sewing mechanism for the signatures delivered to said clamp, and means controllable by said dividing means to open the vacuum to said conveying means whereby no signature will be delivered.

18. A machine for making books automatically, comprising means for sewing signatures together, means for feeding signatures to said sewing means and means for double sewing the first and last signature of each book.

19. A machine for making books automatically, comprising means for sewing signatures together, means for feeding signatures to said sewing means, and means for controlling the feeding means at the start and finish of a book whereby the first and last signatures of a book are double-sewed.

20. A machine for making books automatically, comprising a clamp, means for feeding signatures to said clamp, means for sewing together the signatures thus fed and electrically controlled means for preventing the feed means from feeding a signature immediately after the delivery of the first and last signature of a book whereby the first and last signatures are double-sewed.

21. A machine for making books, comprising means for binding signatures together, means for feeding signatures to said binding means, means co-operating with said feeding means to apply paste to the signatures, and electrically controlled means operable by said feeding and binding means to control the alternate operation of said binding and feeding means.

22. A machine for making books automatically, comprising a clamp, means for feeding signatures to said clamp, means for binding signatures together, means to apply paste to the signatures and means to dislodge signatures that may adhere to the clamp.

23. A machine for making books automatically, comprising a support for signatures, a binding means for the signatures and means to operate said binding means, a plurality of vaccum fingers, means to move said fingers into contact with a signature in the support, and to said binding means, and electrically operated means to control the vacuum in, and cause, said fingers to pick up a signature and to release same in the binding means.

24. A machine for making books automatically, comprising a support for signatures, a sewing mechanism, a plurality of vacuum fingers, means to operate said fingers successively into engagement with a signature in the support and to the sewing mechanism, and electrical means controllable by said finger operating means to control the vacuum in said fingers sequentially to cause same to pick up a signature from the support and to release same in the sewing mechanism.

25. A machine for making books automatically, comprising a support for signatures, means dividing the signatures into books, a sewing mechanism, vacuum pick-up means to transfer signatures consecutively from said support to and release same in said sewing mechanism, means to control the vacuum in said transfer means, and means controllable by said dividing means to interrupt the vacuum in said pick-up means whereby the sewing mechanism double sews the last section of a book.

26. A machine for making books automatically, comprising a support for signatures, means dividing the signatures into books, a sewing mechanism, vacuum pick-up means to transfer signatures in continuous succession from said support to and release same in said sewing mechanism, a valve to control the vacuum in said transfer means, and electrical means controllable by said dividing means to operate said valve.

27. In a machine of the character disclosed, a support for signatures, means dividing the signatures into sets representing books, a sewing mechanism, vacuum pick-up means to transfer signatures consecutively from said support to and release same in said sewing mechanism, means controllable by said dividing means to interrupt the vacuum in said pick-up means whereby the last signature of a book is double sewed, and means to interrupt the vacuum in said pick-up means to cause the sewing mechanism to double-sew the first signature of a book.

28. In a machine of the character disclosed, a support for signatures, means dividing the signatures into sets representing books, a sewing mechanism, vacuum pick-up means, means to carry signatures consecutively from said support to said sewing mechanism, and electrical means controllable by said dividing means to interrupt the vacuum in said pick-up means whereby the sewing mechanism double-sews the last signature of each book.

29. In an automatic book making machine, means for continuously sewing signatures together, means for continuously feeding signatures to said sewing means, and means for controlling the feeding means to cause the sewing means to double-sew the first signature of each book.

30. In an automatic book making machine, a sewing machine, means for continuously supplying signatures to said sewing machine, and means to interrupt the continuity of signature supply at the beginning of the making of a book whereby the first signature is double-sewed.

31. In an automatic book making machine, a sewing mechanism, means for continuously feeding signatures to said sewing machine and means to interrupt the continuity of signature supply at the beginning and finish of the making of a book while the first and last signatures are double-sewed.

32. In a machine of the character disclosed, means dividing signatures into sets representing books, a sewing mechanism, vacuum pick-up means to carry signatures consecutively to said sewing mechanism, means controllable by said dividing means to interrupt the vacuum in said pick-up means, and means to remove said dividing means from the signatures.

33. In a machine of the character disclosed, a support for signatures, means dividing the signatures into sets representing books, a sewing mechanism, vacuum pick-up means to carry signatures from said support to said sewing mechanism, means controllable by said dividing means to interrupt the vacuum in said pick-up means, means to remove said dividing means from the signature and means to remove a sewed book from the sewing machine.

34. A machine for automatically making books, comprising means for binding individual signatures in continuous succession to sewed signatures, means to remove books of sewed signatures from the sewing machine, and means to sever the sewing threads after the sewing of the signature for a new book has begun.

35. In a machine for continuously making books, a sewing mechanism, means to feed individual sections in continuous succession to said sewing mechanism and means to jog each signature as fed from the ends and front side to aline same with other signatures.

36. In a machine for continuously making books, a sewing mechanism, a clamp, means to supply book sections continuously to said clamp to be sewed by said sewing mechanism, means operable relatively to the ends and to the front of sewed signatures to aline each signature as supplied.

37. A machine for automatically making books, comprising a sectional clamp, means for successively supplying book signatures to said clamp, means for successively sewing each signature as supplied, means for opening a section of the clamp when a certain number of signatures has been sewed, means to cause a sewed book to adhere to the clamp section, and means to remove the sewed book from the clamp section.

38. A machine for automatically making books, comprising a sectional clamp, means for successively supplying signatures to said clamp, means for successively stitching each signature onto other signatures, means to move a section of the clamp with a sewed book thereon from the stitching area, and means to cause the sewed book to be removed from such clamp section.

39. A machine for automatically making books, comprising a clamp table, means for successively supplying book sections to said clamp table, means for successively stitching each book section onto other book sections, means to move said clamp table with a sewed book thereon from the stitching area and means to remove the sewed book from said clamp table.

40. A machine for automatically making books, comprising a clamp table, means for successively supplying book sections to said clamp table, means for successively stitching each book section onto the preceding section, means to move the clamp table away from the stitching means when a book of sections has been sewed, means to relieve the tension on the stitching threads during a partial movement of said clamp table and means to restore the tension on said threads to cause the book to be removed from said clamp table.

41. A machine for making books automatically, comprising a clamp table, means for successively supplying book sections to said clamp table, means for successively stitching each book section onto another, electrically controlled means to move the clamp table away from the stitching means when a book of sections has been sewed.

42. A machine for making books automatically, comprising a clamp table, means for successively supplying book sections to said clamp table, means for successively stitching each book section onto another, means to move said clamp table with a sewed book thereon away from the stitching means, a receiving table, and means to remove the sewed book from the clamp table to the receiving table.

43. A machine for making books continuously automatically, comprising a support for signatures, means for continuously supplying signatures to said support, means for successively stitching each signature as supplied onto another, means for moving said support with a book of sewed signatures thereon away from the stitching means, and means for predetermining the time of movement of said support.

44. A machine for making books continuously, comprising an inclined support, automatic means for continuously supplying signatures to said support, automatic means for stitching each signature as supplied onto other signatures, means to move said support with a book of sewed signatures away from the stitching means, means to interrupt the operation of said supply means and stitching means during the movement of said support, and means to remove the book from said support.

45. A machine for making books, comprising automatic means for continuously sewing together successive sections of a book, automatic means to remove a book of sewed sections from said sewing means, means to stop the sewing means during the operation of said removing means, and means to start the operation of the sewing means after the operation of said removing means.

46. A machine for automatically making books, comprising a stitching mechanism, means to feed signatures continuously to said stitching mechanism, means to remove books of stitched signatures from the stitching mechanism, and means to stop the operation of said feeding means during the removal of books from the stitching mechanism.

47. A machine for automatically making books, comprising a stitching mechanism, means to feed signatures continuously to said stitching mechanism, means to remove books of stitched signatures from the stitching mechanism, a table, means to deposit the stitched books upon said table and means to tilt said table to dump the books therefrom.

48. A machine for automatically making books, comprising a stitching mechanism, means to feed signatures continuously to said stitching mechanism, means to halt the operation of feeding and sewing mechanism, means to remove books of stitched signatures from said stitching mechanism during the halt of said feeding and stitching means, and means to sever the stitching threads.

49. A machine for automatically making books, comprising a clamp table, a mechanism for feeding signatures to the clamp table, means for successively stitching each signature as fed, means to halt the feeding mechanism and stitching means, means to move the clamp table when a book of signatures has been stitched, thread tension control means, and means to operate said tension control means to cause a sewed book to be removed from said clamp table.

50. A machine for automatically making books, comprising a clamp table, means for delivering signatures to said clamp table in continuous succession, a stitching mechanism, means for operating said stitching mechanism to bind together the signatures as delivered to the clamp table, means to move said clamp table from said stitching mechanism when a book of signatures has been stitched, a thread tension means, and means to operate said thread tension means at one time to provide thread slack and at another to tauten the threads during the movement of the table.

51. A machine for automatically making books, comprising a clamp table, means for delivering signatures to said clamp table, a stitching mechanism, means for operating said stitching mechanism in continuous alternation with said delivering means to stitch each signature delivered onto other signatures, means to remove said clamp table from the sewing mechanism, means to hold the signatures on said clamp table, a thread tension means, and means to operate said thread tension means to hold the signatures as the clamp table moves relatively thereto thereby causing the signatures to be removed from said clamp table.

52. A machine for automatically making books, comprising a sewing mechanism, a signature feeding mechanism, electrical means for controlling the sequential operation of said mechanisms, a book receiving table, means to remove a book of sewed signatures and deposit it upon said table, and means to tilt said table to dump the book therefrom.

53. A machine for making books automatically, comprising a sewing mechanism, a signature feeding mechanism, means to halt the operation of said sewing and feeding mechanism when a book of signatures has been sewed, and means to remove a book of sewed signatures.

54. A machine for making books automatically, comprising a sewing mechanism, a signature feeding mechanism, electrical means for controlling the alternate operation of said feeding and sewing mechanism, and electrically controlled means for removing books of sewed signatures.

55. A machine for making books automatically, comprising a means for stitching together the signatures of a book, means for supplying the signatures to said stitching means, electrically controlled means for interrupting the operation of said stitching and supplying means, and means for removing a book of sewed signatures.

56. A machine for making books automatically, comprising means for stitching together the signatures that form a book, means to supply said signatures in continuous succession to said stitching means, a book receiving table, means to remove a book of stitched signatures from the stitching mechanism and deposit same upon said table and means to tilt said table to dump the book therefrom.

57. A machine for making books automatically, comprising means for stitching together signatures that form a book, means to supply said signatures in continuous succession to said stitching means, electrically controlled means for removing a book of sewed signatures, means to cut the threads and means to dump the book.

58. In a book sewing machine of the character disclosed, means for sewing one section upon other sections in continuous succession, means for continuously delivering sections to the sewing means, and means to interrupt the delivery of sections when the last section of a book has been delivered.

59. In a book sewing machine of the character disclosed, means for sewing sections continuously upon sewed sections to make a book, means to remove a book of sewed sections from the sewing means, and means actuable when the last section of a book has been sewed to set in motion the removing means.

60. In a book sewing machine of the character disclosed, means for sewing sections in continuous succession upon sewed sections to make a book, means to remove a book of sewed sections from the sewing means, and electrical means actuable when the last section of a book has been sewed to set in motion the removing means.

61. In a machine of the character disclosed, a sewing mechanism, means to deliver sections to said sewing mechanism, means to remove a book of sewed sections from the sewing machine, and means to halt the operation of the machine when any of the stated means fails to function.

62. In a machine of the character disclosed, a sewing mechanism, means to feed sections in continuous succession to said sewing mechanism, means to interrupt the feeding means after the feeding of the last section of a book, and means to remove a book of sewed sections.

63. In a machine of the character described, a means for sewing book sections together, means to feed book sections in continuous succession to said sewing means, automatic means for interrupting the feed when a book of sections has been sewed, a means to remove the book of sewed sections from the sewing means, means controllable by said book removing means to start the feed of sections for another book, and means to sever the threads after the sewing of the first section of another book has been completed.

64. In a machine for making books, a sewing mechanism, means for feeding book sections continuously to said sewing mechanism, means to interrupt the feed of sections when a book of sections has been sewed, means to remove a book of sewed sections, means to start the feeding and sewing of sections of a new book while the threads are still connected to the book of sewed sections.

65. In a machine for making books, a sewing mechanism, a vacuum feed for picking up sections in continuous succession and delivering same to said sewing mechanism, means to interrupt the vacuum when a book of sections has been sewed to stop the feed of sections, means to remove a book of sewed sections, means to re-establish the vacuum to resume the section feed and sewing of signatures of a new book and means to sever the threads after the sewing of sections of a new book has begun.

66. In an automatic machine for making books, means for continuously sewing individual signatures to a series of previously sewed signatures, vacuum pick-up means for the signatures, means to operate said pick-up means to deliver signatures continuously to said sewing means, and electrically operated means to control all said means.

67. In an automatic machine for making books, means for sewing one signature to a series of previously sewed signatures in continuous succession, vacuum pick-up means for the signatures, means to operate said pick-up means to deliver signatures continuously to said sewing means, electrically operated means to control said means, and means to stop the machine when the vacuum in the pick-up means fails.

68. A machine for automatically making books continuously comprising a support, means to deliver individual book sections in continuous succession to said support, means to sew each section as delivered to other previously sewed sections until a book is completed and means to stop the delivering and sewing means when the last section of a book has been sewed.

69. A machine for automatically making books, comprising a sewing means, means to feed the signatures required for a book singly in continuous succession to said sewing means to be sewed thereby continuously to other signatures, and means to stop the feeding means when the last signature of a book has been fed.

JESSE GANNON.
WINFRED ELMO REAVIS.
GEORGE BAKER.